United States Patent [19]

Phillips et al.

[11] Patent Number: 5,859,878
[45] Date of Patent: Jan. 12, 1999

[54] COMMON RECEIVE MODULE FOR A PROGRAMMABLE DIGITAL RADIO

[75] Inventors: William C. Phillips, Ellicott City; Michael V. Pascale, Millersville; Ronald W. Minarik, Lutherville; Kenneth M. Schmidt; Benjamin F. Weigand, both of Ellicott City; Walter M. Dirndorfer, Linthicum, all of Md.; Robert S. Prill, Allenwood, N.J.; Arnold B. Siegel, Somerset, N.J.; Richard H. Nogay, West Caldwell, N.J.

[73] Assignee: Northrop Grumman Corporation, Los Angeles, Calif.

[21] Appl. No.: 528,206

[22] Filed: Aug. 31, 1995

[51] Int. Cl.$^6$ .............................. H03K 9/00; H04L 27/06; H04L 27/14; H04L 27/22
[52] U.S. Cl. .................................. 375/316; 455/74
[58] Field of Search .................................. 375/219, 222, 375/239, 261, 262, 269, 279, 316, 320, 322, 329, 270, 268; 370/304, 305; 455/145, 186.1, 313, 74, 57 J, 90, 321; 342/14, 16, 21

[56] References Cited

U.S. PATENT DOCUMENTS

| | | |
|---|---|---|
| 3,130,401 | 4/1964 | Murphy . |
| 3,332,080 | 7/1967 | Verwey . |
| 3,495,248 | 2/1970 | Raether et al. . |
| 3,525,979 | 8/1970 | Kunkel et al. . |
| 3,581,073 | 5/1971 | Visher . |
| 3,946,393 | 3/1976 | Dunne et al. . |
| 3,981,440 | 9/1976 | Richardson . |
| 4,097,922 | 6/1978 | Vito et al. . |
| 4,137,531 | 1/1979 | Pell . |
| 4,184,158 | 1/1980 | Smith, 2nd.. . |
| 4,525,865 | 7/1985 | Mears . |
| 4,533,917 | 8/1985 | Reed . |
| 4,651,282 | 3/1987 | Robinson et al. ................ 364/443 |

(List continued on next page.)

FOREIGN PATENT DOCUMENTS

| | | |
|---|---|---|
| 0170793 | 2/1986 | European Pat. Off. . |
| 0399200 | 11/1990 | European Pat. Off. . |
| 0511511 | 4/1992 | European Pat. Off. . |
| 0511730 | 4/1992 | European Pat. Off. . |
| 0513443 | 11/1992 | European Pat. Off. . |
| 0534255 | 3/1993 | European Pat. Off. . |
| 0553862 | 8/1993 | European Pat. Off. . |

OTHER PUBLICATIONS

Patent Abstracts of Japan, Kume Hiroshi, Jul. 17, 1991.
PCT International Application No. WO 95/10889, published Apr. 20, 1995.

Primary Examiner—Jason Chan
Assistant Examiner—Jean B Corrielus
Attorney, Agent, or Firm—Walter G. Sutcliff

[57] ABSTRACT

A digital submodule is included in a software programmable common receive module for receiving IF signals and producing a serial bit stream. The digital submodule is programmable based on a selected application of a plurality of radio applications and, if present, a selected function of a plurality of functions of the selected radio application. The digital submodule may include an analog to digital converter for converting IF signals received from an analog submodule into digital signals. The digital signals are supplied to a programmable signal processing unit which is configured, according to the selected radio application and, if present, the selected function, to perform control functions, processing and analysis of the digital signals and generate output signals. The output signals are then formatted by a formatting unit producing formatted digital signals. The formatted digital signals are then supplied to a system bus. The programmable signal processing unit may include a digital downconverter for selective use depending on the selected application of radio communication, for generating a base signal. Additionally, a central processing unit is included to perform further signal processing for selected radio application.

39 Claims, 22 Drawing Sheets

Microfiche Appendix Included
(2 Microfiche, 146 Pages)

U.S. PATENT DOCUMENTS

| | | |
|---|---|---|
| 4,658,359 | 4/1987 | Palatucci et al. . |
| 4,928,106 | 5/1990 | Ashjaee et al. ............................ 342/352 |
| 4,984,295 | 1/1991 | Engstrom et al. . |
| 5,019,910 | 5/1991 | Filmer . |
| 5,061,930 | 10/1991 | Nathanson et al. ........................ 342/13 |
| 5,117,422 | 5/1992 | Hauptschein et al. . |
| 5,144,314 | 9/1992 | Malmberg et al. . |
| 5,152,011 | 9/1992 | Schwob ................................. 455/158.5 |
| 5,165,055 | 11/1992 | Metsler . |
| 5,220,557 | 6/1993 | Kelley . |
| 5,303,393 | 4/1994 | Noreen et al. ............................ 455/3.2 |
| 5,317,316 | 5/1994 | Sturm et al. . |
| 5,323,332 | 6/1994 | Smith et al. . |
| 5,334,982 | 8/1994 | Owen . |
| 5,390,360 | 2/1995 | Scop et al. . |
| 5,471,509 | 11/1995 | Wood et al. . |
| 5,488,356 | 1/1996 | Martinovich et al. . |
| 5,533,072 | 7/1996 | Georgiou et al. . |
| 5,548,839 | 8/1996 | Caldwell et al. ....................... 455/313 |
| 5,604,927 | 2/1997 | Moore . |
| 5,732,338 | 3/1998 | Schwob ................................. 455/158.5 | ns
COMMON RECEIVE MODULE FOR A PROGRAMMABLE DIGITAL RADIO

CROSS REFERENCE TO RELATED APPLICATIONS

This application is related to concurrently filed U.S. Application entitled DIGITALLY PROGRAMMABLE MULTIFUNCTION RADIO SYSTEM ARCHITECTURE, having U.S. Ser. No. 08/522,050 and which is now pending WIDE-BAND RADIO-FREQUENCY CONVERTER HAVING MULTIPLE USE OF INTERMEDIATE FREQUENCY TRANSLATORS, now U.S. Pat. No. 5,548,839 issued Aug. 20, 1996; COMMON TRANSMIT MODULE FOR A PROGRAMMABLE DIGITAL RADIO, having U.S. Ser. No. 08/522,058 and which is now pending and DIGITALLY PROGRAMMABLE RADIO SYSTEM MODULES FOR TRANSPONDER SYSTEMS, having U.S. Ser. No. 08/522,057 and which is now pending all incorporated by reference herein.

REFERENCE TO MICROFICHE APPENDIX

A microfiche appendix consisting of 2 fiche and of 146 frames is included as a part of the specification.

BACKGROUND OF THE INVENTION

1. Field of the Invention

The present invention is directed to a digitally programmable receive module including an analog converter submodule and a digital processing submodule of a receive module in a radio that can be digitally reconfigured to operate over a broad radio band and with different signal formats and, more particularly, to a receive module of a system that provides dynamically programmable and configurable channels using digital channel components to maximize reconfiguration flexibility.

2. Description of the Related Art

Many commercial and military applications require multiple communication, navigation, and identification (CNI) or telemetry radio frequency (RF) functions to be performed at a single location. Table 1 lists examples of Communication, Identification, Navigation and Telemetry Radio functions.

TABLE 1

CNI and Telemetry Radio Functions

| Communication | Identification |
|---|---|
| HF Clear Voice/Data | ATCRBS/IFF Transpond |
| HF AJ | IFF Interrogate |
| HF Link 11 | Mode S |
| VHF AM | TCAS |
| VHF AM Encrypted | |
| VHF FM | Navigation |
| VHF Encrypted | Omega Nav** |
| SINCGARS | Loran-C** |
| VHF ACARS | ILS Localizer |
| UHF Clear | ILS Glideslope |
| UHF Encrypted | ILS Marker Beacon |
| Havequick Versions | VHF Omni-Range (VOR) |
| Military UHF SATCOM | PLRS/EPLRS |
| Airphone | TACAN |
| JTIDS | Distance Measuring Equipment (DME) |
| Commercial SATCOM | Precision DME |
| RAM Mobile Data | GPS |
| Cellular | GLONASS |
| Citizens Band | Radar Altimeter* |
| PCS | Microwave Landing System (MLS)* |

TABLE 1-continued

CNI and Telemetry Radio Functions

| | |
|---|---|
| Commercial TV | Automatic Direction Finding (ADF)** |
| Telemetry | |
| ACMI | |

*Indicates that a block converter is used in an antenna interface unit to convert a radio signal to a selected input range.
**Indicates that either a block converter in the antenna interface unit or a direct internal connection to the analog-to-digital converter is used.

The conventional method for servicing multiple CNI functions is to use independent radio frequency (RF) receive modules, each covering a specific portion of the RF band corresponding to a specific CNI function.

Various applications require greater than 10 different types of CNI radios. At one extreme, communication, navigation and identification (CNI) multi-radio suites are comprised of independent and different type radio channels for each radio functional thread. At the other extreme, integrated programmable radio systems, now in development, cross-couple various elements of multiple channels, which results in a highly complex system of tightly coupled resources.

Both approaches, including hybrids of the two approaches, have advantages as well as major disadvantages. For example, when redundancy is required, the independent channel systems must have separate and different backup radios for all important systems, such as instrument landing systems (ILS), which can be very costly. Further, size and weight of the system precludes implementation of multiple CNI functions in many manpack and vehicular applications. The cross-coupled systems are extremely difficult to maintain because fault isolation is difficult due to the complexity of signal distribution and switching and discourages addition of new or modified functions due to a high cost of system redesign and recertification.

A programmable common digital radio is needed which provides an integrated solution for many different types of multi-function CNI suites provided in a small size, with a light weight at a low cost, without the disadvantages suffered by other architectures as described above.

SUMMARY OF THE INVENTION

Accordingly, an object of the present invention is to provide a programmable receive module with an architecture that allows maximum flexibility at minimum cost.

A further object of the present invention is to provide a programmable receive module which will operate with an approximate 2–2000 MHz RF input.

A still further object of the present invention is to provide a programmable receive module which receives and processes analog waveforms of various combinations of amplitude, frequency and phase modulations which include communication, navigation, identification, radar, telemetry, or other signals that are transmitted in free space.

An additional object of the present invention is to provide a programmable receive module which receives and processes analog waveforms some of which may be frequency translated to the operating range of the programmable receive module via a suitable analog frequency translation unit located prior to the programmable receive module in a path of a received signal.

An object of the present invention is to provide a programmable receive module which may supply a relatively low speed serial bit stream output, such as a digital information signal.

An additional object of the present invention is to provide a programmable receive module consisting of a programmable analog submodule and a programmable digital submodule.

A further object of the present invention is to provide a programmable receive module with internal interconnections between the programmable analog submodule and the programmable digital submodule.

An object of the present invention is to provide a programmable receive module having both analog and digital circuitry that can be quickly reconfigured for different applications.

An additional object of the present invention is to provide a quickly reconfigurable programmable receive module which may be reconfigured by using internally stored application programs or downloading externally stored application programs via a system bus.

A further object of the present invention is to provide a quickly reconfigurable programmable receive module where certain types of limited reconfiguration or control, for example, channel selection, antenna switch selection in an associated antenna interface unit or a built-in-test initiation, may occur by downloading parameter data necessary to perform limited reconfiguration or control. The present invention may additionally provide for parameter data which may reside in external memory or may be from a keyboard or display menu, for example.

A still further object of the present invention is to provide a programmable digital submodule consisting of an analog-to-digital converter (ADC) portion and a digital processing portion, where the ADC portion may consist of a single A/D converter or two or more A/D converters of different sampling rate and dynamic ranges. The ADC portion and the digital processing portion may be suitably interconnected. Additionally, the programmable digital submodule may accept, digitize and process many different types of analog waveforms, including analog waveforms of various forms containing information, such as modulated RF or IF carriers of various carrier frequencies and many different forms of modulation, and further, supply a low speed serial bit stream output. These analog waveforms may include communication, navigation, identification, radar, telemetry or other signals that are transmitted in free space or in other media and which are frequency translated to the operating range of the analog-to-digital converter. Such frequency translation may occur either in the programmable analog submodule associated with the programmable receive module disclosed in this application or a suitable analog frequency translation unit located prior to the programmable receive module in the received signal path. The analog waveforms may include narrow band intermediate frequency waveforms which may exist, for example, near a 1 MHz carrier frequency and/or wide band intermediate frequency waveforms which may exist, for example, near a 30 MHz carrier frequency.

An additional object of the present invention is to provide a programmable digital submodule which may be quickly reconfigured for different applications.

An object of the present invention is to provide a digital submodule which may supply a relatively low speed serial bit stream output.

A further object of the present invention is to provide a programmable digital submodule that controls associated radio channel resources. The control may include controlling an associated analog submodule and controlling receive module resources in an antenna interface unit associated with the channel.

A still further object of the invention is to provide a unique, flexible and functionally efficient digital processing portion that contains a unique flexible and functionally efficient digital processing architecture that can process many different types of signals in digital format, including analog signals previously converted to digital format, and including communication, navigation, identification, radar, telemetry or other signals that are received, translated in frequency and converted to digital format.

An additional object is to provide a digital processing portion quickly reconfigurable for different applications, such that the digital processing portion may provide a unique, flexible and functionally efficient digital processing architecture consisting of a combination of functional hardware elements including one or more reconfigurable format units or dynamically configurable units; one or more dynamically configurable digital downconverters with built-in or external filtering/decimation units; one or more sequential and/or parallel instruction processors; memory; one or more dynamically configurable programmable digital filter units, either with serial or parallel input/output (I/O); and receivers, transmitters or transceivers for I/O.

Another object of the present invention is to provide a programmable receive module with programmable external interfaces that can be used for a variety of interface applications, where such interfaces may be serial or parallel, synchronous or asynchronous, to include both standard or custom protocols. The interfaces may include, for example:

a system bus coupled to various external equipment such as a computer with associated memory, displays, audio equipment, control devices such as keyboards, touchscreens, etc., and various monitoring or measuring equipment (See the related U.S. disclosure entitled DIGITALLY PROGRAMMABLE MULTIFUNCTION RADIO SYSTEM ARCHITECTURE for a description of such external equipments);

an antenna interface unit (AIU) control bus which may control assets in the AIU associated with a same channel as the programmable receive module;

a transpond bus coupled to an associated programmable common transmit module used for transponder or repeater applications; an applique bus coupled to an associated applique module for performing additional signal processing beyond the capability of the digital processing portion of the digital submodule; and/or buses coupled to other external elements or modules as provided by the flexible programmable interfaces of the programmable receive module.

A further object of the present invention is to provide common identical receive modules that can be easily reconfigured for many different type CNI radio functions and, as a result, allow reduction in the number of spares or backup modules required for a given level of overall system availability.

A still further object of the present invention is to provide a programmable digital submodule of a receive module which receives and demodulates many different CNI radio functions.

A still further object of the present invention is to provide a programmable receive module having an analog and a digital submodule in the same small unit. Additionally, objects of the present invention are that relatively noisy digital circuits in the digital submodule do not corrupt sensitive analog circuits in the analog submodule; the analog submodule and ADCs are electrically isolated from the digital processing portion of the digital submodule so as to minimize corruption of the relatively noisy digital circuits upon the sensitive analog circuits; and electrical isolation of digital connections between the analog submodule with the ADCs and the digital processing portion is achieved via transceivers, receivers or transmitters (i.e., drivers) located on the analog with the ADCs and the digital processing portion for differential (i.e., dual rail) connectivity.

An additional object of the present invention is to provide digital connections between the analog submodule with ADCs and the digital processing portion of the digital submodule, such that the digital connections may include, for example, ADC data and associated signals such as a digital clock reference originating in the analog submodule, and routed to the ADCs, where, for example, additional frequency multiplication or division is performed on the clock reference.

Another object of the present invention is to provide functional partitioning of the analog and digital interface between the analog and digital submodules to handle narrow band and wide-band CNI functions between approximately 2 and 2000 MHz.

An additional object of the present invention is to provide a user a choice of intermediate frequencies and sampling frequencies to be received for superior performance.

A further object of the present invention is to provide a digital submodule of a receive module using minimal hardware that is programmable for a wide variety of CNI radio functions.

The objects of the present invention are achieved by providing a hardwired receive module in an optimally partitioned receive channel which is reprogrammable to receive radio signals for different types of radio communication. A receive channel is defined as one in which one or more modules in the channel are connected in series and are dedicated or programmed to pass a particular signal or type of information. A hardwired module (or simply "module") is defined as one in which none of the circuit elements are used (e.g., switched) in series with circuit elements in another identical module, to process a particular signal or flow of information. Therefore, circuit elements of the hardwired receive module are not used in series with circuit elements of another receive module to form a receive channel.

Two separate AM/FM table radios illustrate an example of two separate channels that are each comprised of a single module. Each radio (i.e., "module") can be tuned to receive any number of radio channels (i.e., radio stations), one at a time. However, during normal operation, none of the circuitry in one radio is used in conjunction with some of the circuitry in the other radio. In this case, each radio includes a "hardwired" module. Specifically, all circuit elements are routinely used in conjunction with the elements in another box. Circuit elements can be switched inside a box for different radio frequency channels or for different radio waveforms, such as AM versus FM. However, the circuit elements are not shared between modules.

Advantages of the present invention over conventional systems are that (i) the present invention forms a relatively large portion of a receive channel, (ii) the receive module is switched in series with relatively small radio functionally specific antenna interface unit (AIU) modules to form a receive channel, and (iii) the receive module is programmed to service a considerably wider variety of radio functions than conventional receive channels.

According to the present invention, when the receive module is programmed for a specific type of radio communication from a wide variety of radio communication types, the receive module receives an RF input representing a specific type of radio communication in the approximate 2–2000 MHz frequency range and normally outputs a serial bit stream representing demodulated information for a specific type of radio communication.

The receive module includes an analog submodule and a digital submodule. The analog submodule accepts RF signals, which are within an RF range of interest; performs coarse tuning; and, depending on an application selected, outputs either a narrow-band IF signal or a wide-band IF signal.

The digital submodule is programmed for a specific type of radio communication, receives and processes IF signals from the analog submodule and produces a serial bit stream. Both the analog and digital submodules are programmed for the specific type of radio communication.

These together with other objects and advantages, which will be subsequently apparent, reside in the details of construction and operation as more fully herein described and claimed, reference being had to accompanying drawings forming a part hereof, wherein like numerals refer to like parts throughout.

DISCLOSURE OF THE INVENTION

Figure 1:
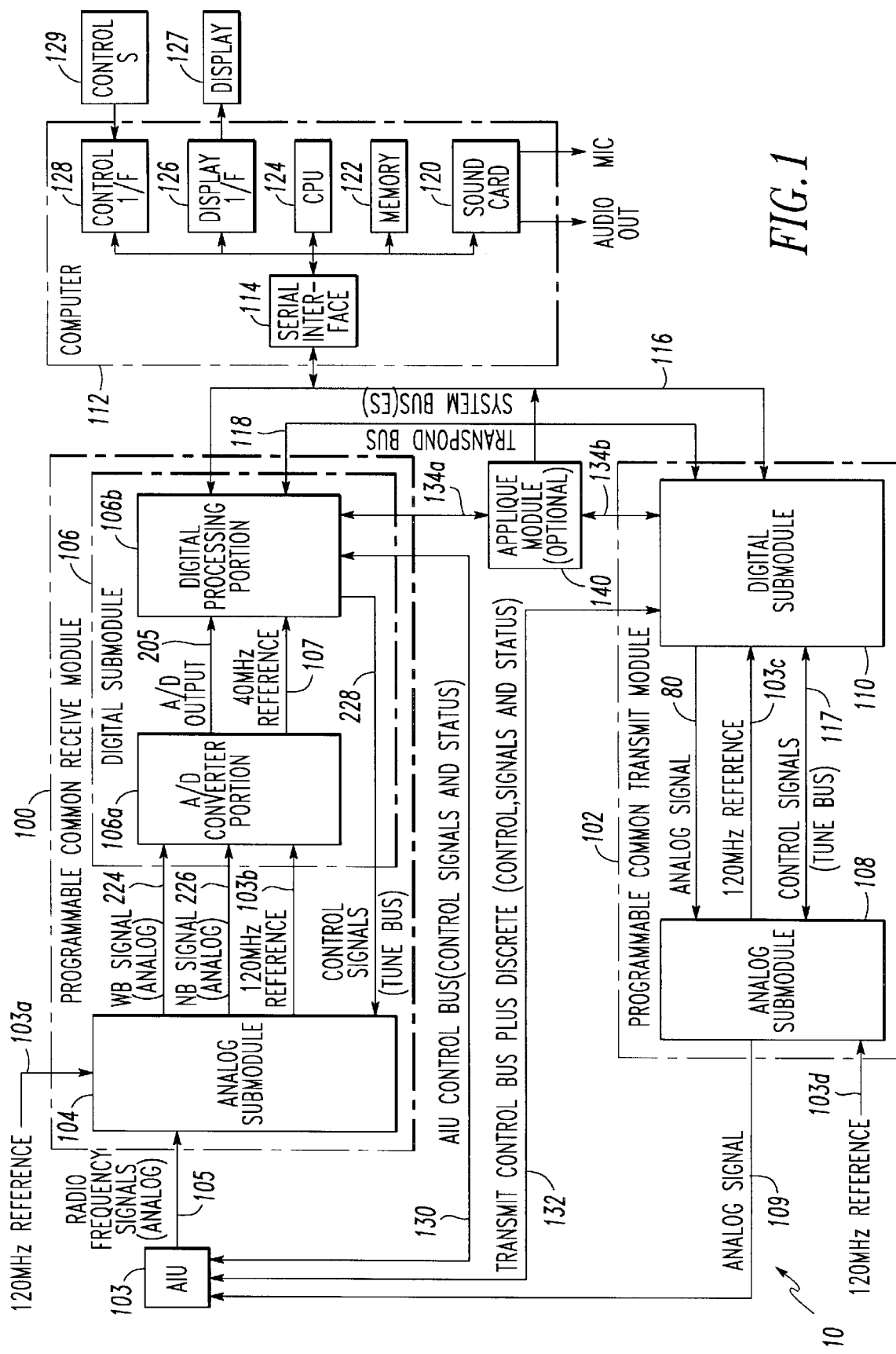
FIG. 1 is a block diagram of a digital programmable radio with both receive and transmit channels.

FIG. 1 is a block diagram illustrating a programmable radio system 10 which includes a programmable common receive module (PCRM) 100 and a programmable common transmit module (PCTM) 102.

The PCRM 100 comprises an analog submodule 104 and a digital submodule 106.

The analog submodule 104 receives radio frequency signals within a range of interest, in this example, approximately 2 MHz to 2000 MHz. The analog submodule 104 is described in related U.S. disclosure entitled WIDE-BAND RADIO-FREQUENCY CONVERTER HAVING MULTIPLE USE OF INTERMEDIATE FREQUENCY TRANSLATORS.

The digital submodule comprises an analog to digital converter (ADC) portion 106a and a digital processing portion 106b, electrically isolated from each other.

The PCTM 102 is partitioned into an analog submodule 108 and a digital submodule 110. The programmable common transmit module (PCTM) 102 is described in related U.S. disclosure entitled COMMON TRANSMIT MODULE FOR A PROGRAMMABLE DIGITAL RADIO. The PCTM 102 is not used for receive only radio functions, such as present for an Instrument Landing System.

A system bus 116 couples the PCRM 100 and the PCTM 102 to external devices. More specifically, the system bus 116 connects the digital submodule 106 of the PCRM 100 and the digital submodule 110 of the PCTM 102 to external devices such as a computer 112 with associated devices such as a UART 114, a sound card 120, and memory 122. The memory 122 may be used for storing application programs which may be downloaded to the PCRM 100 and the PCTM 102 via the system bus 116.

As more fully explained in the related U.S. disclosure entitled DIGITALLY PROGRAMMABLE MULTIFUNCTION RADIO SYSTEM ARCHITECTURE, in some applications the PCRM 100 and the PCTM 102 are directly connected to other modules needed for additional message processing, security purposes or for interfaces to various standard buses. These additional modules may additionally be connected to the system bus 116. Also, as explained in the same U.S. disclosure, the system bus 116 and any other buses described herein can be physically partitioned into separate buses for control commands, message data, spare buses, etc.

Further, a transpond bus 118 may, for example, connect the PCRM 100 to the PCTM 102; and an antenna interface unit (AIU) control bus 130 may connect the PCRM 100 to an associated AIU 103n, in this example, AIU 103. A transmit control bus plus various discretes 132 connect the PCTM 102 to the associated AIU 103n. As explained in the related U.S. disclosure entitled DIGITALLY PROGRAMMABLE MULTIFUNCTION RADIO SYSTEM ARCHITECTURE, in a rare case where the digital submodule 106 has insufficient processing capacity to perform a higher level of signal processing directly on a received waveform, prior to demodulation and subsequent reduction to a relatively low-speed serial bit stream output, applique buses 134a and 134b connect PCRM 100 and PCTM 102 to an optional applique module 140 which performs such processing.

Not all of the above external buses are used for every radio application. For example, radio functions requiring an applique bus 134a or 134b generally do not require a transpond bus 118.

A tune bus 228 connects the digital submodule 106 of the PCRM 100 (via the digital processing portion 106b) to the analog submodule 104 of the PCRM 100. Further, although not shown, those of skill in the art can utilize the programmability of the hardware described herein and include additional interconnections between the digital processing portion 106b of the digital submodule 106 of the PCRM 100 to the analog submodule 104 of the PCRM 100.

The PCRM 100 is preferably comprised of a single module (a plug-in module for many applications) that receives RF (analog) signals from an antenna interface unit (AIU) 103, described in more detail in the related architecture disclosure; DIGITALLY PROGRAMMABLE MULTIFUNCTION RADIO SYSTEM ARCHITECTURE, or a signal distribution network. The PCRM 100 outputs relatively low-speed serial digital data. Inside the PCRM 100, RF signals are frequency translated through various intermediate frequencies (IFs), digitally sampled and processed according to the CNI programmed configuration, and routed to an appropriate digital output. Containment of the major signal operations in a single programmable unit greatly facilitates logistics, built-in test/fault-isolation test (BIT/FIT) and maintenance, and produces savings due to economy of scale.

Figure 2:
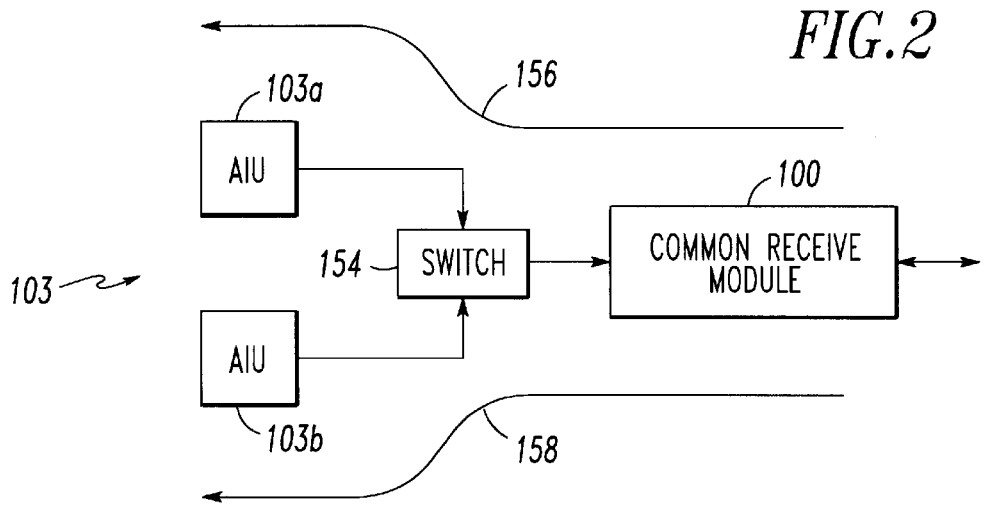
FIG. 2 is a diagram illustrating connections of a programmable common receive module to multiple antenna interface units.

FIG. 2 is a diagram illustrating the connection of the PCRM 100 to the AIU 103. The AIU 103 may, for example, include a first antenna interface unit (AIU) 103a and a second antenna interface unit (AIU) 103b coupled to a switch 154. The PCRM 100 can be configured as part of a first channel 156 formed by connecting the PCRM 100 to first AIU 103a via switch 154, or as part of a second channel 158 formed by connecting the PCRM 100 to second AIU 103b via switch 154. Thus, the PCRM 100 can be configured to be one channel of a plurality of channels.

A similar configuration is possible for connecting the PCTM 102 to AIUs, in this example, two AIUs, as disclosed in detail in the related disclosure COMMON TRANSMIT MODULE FOR A PROGRAMMABLE DIGITAL RADIO.

Figure 3A:
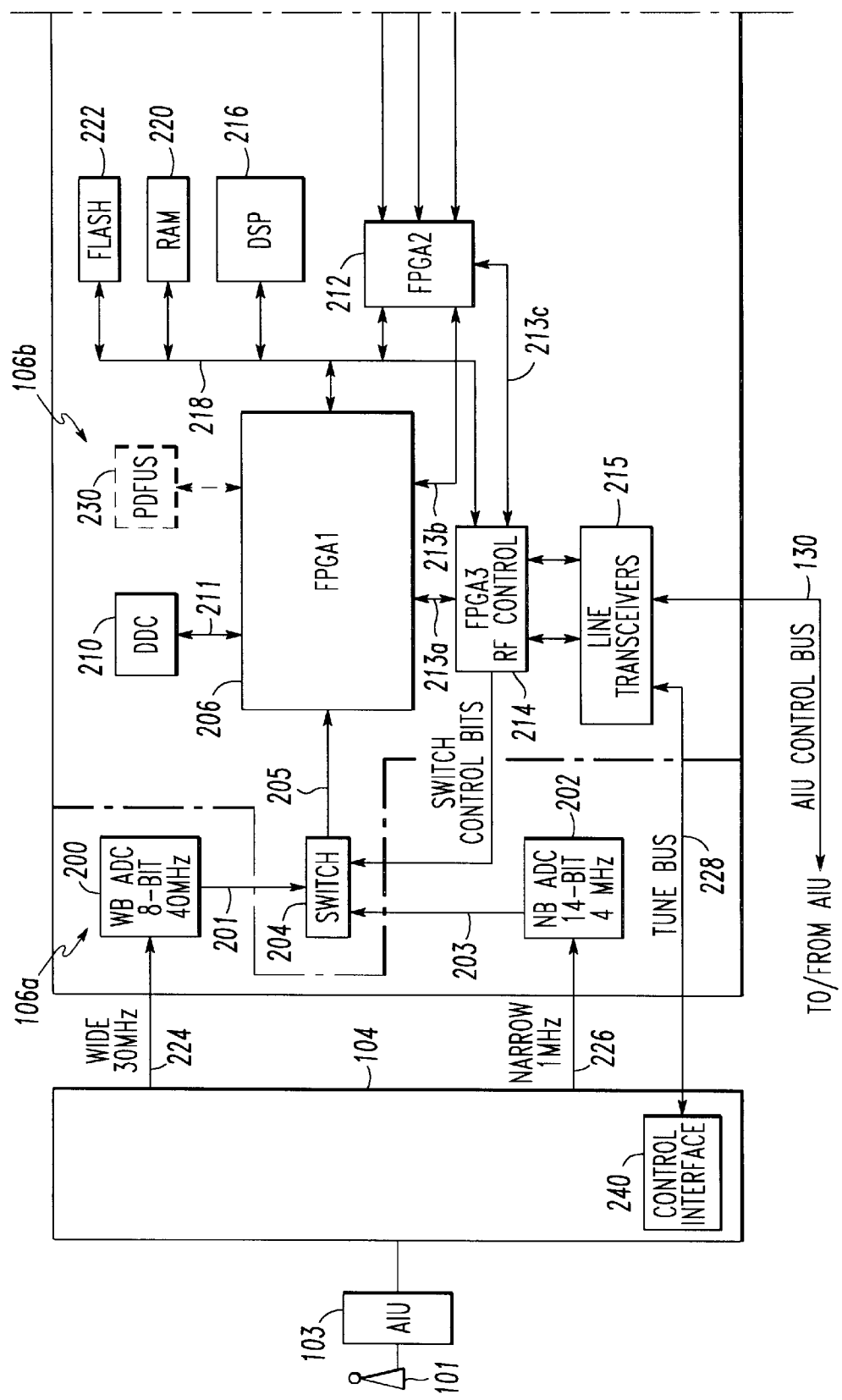
FIGS. 3A and 3B are a block diagram of a digital submodule of the programmable common receive module in the digital programmable radio.
Figure 3B:
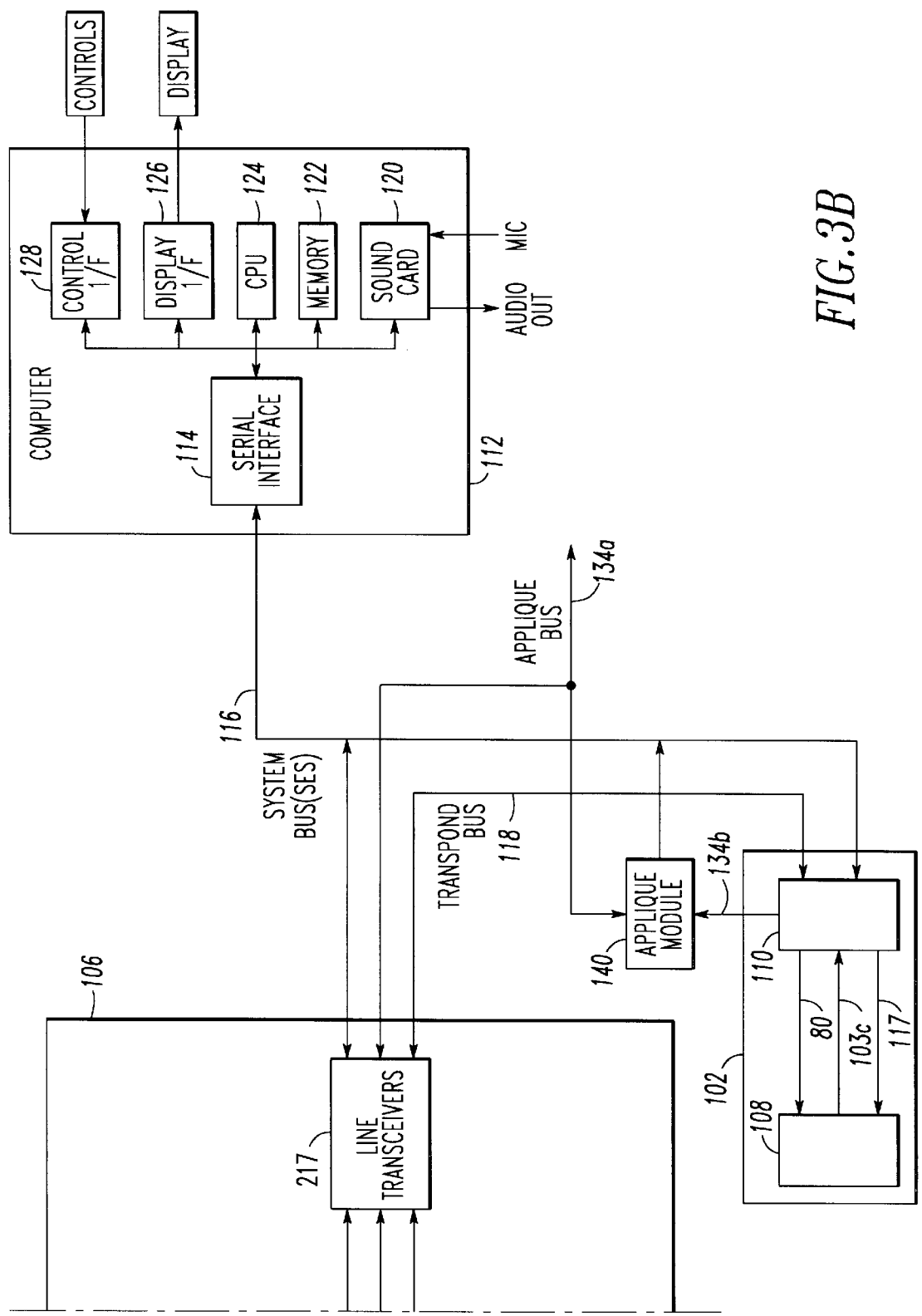

FIGS. 3A and 3B provides a more detailed drawing of the digital submodule 106. The digital submodule 106 of the programmable common receive module (PCRM) 100 can service a wide range of CNI functions, including AIR TRAFFIC CONTROL RADAR BEACON, INSTRUMENT LANDING SYSTEM, VHF RADIO and others as detailed in the related DIGITALLY PROGRAMMABLE MULTIFUNCTION RADIO SYSTEM ARCHITECTURE disclosure.

The flexible and functionally efficient digital processing architecture provided by the digital submodule 106 includes a combination of functional hardware elements such as, for example, one or more ADCs, including a 8-bit wide band ADC 200 operating at 40 MHz and a 14-bit narrow band ADC 202 operating at 4 MHz; one or more reconfigurable format units, commonly referred to as field-programmable gate arrays or similar dynamically configurable units such as FPGA1 206, FPGA2 212 and FPGA3 214; one or more dynamically configurable digital downconverters (DDC) with associated filtering/decimation units such as DDC 210; one or more sequential and/or parallel instruction processors sometimes referred to as central processing units (CPUs) or digital signal processors (DSPs) such as DSP 216; memory such as random access memory (RAM) 220; and nonvolatile memory (FLASH) 222; one or more dynamically configurable programmable digital filter units, with either serial or parallel I/O such as PDFU 230; and receivers, transmitters and/or transceivers for I/O, such as, for example, line transceivers 215 and 217.

The digital submodule receives an analog signal 224 or 226 from the analog submodule 104 that is band limited to either wide band or narrow band, respectively. This signal is supplied to the A/D Converter Portion 106a of the digital submodule 106.

If the signal is wide band, it may be, for example, an IF (intermediate frequency) wide band signal limited to ±4000 kilohertz about 30 MHz, resulting in a total of 8 MHz of IF bandwidth maximum. If the signal is narrow band, it may be, for example, an IF narrow band signal limited to ±200 kilohertz about 1 MHz, resulting in a total of 400 kilohertz of IF bandwidth maximum.

In this example, two analog to digital converters (ADC) are used: one for converting a narrow band (NB) signal 202 and one for converting a wide band signal (WB) 200. Specifically, a wide band signal (WB) 224 at 30 MHz is supplied to an 8-bit 40 MHz wide band analog to digital converter (WB ADC) 200 such as, for example, an AD9012AJ from Analog Devices. By utilizing well-known 4/3 harmonic sampling (i.e., the sampling of the 30 MHz I/F signal at a sample rate of 40 MHz), the wide band signal at 30 MHz is folded down to the 10 MHz region.

A narrow band (NB) signal 226 is supplied to a 14-bit 4 MHz narrow band analog to digital converter (NB ADC) 202 such as, for example, an ADS944MC from Datel. The signal flow for various RF input ranges and radio function types within the analog submodule 104 is discussed in the related U.S. disclosure entitled WIDE-BAND RADIO-FREQUENCY CONVERTER HAVING MULTIPLE USE OF INTERMEDIATE FREQUENCY TRANSLATORS.

Both the WB ADC 200 and the NB ADC 202 are coupled to a converter switch (SW) 204 or a multiplexer which controls which signal is transferred to the remaining portion of the digital submodule 106, i.e., the digital processing portion 106b. The SW 204 is controlled by switch control bits which indicate whether the WB 224 or NB 226 signal is to be transmitted to the digital processing portion 106b. If the NB signal 226 is selected, the data received from the NB ADC 202, in this example 14 bits of data, are transmitted with a data valid bit and a clock bit to a first field programmable gate array (FPGA1) 206 as a selected digital signal. In the alternative, if the WB signal 224 is selected, the data received from the WB ADC 200, in this example 8 bits of data, are transmitted with a data valid bit and a clock bit to the first FPGA1 206 as the selected digital signal.

In the present invention, three FPGAs 206, 212 and 214 are used to perform selected operations. The FPGAs may be, for example, Altera Flex Parts 81188. The function of these FPGAs is controlled by configuration data which is set forth in the appendix. As discussed later, ultimately, these three FPGAs could be combined into a single, and perhaps more flexible, unit.

The first FPGA (FPGA1) 206 will receive the selected digital signal and depending upon the application selected and the chip configuration program loaded, perform specified functions or operations which may include, for example, data reformatting, parallel to serial conversion and vice-versa, control, pulse width discrimination, interval discrimination, mode decoding, pulse detection, and other types of signal processing.

One specific example is when data from either WB ADC 200 or NB ADC 202 are routed to the DDC 210. The FPGA1 206 reformats the data into a format required for input to the DDC 210, for example, into 16-bit parallel data which includes 14 bits of data from NB ADC 202 plus the data valid bit and the clock bit. The clock bit may be derived from the on-board clock.

In another example, if the data includes 8-bit parallel data from WB ADC 200, the 6 least significant bits (LSBs) of the 14-bit parallel data are merely ignored.

The FPGA1 206 may additionally reformat output data received from the DDC 210 prior to routing the data to another unit within the digital submodule 106. Specifically, the output from DDC 210 is, in this example, typically 20 bits in serial form. The FPGA1 206 may, for example, serial-to-parallel convert the data output and add proper 12 LSB of the data output to the data output for consistency with a 32-bit local bus 218.

In another example, if serial data output from DDC 210 is to be input to a programmable digital filter unit (PDFU) 230, the FPGA1 206 may then reformat the data output to be consistent with input requirements for the PDFU 230, i.e., if necessary, add (or truncate) an appropriate number of bits and, also if necessary, serial-to-parallel convert the data output if the PDFU 230 requires a parallel input.

The digital down converter (DDC) 210, such as, for example, a HSP50016 chip manufactured by Harris Semiconductor, is coupled to an A/D converted output from switch 204 via FPGA1 206 and to the local bus 218 via FPGA1 206. The DDC 210 may be used, for example, to perform frequency down conversion, fine tuning, filtering and decimation of the selected digital signal. The software executable to perform the down conversion, filtering and decimation for each application is set forth in the appendix.

The processor (DSP) 216 may be, for example, a TMS320C31 chip. The DSP 216 may perform various processing functions on various types of signals which may, for example, include signals associated with various narrow band and wide band radio functions. The processing functions may include, for example, decimation; filtering; waveform demodulation of any combination of amplitude, frequency and phase modulation; signal correlation; squelch; management and control of all channel resources (gain, signal path switching, tuning, interfaces both internal to the PCRM 100 as well as to external units, etc.) in both the digital submodule 106, the analog submodule 104 and the associated AIU 103 (FIG. 1); bit stream decoding including error detection and/or correction; BIT control/reporting; Fourier transforms; calculations of difference in depth of modulation (DDM); and formatting control for various terminals such as displays. Further, although sometimes performed elsewhere in the receive channel, the DSP 216, depending upon the processing power implemented, can perform message processing, network functions, and processing of low-data rate speech algorithms.

Software for performing the functions of AM demodulation, decimation, fourier transforms, difference in depth of modulation and display functions in the DSP 216 is set forth in the appendix. The remaining functions may be easily programmed by one skilled in the arts.

A second FPGA (FPGA2) 212 may be programmed to be configured, for example, to perform interface operations between the local bus 218 and several elements of the digital submodule 106. Further, the FPGA 212 may also, for example, perform interface operations to a system bus 116, a transpond bus 118 and an applique bus 134a via transceivers located in a multi-transceiver package 217.

A third FPGA (FPGA3) 214, also coupled to the local bus 218, may be configured to perform RF control functions, including providing control bits via a tune bus 228 to the analog submodule 104 of the PCRM 100 through, for example, a transceiver in a multi-transceiver package 215; and via an AIU control bus 130 to the associated AIU 103 also through, for example, a transceiver in the multi-transceiver package 215. The FPGA3 214 may also be configured to perform control functions of various elements of the digital submodule 106 by providing control bits.

In addition, memory may be coupled to the local bus 218 and may include, for example, a 128K bits×32 bits wide random access memory (RAM) 220 and a 128K bits×32 bits wide non-volatile memory such as the common "FLASH" memory or EEPROM (FLASH) 222. The RAM 220 and the FLASH 222 are used to store application specific information, including FPGA configuration data, used during initialization and when switching applications.

The digital submodule 106 may be configured to perform specific functions depending on an application desired. The structure of the digital submodule 106 permits changing the configuration to perform a different application within a very short period of time, without requiring a change in hardware.

One method to allow for this quick reconfiguration is the following. An external device 112, such as a CNI controller (e.g., computer 112), is programmed to control the DSP 216. The external device then downloads application information, including programs and data files for each of the FPGAs 206, 212 and 214, regarding each application which may be desired to be performed by the PCRM 100, over the local bus 218 to the RAM 220. This downloading process to RAM 220 takes, in this example, approximately 100 milliseconds for a 1 megabit/sec serial system bus 116.

The DSP 216 then executes a RAM program which instructs the DSP 216 to copy corresponding application information to the FLASH 222. If time is critical, a selected application program can be immediately run from RAM 220 and later transferred to the FLASH 222 when convenient.

When power to a board with the digital submodule 106 is disconnected and the power is reapplied to the board, a boot program instructs the DSP 216 to copy application information and a corresponding application program from the FLASH 222, into the RAM memory 220 based on an application selected. The application is selected through selection data received over the system bus 116. The corresponding application program pertaining to the selected application then executes from the RAM 220.

Each program pertaining to the selected application includes source code for running the DSP 216 and data files for each of the FPGAs 206, 212 and 214 and the DDC 210, if applicable. Reconfiguring the PCRM 100 for a selected application from the RAM typically takes place in approximately 50 milliseconds in the existing embodiment. The appendix sets forth example code for functions performed by the FPGAs 206, 212 and 214.

Therefore, each FPGA 206, 212 and 214 is transferred gate configuration information pertaining to the specific application selected when the power is initialized. Additionally, the selected application may be altered any time during use. New selection data, indicating that a new application is being selected, is received from the system bus 116. The DSP 216 receives the new selection data, recognizes that the currently selected application is to be changed to a newly selected application, determines the location in the RAM 220 of the newly selected application, reads application information from the location of the RAM 220 pertaining to the newly selected application, and transfers the read application information to each of the FPGAs 206, 212 and 214. Each FPGA is then reconfigured to perform specific functions as specified for the newly selected application.

As mentioned previously, the external device 112 may be, for example, a CNI controller, a mass memory storage unit or a computer. Additionally, the outside device 112 may be, for example, on-board or off-board. If the external device 112 is a computer, the computer may be directly coupled to either the local bus 218 or DSP 216. For example, an external memory 122 associated with computer 112 may consist of nonvolatile memory such as PROMs, EPROMs, FLASH, hard disk and floppy disk, and/or volatile memory such as RAM. Nonvolatile memory can permanently contain all software applications and associated data for the entire digitally programmable radio system, including all software applications for the PCRM 100. Floppy disks, for example, may then be used to import new or modified software applications.

For rapid downloading to the PCRM 100 and to other programmable system modules, application information to be downloaded may be first transferred from a slower-access memory, such as hard or floppy disk to RAM. The downloading occurs via the system bus 116, which may be segregated into separate buses for signal data and for module control including downloading.

A flexible I/O configuration provided in the digital submodule 106, for example, by the FPGA2 212 under control of the DSP 216, can provide a downloaded data format consistent with a choice of the computer 112. When multiple application programs are already resident in the RAM 220 of the digital submodule 106, the computer 112 may download brief code corresponding to a particular application. The brief code instructs the digital submodule 106 to configure its elements for a designated application. The designated application can be determined, for example, either by an external control device such as a keyboard or touchscreen (not shown) via an external control interface 126, or, for example, by an automatic resource reconfiguration algorithm such as when the PCRM 100 functions as a spare PCRM and is automatically reprogrammed to replace a failed PCRM configured to receive and process a particular radio function.

The various external interfaces to the digital submodule 106 are completely programmable in a same or similar manner as the digital submodule 106 is programmable for various radio functions. Specifically, external I/O programming and configuration data can be downloaded to the RAM 220 from an external unit, such as, for example, the computer 112, via, for example, the system bus 116 or, if partitioned separately, a control/data bus as described in the related U.S. disclosures DIGITALLY PROGRAMMABLE MULTIFUNCTION RADIO SYSTEM ARCHITECTURE and COMMON TRANSMIT MODULE FOR A PROGRAMMABLE DIGITAL RADIO.

With regard to external connections, I/O configuration data is used to configure reconfigurable format units, in this example, the FPGAs 212 and 214, to route digital bitstreams to and from each external interconnection utilized. The flow of digital signals with respect to the external interfaces, including the electrical formats (bit length, bit rate, etc.) and protocols, is under control of a sequential/parallel instruction set processor which is in this example, DSP 216.

Thus, the common receive module 100, and particularly the digital submodule 106, has programmable external interfaces that can be used for a variety of interface applications, including control functions and signal flow. The programmable external interfaces may be serial or parallel, synchronous or asynchronous, unidirectional or bidirectional, and include standard and/or custom protocols. However, including elements necessary to meet special physical interface requirements for all types of external connections in the common receive module 100 may not be practical. Such elements may include isolation transformers or drivers to meet voltage levels required by various bus standards. In many cases such elements are not required; the external connections run to other system units of the digitally programmable radio system, and the external interfaces and connections of these system units have the same physical definitions. However, where such elements such as application transformers or drivers of a different line voltage level are required in a system application, these elements are contained externally in bus interfaces units as described in the related U.S. disclosure DIGITALLY PROGRAMMABLE MULTIFUNCTION RADIO SYSTEM ARCHITECTURE.

In addition; major portions of the analog and digital submodules 104 and 106, respectively, can be combined in higher levels of integration. For example, all field programmable gate arrays (FPGAs) 206, 212 and 214 may be combined into a single element or "chip," or the entire digital circuitry including the FPGAs, the digital downconverter (DDC) 210, the DSP 216 and the memory 220 and 222 can be consolidated into a single element for possible savings in size, cost and power dissipation.

As illustrated in FIGS. 3A and 3B, high-speed sampling rate synchronous control processing (such as A/D conversion by ADCs 200 and 202; down conversion and decimation by DDC 210; waveform processing by DSP 216; bit stream processing by FPGAs 206, 212 and 214) and high-speed parallel interconnects, such as A/D buses 201, 203 and 205, high-speed preprocessor and DDC bus 211, DSP (i.e., CPU) data and address buses, collectively called a local bus 218, and FPGA buses 213a, 213b and 213c, described later, are contained inside the PCRM 100. This greatly simplifies backplane complexity, and reduces electromagnetic interference (EMI) to the rest of the digitally programmable radio system 10.

The PCRM 100 handles internal EMI between analog and digital circuitry using separate circuit boards, shielding and isolation.

The internal processing performed among various elements in the digital submodule 106, as described above, is referred to as sampling rate synchronous control processing. This processing is required to receive an analog IF signal from the analog submodule 104 and to condition the IF signal into a digital information signal suitable for use by various external units such as those associated with the computer 112 or information terminals, as described in the related U.S. disclosure DIGITALLY PROGRAMMABLE MULTIFUNCTION RADIO SYSTEM ARCHITECTURE.

As also described in the related U.S. disclosure the digital information signal may also be routed to the PCTM 102 by the transpond bus 118 if the common transmit module 102 is employed for a transponder or repeater function, or routed to an applique module 140 via an applique bus 134a if a special processing applique unit 140 is employed to perform signal processing such as low probability of detection (LPD) processing that is beyond the processing capability of the digital submodule 106.

One of the key objects of this invention is to contain sampling rate synchronous control within the PCRM 100 and, specifically, within the digital submodule 106 to simplify external interconnections among system units by utilizing serial interfaces of as low a speed as possible for the external buses of relatively long physical length, i.e., the system bus 116, which may be segregated into separate buses as noted above. The optional higher-speed parallel transpond bus 118 and the applique bus 134a, both of which, in this example, are infrequently used, are of relatively short physical length due to the close proximity of the other system units utilizing these buses. Moreover, the transpond bus 118 and the applique bus 134a, although of higher speeds, are asynchronous to avoid sending a higher speed clock over an interconnection between system modules. Such simplification of external interconnections also reduces electromagnetic interference (EMI) problems and improves the reliability of the physical interconnections among units. Simplified interconnections are particularly important if such system units are of a plug-in variety, where deterioration of plug-in connectors over time and with usage decreases system reliability and increases EMI.

Additionally, to further reduce EMI between digital circuitry and the relative sensitive analog elements in any transmit or receive channel in the overall system, and with respect to any control-type bus that connects the digital submodule 106 to such analog elements, clocks that may be associated with such control-type buses are turned off after passage of control data has been completed. For example, if the AIU control bus 130, which provided tuning and/or other control information to the AIU 103, is implemented to include a separate differential clock line, the clock is disabled after the control information is passed to the AIU 103. Similarly, a clock associated with the tune bus 228 can be turned off after passing tuning and/or other type of control information from the digital submodule 106 to the analog submodule 104.

The analog and digital submodules 104 and 106 of the PCRM 100 (and those of the PCTM 102) are preferably implemented on separate circuit boards. For purposes such as fabrication, testing, etc., the analog and digital submodules 104 and 106, respectively, can reside on the same circuit board but with electrically isolated analog and digital portions. Alternatively, each submodule (104 and 106) may be multiple physically separate circuit boards properly connected. "Circuit board" is a general term encompassing numerous forms of containment such as "chips," application-specific integrated circuits (ASICs), monolithic hybrid packages (MHPs), etc.). In this example, an analog portion would include elements of the analog submodule and the A/D converter portion 106a, including the ADCs 200 and 202, from the digital submodule 106, in this example, the digital processing portion 106b. The digital portion would include the remaining elements of the digital submodule 106.

The ADCs are necessarily a part of the analog portion. The ADCs 200 and 202 are powered from the analog power source and are electrically isolated from the other elements of the digital submodule. A reference signal (e.g., 120 MHz) is transmitted from the analog submodule 104 to the ADCs of the digital submodule 106, is suitably divided (e.g., by 3 to 40 MHz) and is transmitted via differential lines to the digital processing portion 106a with its separate power/ground system of the digital submodule 108. These ADCs 200 and 202 could be, for example, on an analog submodule board of PCRM 100. However, in this example, the ADCs 200 and 202 were included on the digital submodule board for space considerations.

Regardless of the specific mechanical configuration of the analog and digital submodules 104 and 106, respectively, the analog and digital portions are electrically isolated from each other in order to prevent relatively noisy digital circuits from creating unwanted extraneous signals within sensitive analog circuits. A conductive shield and possibly a frame of a material, such as mu-metal or aluminum, is preferably provided between the boards. Analog signals between the boards are generally not transmitted over coaxial cables.

To provide further isolation, the digital and analog portions preferably have separate power sources and ground lines (different ground planes) to prevent noise and ground loop problems through the power supply. To further prevent noise problems digital signals transmitted between the analog and digital portions and external connections, are differential (dual rail) signals. In addition, high-speed digital clocks associated with digital circuitry in the analog submodule 104, such as a clock for the tune bus 228, are turned off during signal reception.

The above isolation and power/ground considerations enable high speed (e.g., 40 MHz) digital circuits to be placed in the same relatively small box as the sensitive analog receive module elements.

An explanation of the use of the external bus connections is now given. For further explanation of the external bus connections described below refer to the related U.S. disclosure entitled DIGITALLY PROGRAMMABLE MULTI-FUNCTION RADIO SYSTEM ARCHITECTURE.

The system bus 116 is primarily used to:

(1) Pass demodulated message data from the PCRM 106 to the external device 112, such as a computer, associated units, and/or to other external devices not shown;

(2) Pass control data (frequency channel, antenna selection, etc.) and radio application software programs from an external controller (e.g., computer 112) to the PCRM 100; and (3) Pass channel status information collected in the PCRM 100 to the external controller 112. In some applications, the system bus 116 can serve as a multiple access message (i.e., intercom) bus among various radio channels and various external user stations (not shown) coupled to the system bus 116.

In other applications, and as explained in the related U.S. disclosure DIGITALLY PROGRAMMABLE MULTI-FUNCTION RADIO SYSTEM ARCHITECTURE, an output of the PCRM 100 may first pass through another module which is dedicated to a same channel to perform additional message processing and/or security functions such as decryption on the relatively low-speed serial bit stream. As explained in the related U.S. disclosure entitled DIGITALLY PROGRAMMABLE MULTIFUNCTION RADIO SYSTEM ARCHITECTURE, if bus traffic warrants, the system bus 116 can be physically partitioned into separate buses, e.g., for control/status, one or more buses for message data to and from information terminals, and spare buses for redundancy. (For additional description of system bus partitioning, please refer to the related U.S. disclosure entitled DIGITALLY PROGRAMMABLE MULTIFUNCTION RADIO SYSTEM ARCHITECTURE and COMMON TRANSMIT MODULE FOR A PROGRAMMABLE DIGITAL RADIO.)

The system bus 116 is preferably differential (i.e., dual rail) for better noise immunity; however, the system bus 116 can also be configured as single ended for some applications by bypassing line transceivers 217 in the digital submodule 106 associated with the system bus 116. Also, the system bus 116 is preferably configured to be asynchronous, i.e., performing a UART (Universal Asynchronous Receiver/Transmitter) function, although the system bus 116 can also be synchronous by providing an associated clock line.

An AIU control bus 130 is a bidirectional bus that, depending upon the radio application, passes control information to the associated AIU 103 in the same channel, to include, for example: initiation of built-in-test (BIT), filter tuning information, automatic gain control settings based upon received signal level, and relatively slow switching either for antenna selection or for the distribution of the AIU RF output to various PCRMs 106(n). Also, the AIU bus 130 passes information (e.g., BIT status) from the AIU 103 to the PCRM 100 and ultimately to the external controller 112.

When implemented for a particular radio function, a transpond bus 118 can be used for various purposes such as for a radio transponder which is described later herein as well as in the related U.S. disclosure entitled DIGITALLY PROGRAMMABLE RADIO MODULE FOR TRANSPONDER SYSTEMS. Additionally, usage of the transpond bus 118, such as in a radio repeater application, is explained in the related U.S. disclosure entitled DIGITALLY PROGRAMMABLE MULTIFUNCTION RADIO SYSTEM ARCHITECTURE.

Depending upon the application, the transpond bus 118 may be a serial or multibit parallel bus (e.g., of several bits) and of differing speeds (e.g., 10 MHz). The FPGAs 212 and 214 may, for example, format a digital bit stream in the appropriate format and line drivers (e.g., transceivers, receivers) and provide differential connections for improved noise immunity. The transpond bus 118 is preferably configured to be asynchronous, e.g., performing a UART (Universal Asynchronous Receiver/Transmitter) function.

As explained in the related U.S. disclosure entitled DIGITALLY PROGRAMMABLE MULTIFUNCTION RADIO SYSTEM ARCHITECTURE, in a rare case where the digital submodule 106 has insufficient processing capacity to perform a higher level of signal processing directly on a received waveform prior to demodulation and subsequent reduction to a relatively low-speed serial bit stream output, the applique buses 134a and 134b connect the PCRM 100 and the PCTM 102 to an optional applique module 140. In this case, the applique module 140 will perform a higher level of signal processing, such as for waveforms of low probability of detection (LPD) type. The input/output configuration of the applique buses 134a and 134b is similar to that of the transpond bus 118, in that the applique buses 134a and 134b are multi-bit parallel buses of moderate speed (e.g., 10 MHz), and preferably asynchronous. Further, the external connections are differential for improved noise immunity.

Depending upon the applique application selected to be performed by the applique module 140, various routing and processing options are available. For example, a (nominally wide band) signal received and routed through the analog submodule 104 to the wide band ADC 200 can be connected directly to the applique bus 134a and to the applique module 140 through the switch 204, the FPGAs 206 and 212, and the transceivers 217. Alternatively, desired preprocessing of the signal output from the WB ADC 200 can be performed by any of the processing elements such as the DDC 210, the PDFU 230 or the DSP 216. After being processed in the applique module 140, the signal can either pass directly to the system bus 116 or the signal can be routed back to the PCRM 100 for additional processing before being routed to the system bus 116. Other routing options are also possible based on the interconnection wiring among the various modules in the overall system.

A tune bus 228 passes control information from the digital submodule 106 to the analog submodule 104. The tune bus 228 is preferably configured to be synchronous. A differential control line bus pair plus a differential clock signal may be sent along a separate line pair (not shown), although the tune bus 228 could also be configured to be asynchronous if desired. If the differential clock signal is used, it is turned off after data transfer to prevent corruption of the sensitive analog circuits of the analog portion of the PCRM 100 during signal reception.

As noted previously, not all external buses are used for every radio application. In addition, those of skill in the art can configure the FPGAs to supply interfaces with other units, where such interfaces may be serial or parallel, unidirectional or bidirectional, synchronous or asynchronous as warranted, to include both standard or custom protocols. I/O pins may be included on a PCRM I/O connector. These I/O pins can be utilized as any of the buses noted herein or as additional buses defined by the user. How the buses are employed, their physical implementation as serial or parallel, and connections to other modules may be determined by a module interconnection scheme (e.g., wiring harness, backplane) used by a system application desired by a user.

Figure 4A:
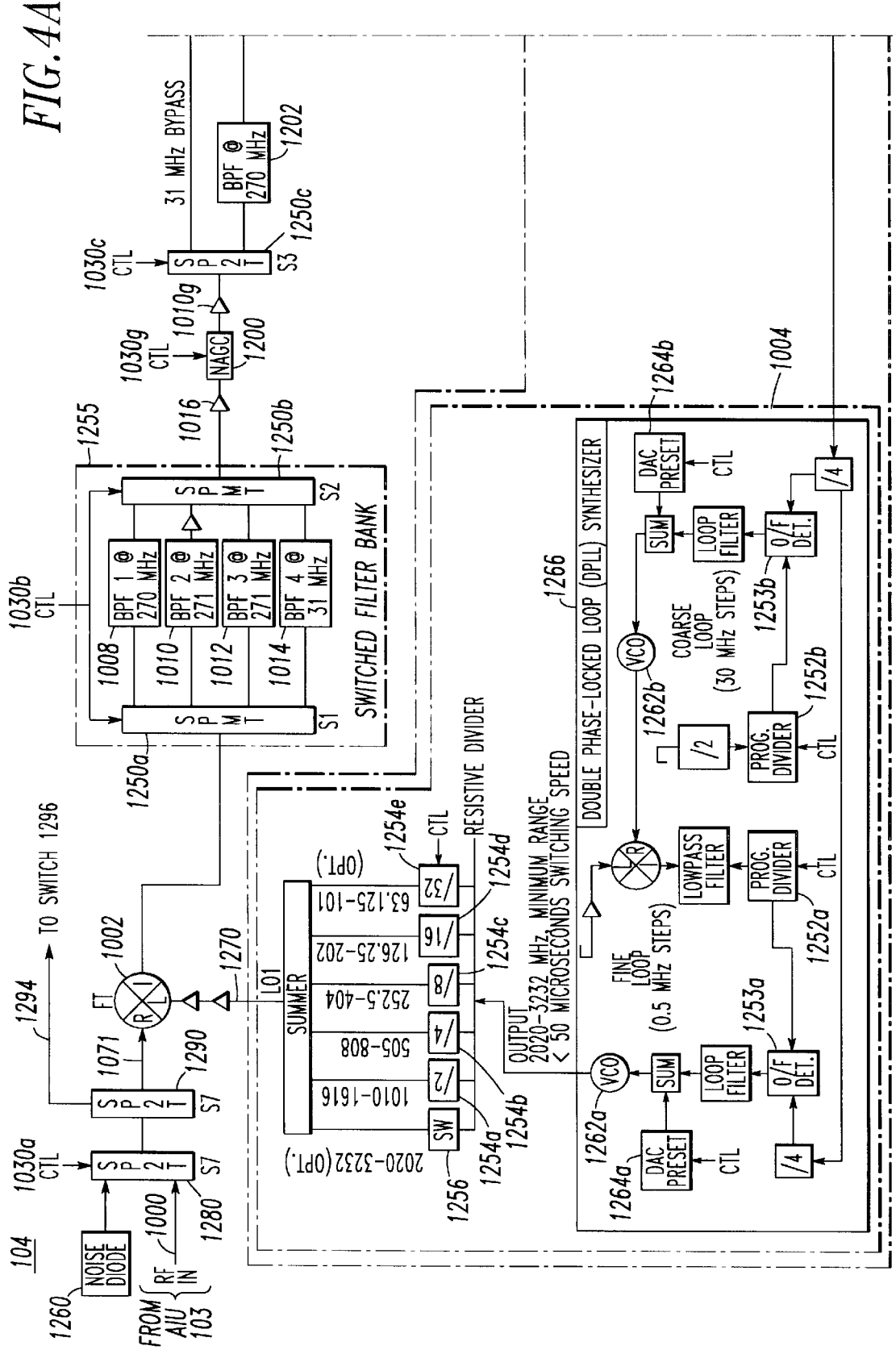
FIGS. 4A and 4B are a block diagram of an analog submodule of programmable common receive module in the digital programmable radio.
Figure 4B:
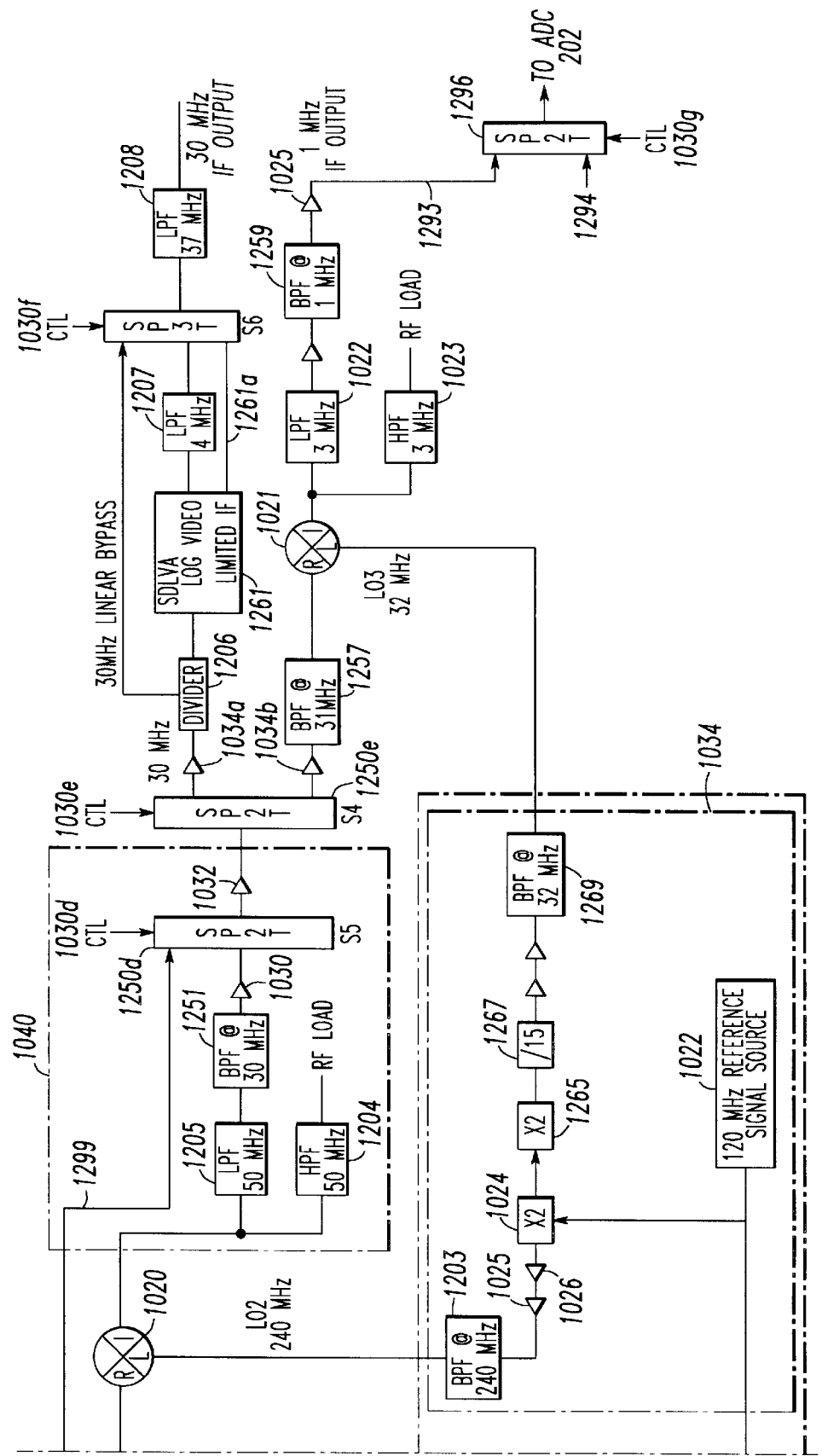

FIGS. 4A and 4B are a block diagram of the analog submodule. An RF/IF conversion scheme for reception of a signal in an approximate input frequency range of 2–2000 MHz is described in the related U.S. disclosure entitled WIDE-BAND RADIO-FREQUENCY CONVERTER HAVING MULTIPLE USE OF INTERMEDIATE FREQUENCY TRANSLATORS.

Control of the analog submodule via tune bus 228 is now described. After receiving tuning information and/or built-in test (BIT) initiation from the system bus 116 via the FPGA 212 of the digital submodule 106 (FIGS. 3A and 3B) and the local bus 218, the DSP 216 of the digital submodule 106 (FIGS. 3A and 3B) calculates and proportions tuning between an NCO 254 in the DDC 210 of the digital submodule 106 (shown, for example, in FIG. 8A), and a tunable local oscillator #1 (LO1) 1004 in the analog submodule 104, shown in FIG. 4A. The DSP 216 (FIG. 3A) uses the tuning information for the analog submodule 104 to determine, preferably using a lookup table although calculations may be used, control settings for switches 1250a through 1250f, programmable dividers 1252a and 1252b.

Additionally, the DSP 216 (FIG. 3A) uses the tuning information to determine on/off settings for output dividers 1254a, 1254b, 1254c and 1254d and optional divider 1254e and switch 1256. If BIT initiation is also requested, a switch 1280 is controlled such that a noise diode 1260 supplies an input test signal through various paths of the RF/IF frequency translator chain. In addition, based upon either a tuning versus control voltage estimate or actual calibration data from voltage-controlled oscillators (VCOs) 1262a and 1262b, the DSP 216 (FIG. 3A) calculates and determines digital control inputs to digital-to-analog converters (DAC preset) 1264a and 1264b to provide rapid preset tuning voltages for VCOs 1262a and 1262b. As a result, rapid tuning for a double phase-locked loop (DPLL) synthesizer 1266 is also provided. Implementation of rapid tuning presets for phase-locked loops is well known to those of skill in the art.

Further, settings of any automatic gain control within the RF/IF frequency translator chain (e.g., control of NAGC 1200) or a gain control element in the AIU 103 is also determined based upon signal level measurements, in the DSP 216 of the digital submodule 106 (FIGS. 3A and 3B).

As shown in FIGS. 3A and 3B, control information such as described above is passed to the FPGA 214 in the digital submodule 106 over, for example, the local bus 218, formatted into a serial bit stream and passed through a differential line transceiver in the transceivers unit 215 to the tune bus 228. The information on the tune bus 228 is received by a control interface 240 in the analog submodule 104.

Figure 5:
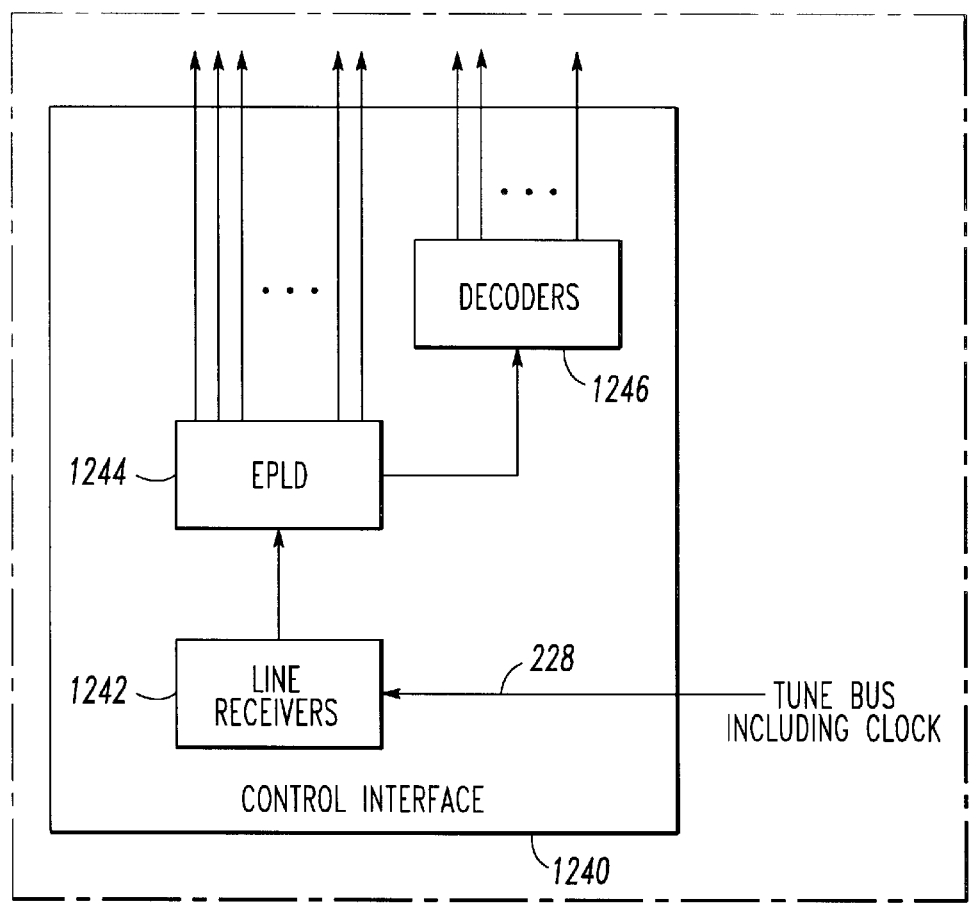
FIG. 5 is a block diagram of a control interface in the analog submodule.

As shown in FIG. 5, the control interface 240 is preferably comprised of line receivers 1242 such as, for example, an SN751570 available from Texas Instruments; an electronically programmable logic device (EPLD) 1244 such as, for example, a CY7C343 available from CYPRESS; and a decoder 1246 such as, for example, a 74LS139 available from Texas Instruments. Control outputs from either the EPLD 1244 or the decoders 1246 are distributed to various controlled elements of the analog submodule 104 described above. Such distribution and control are well known to those of skill in the art.

In addition, (not shown) a separate differential clock signal for the tune bus 228 may also be sent from the digital submodule 106 to the EPLD 1244 in analog submodule 104. After passing the control information from the digital submodule 106 to the analog submodule 104 via the tune bus 228, an associated differential clock signal is turned off during signal reception to avoid clock contamination of the relatively sensitive analog circuits.

Also not shown are return signals that those of skill in the art can implement to enhance operation of the PCRM 100. For example, one of these return signals could be a status signal indicating lock up of the DPLL 1226. In this example, the status signal is obtained from a programmable divider 1252a (such as contained in Qualcomm part 3036 which also contains a phase/frequency detector 1253a) and is passed through an ECL gate (not shown) and sent back to the digital submodule 106 as a differential signal for improved noise immunity. Ultimately, the differential signal is passed on to a system indicator (not shown) associated with a system controller such as the computer 112.

The analog submodule 104 also contains anti-aliasing filters to process received signals before delivery to the ADCs 200 and 202 in the digital submodule 106.

Specifically, a primary anti-aliasing filter preceding the WB ADC 200 is bandpass filter (BPF) 1251 located in the analog submodule 104. BPF 1251 is preferably chosen to have a passband bandwidth of 8 MHz but can be chosen with a wider or narrower bandwidth depending upon the selected group of application. A primary anti-aliasing filtering preceding the NB ADC 202 for this process is bandpass filter (BPF) 1257 (preferably 800 KHz) located in the analog submodule 104, although the appropriate path BPF either in a switched filter bank 1255 (e.g., approximately 100 KHz, 200 KHz or 400 KHz depending upon the application) and BPF 1259 (preferably 400 KHz) also provide a degree of anti-aliasing.

Additionally, those of skill in the art can utilize the programmability of the hardware described herein to include additional interconnections between the digital submodule 106 of the PCRM 100 (via the digital processing portion 106*b*) to the analog submodule 104 of the PCRM 100.

The present configuration of the PCRM 100 allows for execution of built-in tests. Built-in test (BIT) can be easily performed on the entire PCRM 100. For example, referring to FIG. 3, an external source such as that associated with the computer 112, would request BIT for the PCRM 100. The BIT request is passed to the DSP 216 via the system bus 116, one of the line transceivers in the line transceiver package 217, the FPGA 212, and the local bus 218. The DSP 216 then initiates the request. The noise diode 1260 (FIG. 4A) inputs a noise test signal via switch 1280 in analog submodule 104.

The noise test signal is routed through the RF/IF chain of the analog submodule 104, to one of the ADCs 200 or 202. The noise test signal is further routed through various paths which may include, for example, the DDC 210, the PDFU 230, the FPGAs 206, 212, 214, the FLASH 222, the RAM 220, or the DSP 216. The PCRM 100, or portions thereof, is then determined to be functional or not functional depending upon whether the signal generated by noise diode 1260 is ultimately received in digital submodule 106 and a receive-signal indication given to computer 112.

The unique, flexible and functionally efficient digital processing architecture includes the functionality such as that provided by units such as the DDC 210, the FPGAs 206, 212 and 214, the PDFU 230, the DSP 216, the FLASH 222 and the RAM 220, as described herein, which can be programmed by those of skill in the art, particularly with the application notes available with these various units, to perform various processing functions on various type signals, including signals associated with various NB and WB radio functions, where the processing functions include, for example, I/Q partitioning, frequency translation, decimation, filtering, and waveform demodulation of any combination of amplitude, frequency and phase modulation, pulse width and interval detection and discrimination, mode (e.g., interrogated mode) decoding, signal reformatting, signal correlation, fine frequency hopping (coarse frequency hopping is performed in the analog submodule 104), squelch, channel control (e.g., gain, signal path switching, tuning) in both the digital submodule 106, analog submodule 104 as well as the associated AIU 103, bit synchronization, bit stream decoding including error detection and/or correction, flexible I/O configuration for all interfaces both internal to the PCRM 100 and to external units, management/configuration of all the PCRM 100 resources, and BIT control/reporting. Additionally, although sometimes performed elsewhere, the PCRM 100, depending upon the processing power implemented, can perform message processing including reformatting, network functions, deinterleaving, processing of low-data rate speech algorithms, and formatting for various terminals such as displays. All of these example processing functions as well as other achievable processing functions can be quickly reprogrammed under internal or external control over a wide range of parameters.

For example, the Programmable Common Digital Receiver 100 may perform CNI radio applications such as, for example, Instrument Landing System (ILS), Air Traffic Control Radar Beacon System (ATCRBS) and VHF AM radio which are discussed in more detail hereinafter.

The ILS discussion gives an example of processing associated with time-multiplexed amplitude modulated narrow band signal functions. The ATCRBS discussion gives an example of processing associated with pulse modulated wide band signal functions. The VHF AM discussion gives an example of processing associated with a voice-modulated function.

Also see the related U.S. disclosure entitled WIDEBAND RADIO-FREQUENCY CONVERTER HAVING MULTIPLE USE OF INTERMEDIATE FREQUENCY TRANSLATORS for a description of the signal flow for a wide variety of radio functions, including the above radio functions, through the analog submodule 104. Those of skill in the art can program the digital submodule 106 to process the signals output by the analog submodule 104, such that the overall PCRM 100 can receive, process and demodulate a wide variety of signals of any combination of amplitude, frequency and phase modulation, including signals associated with a wide variety of NB and WB radio functions.

Additional modifications easily made by one skilled in the art include, for example, as shown in FIGS. 3A and 3B, the programmable digital unit(s) (PDFU) 230, such as, for example, an HSP 43124 available from Harris Semiconductors. The PDFU 230 may be used to obtain additional programmable filter parameters independent of filter parameters in the DDC 210 that are tied to DDC decimation rates. These PDFUs 230 may provide such filtering more efficiently in hardware than can be provided in the DSP 216. By connecting the PDFU 230 to the FPGA1 206, for example, which serves as a signal reformatting and routing unit, the PDFU 230 can be inserted at various locations in the signal flow. For example, the PDFU 230 could receive a signal from one of the ADCs 200 and 202, provide an output to one of the various buses, such as, for example, the system bus 116, and the transpond bus 118 through the FPGA2 212.

In this example, the PDFU 230 HSP43124 is a serial I/O unit for size considerations. Additionally, the FPGA1 206 functions as a parallel-to-serial (and vice versa) converter. However, a parallel I/O PDFU unit could be employed to reduce overall delay time. Although, in this example, the hardware to be resident in every digital submodule, the hardware used may depend on the system application if desired. Further, depending on the system application to be performed, specific hardware units may be changed, added or eliminated.

Additionally, improved analog units may be located in the analog submodule 104 and improved digital units may be located in the digital submodule 106, for example, to reduce size, cost and power dissipation, or to improve performance such as finer tuning steps in the tunable LO1 1004 (FIG. 4A) in the analog submodule to reduce the required filter width in the analog RF/IF filters. A/D converters of faster sampling rates and/or higher dynamic range may also be issued.

A method for extending the frequency coverage of analog submodule 104 given in the related U.S. disclosure WIDEBAND FREQUENCY CONVERTER HAVING MULTIPLE USE OF INTERMEDIATE FREQUENCY TRANSLATORS below 1.5 MHz down to at least 1 KHz. This extends frequency coverage of common receive module 100 to at least 1 KHz, which enables RF functions such as Omega navigation, Loran-C and Automatic Direction Finding (ADF) to be serviced. With reference to FIG. 4, the RF input to analog submodule 104 is received from an AIU, such as AIU 103, which is tailored to condition specific RF functions as described in the related U.S. disclosure DIGITALLY PROGRAMMABLE MULTIFUNCTION RADIO SYSTEM ARCHITECTURE. This conditioning for all radio functions, including those below 1.5 MHz, generally includes, as a minimum, RF filtering and, if needed for the particular RF function(s) being serviced, may also include signal amplification and control of channel gain.

The RF input passes through SP2T switch 1280 as described in the related U.S. disclosure WIDE-BAND FREQUENCY CONVERTER HAVING MULTIPLE USE OF INTERMEDIATE FREQUENCY TRANSLATORS. The output switch 1280 is connected to an input of SP2T switch 1290. The switch 1290 has two outputs, one of which, 1071, passes to frequency translator 1002 and which is used to service the RF functions between approximately 1.5 MHz and 1870 MHz as described in the related disclosure. Also, instead of transmitting the 1 MHz output, described in the related disclosure, directly to the 14-bit ADC 202 in digital submodule 106, the 1 MHz output 1294 is connected to the input of SP2T switch 1296.

When servicing the RF functions described in the related disclosure, external commands such as from computer 112 are passed to digital submodule 106 in a manner similarly described and then relayed to analog submodule 104 via tune bus 228. Control interface 240 then commands switch 1296 to connect output 1294 to the 14-bit ADC 202. On the other hand, when servicing RF functions below 1.5 MHz, external commands flow in the same manner except that switch 1296 is commanded to connect output 1294 of switch 1290 to the 14-bit ADC 202, in which case the RF input 1000 is connected to the 14-bit ADC 202. Because ADC 202 is sampled as 4 MHz, it can service RF functions below 1.5 MHz.

Also described in the above two related disclosures is a method for extending the upper frequency range of the programmable common receive module 100 above 1870 MHz to 3500 MHz.

Another change might be, for example, to change the line receiver 1242 (FIG. 5) in the analog submodule 104 to a line transceiver similar to one located in the line transceivers unit 215 (FIG. 3) such that information from the analog submodule 104 could be passed back to the digital submodule 106 along the tune bus 228 for status or processing purposes.

Functional unit capacity can be added, either through additional or larger capacity units such as the DDC 210, the PDFU 230, the FLASH 222, the RAM 220, the DSP 216, and the FPGAs 206, 212 and 214. Additional capacity could be added to transceivers such as 215 and 217 for additional I/Os to external units or between the analog submodule 104, digital to analog converter portion 106a and the digital processing portions 106b of the PCRM 100. Moreover, any or all of these functional units such as the FPGAs 206, 212 and 214, or the ADCs 200 and 202 could be consolidated into units of larger functional usage, in order to reduce overall size and also to reduce costs such as resulting from fewer parts count and large scale manufacturing of units that are common among a wide variety of radio applications and a wide variety of integrated system applications.

Specifically, as technology improves it is anticipated that the ADCs 200 and 202 of the PCRM 100, can be replaced by a dual mode ADC that can operate at both of the required rates or perhaps at a single rate (e.g., the 40 MHz rate) provided the NB ADC 202 dynamic range requirements can be met for the NB signals, such as by using the AD9042 available from analog devices which provides 12 bits at 40 Mhz. In this latter case the 40 MHz sampling rate is decimated to 4 MHz to maintain compatibility with the digital down conversion and to approximately maintain the same dynamic range (via the decimation process) as the 14-bit NB ADC. Moreover, a higher speed ADC such as AD 9042 could also be used to sample both the WB IF output (e.g., at 30 MHz) and the NB IF output (e.g., at 1 MHz) and thus require only a single ADC. The higher dynamic range of this high-speed (e.g., 40 MHz) ADC would be sufficient to eliminate a sequential detection log video amplifier (SDLVA) 1261 and associated circuitry in analog submodule 104 (FIG. 4). However, an IF limiter could still be employed to replace the limited IF output 1261a. Also, use of a higher (e.g., 40 MHz) sampling rate for the 1 MHz IF output path instead of a lower (e.g., 4 MHz) sampling rate does not necessitate that LO3 signal input to multiplier 1021 (FIG. 4B) be an exact multiple (e.g., 32 MHz) of the lower sampling rate to cause aliased ADC sample harmonics to fall at zero Hz, thus simplifying LO3 (in this example allowing LO3 to be equal to 30 MHz) and replacing the relatively complex circuits of the multiplier 1265 and the divider 1267 with a simpler divide-by-4 (not shown). In this latter case, a band pass filter (BPF) 1269 at 32 MHz would be replaced with a BPF at 30 MHz. In addition, as technology improves it is anticipated that the A/D conversion can be done prior to various downconverting stages performed in the analog submodule 104.

Additionally, the DSP 216 may include more than one processor depending on the desired functions to be performed.

The individual functions described herein of the reconfigurable format unit, which is, for example, comprised of the FPGAs 206, 212 and 214, can be modified or rearranged among the different FPGAs by the programmer. Additionally, the functionality described herein can also be included into a single large FPGA when such single large FPGA exists. Further, a single or multiple FPGAs can be programmed by those of skill in the art, particularly with the application notes available with these units, to perform not only the functions previously described for the FPGAs 206, 212 and 214 but, as later noted, other functions in conjunction with the unique, flexible and functionally efficient digital processing architecture described herein consisting of the various functionality provided by units such as the DDC 210, the FPGAs 206, 212 and 214, the PDFU 230, the DSP 216, the FLASH 222 and the RAM 220.

Moreover, FPGAs need not be used, but instead, any devices which perform these types of functions may be substituted. As noted previously, not all external buses are used for every radio application. In addition, those of skill in the art can configure the FPGAs to supply interfaces with other units, including the interfaces described previously, where such interfaces may be serial or parallel, unidirectional or bidirectional, synchronous or asynchronous as warranted, to include both standard or custom protocols. The I/O pins are included on a PCRM I/O connector, and these pins can be utilized as any of the buses noted herein or as additional buses defined by the user. How the buses are employed, their physical implementation as serial or parallel, and their connections to other modules are determined by the module interconnection scheme (e.g., wiring harness, backplane) that is employed by the system application desired by the user.

None of the above changes, additions or deletions of any of the functionality for reasons such as improved performance, size, cost or power dissipation will invalidate the unique analog/digital architecture disclosed herein, in particular the unique, flexible and functionally efficient flexible digital processing architecture disclosed herein.

Instrument Landing System (ILS) Application

In ILS processing, three radio functions, namely Localizer (LOC), Marker Beacon (MB) and Glideslope (GS), are time interleaved in an RF signal received by the PCRM 100.

Prior to operation, the configuration programs for the LOC, MB and GS radio functions comprising the ILS application are placed in the RAM 220 as previously explained, either by downloading from external memory over the system bus 116 or from the FLASH memory 222. These three radio functions are time interleaved into RF signals received and processed by the PCRM 100.

The analog submodule 104 and the digital submodule 106 are each sequentially configured and tuned to route and process each of the ILS radio functions in a repetitive time multiplex sequence described later. For example, the analog submodule 104 is sequentially configured and tuned to receive each ILS function signal, frequency translate each ILS function signal, and route the translated ILS function signal to the NB IF output at preferably 1 MHz. (Functional routing through the analog submodule 104 of a wide variety of radio functions, including the ILS radio functions, is described in the related U.S. disclosure entitled WIDE-BAND RADIO-FREQUENCY CONVERTER HAVING MULTIPLE USE OF INTERMEDIATE FREQUENCY TRANSLATORS.)

The translated ILS function signal is passed to an ADC, such as the NB ADC 202, preferably sampled at 4 MHz. As previously described, the translated ILS function signal could be sampled at higher rates, for example in an ADC sampled at 40 MHz that replaces both the WB ADC 200 and the NB ADC 202 with a single unit. A converted ILS signal is passed to the digital processing portion 106b of the digital submodule 106 which is also sequentially configured to process the same radio function passed through the analog submodule 104. A signal of each selected function of the ILS application is received for a preset amount of time. The analog submodule 104 and the digital submodule 106, are then reconfigured to a new selected ILS radio function and the new selected function is received for a preset amount of time. The sequence is then repeated.

Figure 6:
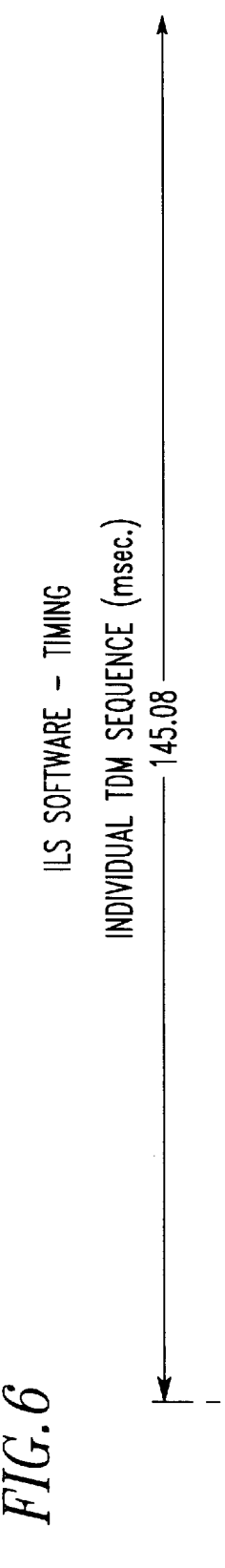
FIG. 6 illustrates an individual time division multiplexed sequence of intermediate signals for an Instrument Landing System.

FIG. 6 illustrates an example of an individual TDM (Time Division Multiplex) sequence for the processing of the ILS radio functions. The time sequence consists of "sampling" periods and "tune" periods. The sampling periods are shown as "LOCALIZER," "MB," and "GLIDESLOPE." The tune periods are shown as "TUNE."

At start-up, and based upon control information received via the system bus 116 from the control (not shown) associated with computer 112, the DSP 216 calculates, proportions and stores the tuning requirements between coarse tuning in the analog submodule 104 and fine tuning in the DDC 210 of digital submodule 106 for each of the radio functions that are time multiplexed. The analog submodule 104 and the digital submodule 106 are then configured and tuned to receive the LOC signal. In addition, during each subsequent tune period, the analog submodule 104 and the digital submodule 106 are configured (including tuning) to receive a next signal to be processed. By the end of the tune period, the PCRM 100 has been tuned to receive the desired signal, the ADC 200 is sampled at the desired rate, for example at 4 MHz, and the DDC 210 is downconverting and decimating (i.e., reducing the sample rate) as later described.

No start bits or framing bits are required to initiate or synchronize the ILS processing. Synchronization of hardware in the PCRM 100 is accomplished by allowing enough time in the tune period for the hardware to reconfigure for a new operating mode. The sampling periods for LOC, GS and MB end when a desired number of samples are received, which may differ for each radio function. The length of the tune period is controlled by timer interrupts generated in the DSP 216. When a timer runs out, the tune period ends and a next sampling period begins.

In this example, at start-up, as previously noted, the analog submodule 104 and the digital submodule 106 are configured and tuned to receive the LOC signal. Processing begins with a 33.36 msec LOC period. A 6.5 msec tune period follows. During this tune period, the LOC processing completes and the analog submodule 104 and digital submodule 106 are configured to receive the MB signal. A 10 msec MB period occurs, followed by a 4 msec tune period, during which the MB processing completes and the analog submodule 104 and the digital submodule 106 are configured to receive the GS signal. A 33.36 msec GS period occurs, followed by a 4 msec tune period, during which the GS processing completes and the analog submodule 104 and the digital submodule 106 are configured to receive the LOC signal. A 33.36 msec LOC period occurs, followed by a 6.5 msec tune period, during which the LOC processing completes and the analog submodule 104 and digital submodule 106 are configured to receive the MB signal. A 10 msec MB period occurs, followed by a 4 msec tune period, during which the MB processing completes and the analog submodule 104 and the digital submodule 106 are configured to receive the LOC signal.

Figure 7:
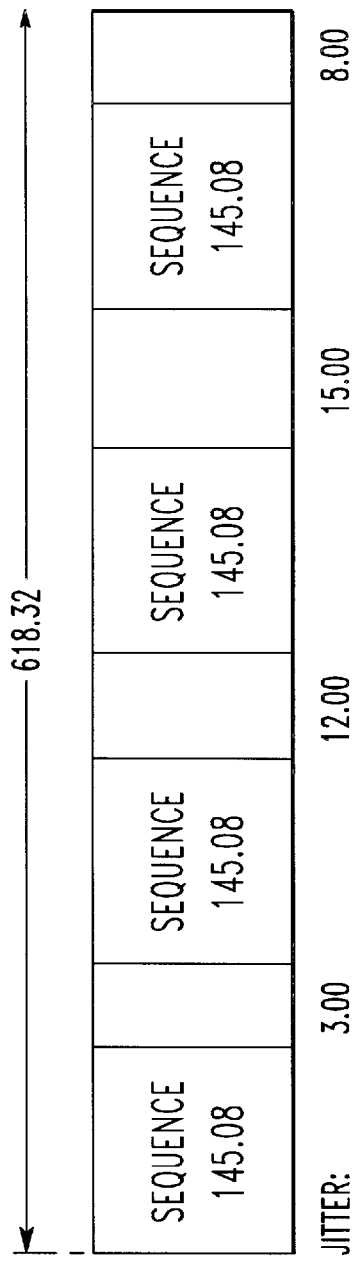
FIG. 7 illustrates a sequence repetition structure of the individual time division multiplexed sequences for the Instrument Landing System.

The LOC and MB functions require a somewhat higher cycle rate than the GS function in order to process the audio tones associated with the LOC and MB functions. An entire sequence takes 145.08 msec and is repeated as shown in FIG. 7. Four different wait periods, the values of which have been predetermined by systems analysis and comprising a "jitter", are inserted prior to starting the next sequence in order to reduce the effects of synchronous AM noise sources such as aircraft propellers. The four different wait periods likewise repeat in the same order. In this example, the four wait periods are 3 msec, 12 msec, 15 msec and 8 msec, respectively. An entire sequence repetition thus takes 618.32 msec to complete.

Figure 8A:
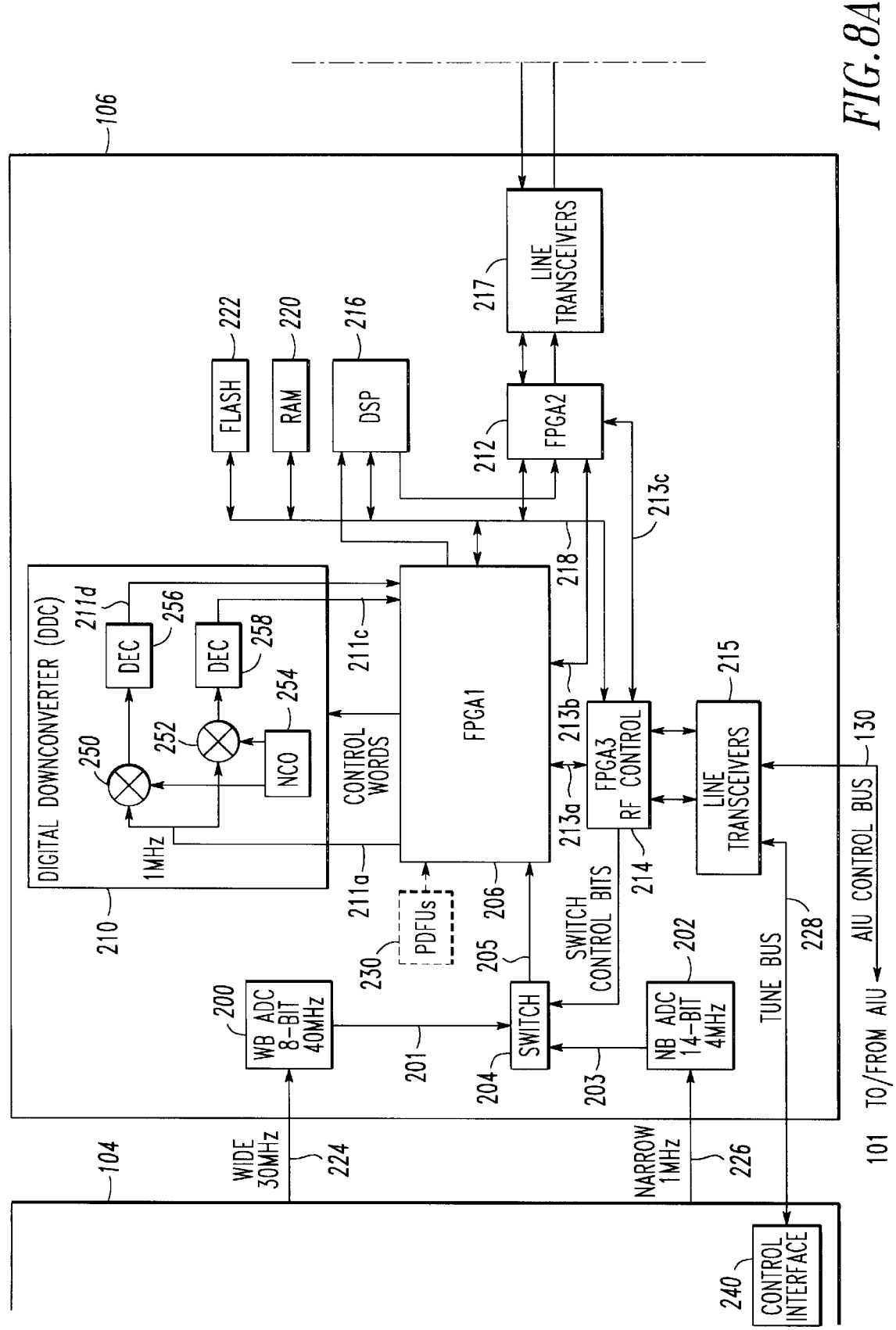
FIGS. 8A and 8B are a block diagram of a digital submodule of a programmable common receive module in the digital programmable radio configured for the Instrument Landing System.
Figure 8B:
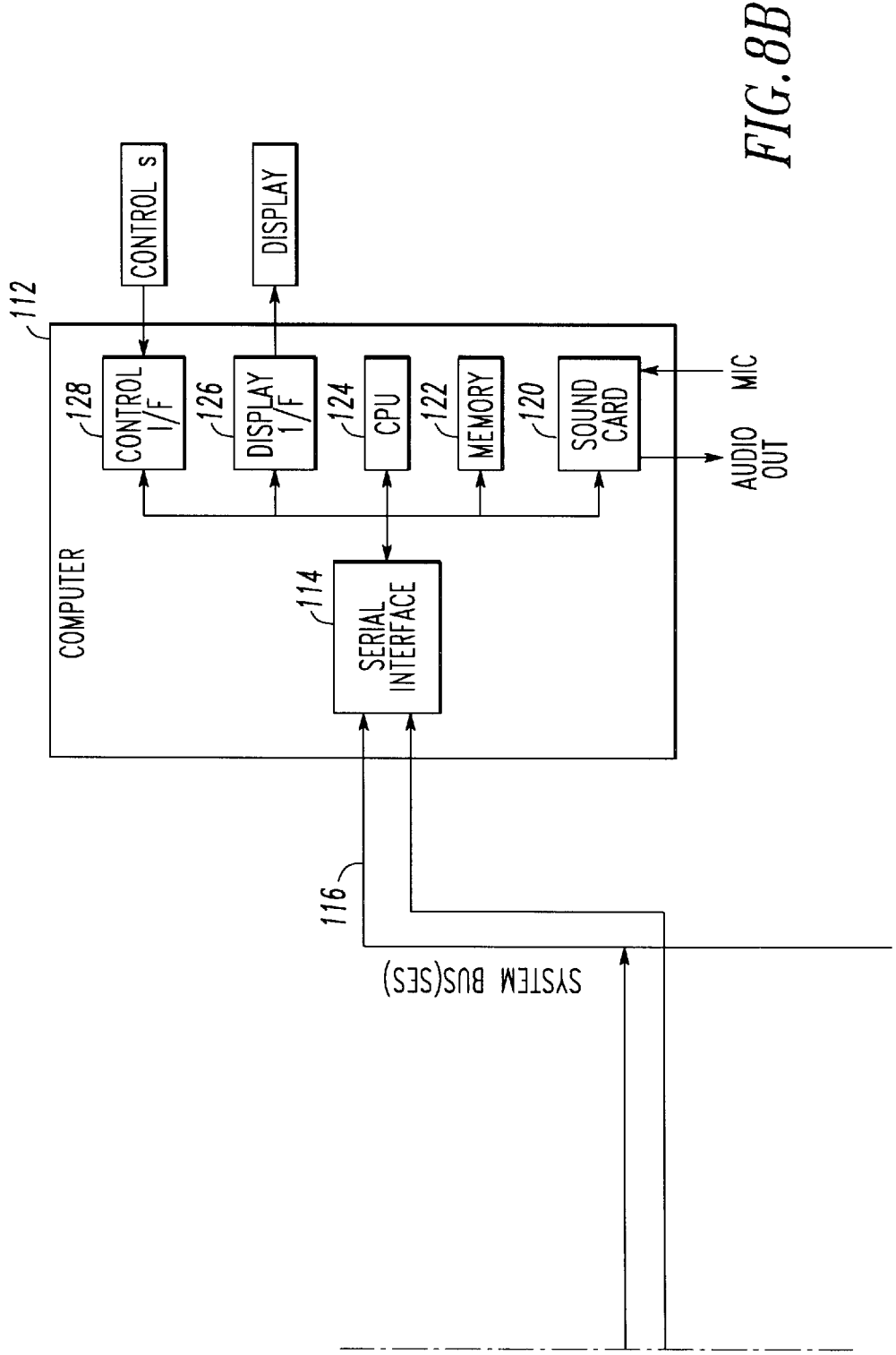

FIGS. 8A and 8B illustrates signal flow for an ILS application. Major components in the ILS digital receive signal path are the NB ADC 202, the FPGA1 206, the FPGA2 212, the FPGA3 214, the DDC 210, and the DSP 216. Although not utilized in the following embodiment, PDFUs 230 may be employed for more efficient or additional digital filtering, as previously discussed. The NB ADC 202, receives an analog input signal and outputs digital data samples. The FPGA1 206 controls data flow between the NB ADC 202, the DDC 210, the DSP 216 and, if employed, the PDFU(s) 230. The FPGA2 inputs parallel data and transmits serial output data onto system bus 116. The DDC 210 performs downconversion and decimation. For the ILS application, the DSP 216 performs signal processing, including envelope detection, filtering, AGC, Discrete Fourier Transform (DFT), threshold detection, decoding, and message formatting. Also if desired, algorithms for other functions such as automatic frequency control (AFC) can be easily implemented by those of skill in the art.

For example, AFC could be performed by routing output from the DDC 210 through the FPGA1 206 to the DSP 216 which, perhaps in conjunction with the FPGAs 206, 212 and 214, performs an AFC algorithm that derives a tuning error. The tuning error is then used to correct tuning of the DDC 210. The flexibility of the processing architecture disclosed herein permits some of these DSP operations to be performed in other units if desired such as in the FPGAs 206, 212, 214, and, if employed, the PDFU(s) 230.

The digital submodule 106, via the FPGA3 214, also controls resources of an associated channel, including the analog submodule 104 via the tune bus 228 and the AIU 103 associated with the channel via the AIU control bus 130. Such control information is either derived internally by the digital submodule 106 which provides settings for automatic gain control (AGC) based upon received signals levels, or is derived externally to provide tuning information via the system bus 116 from, for example, a control (not shown) associated with the computer 112.

All external interfaces to the digital submodule 106 through the FPGA2 212 and the FPGA3 214 are via the line transceivers 217 and 215. Use of the line transceivers 217 and 215 improves electrical isolation previously described in conjunction with descriptions of the tune bus 228 and the AIU control bus 130.

The FPGA3 214 is coupled to the local bus 218 and the tune bus 228. The FPGA3 214 performs receiver control functions in response to a control word received from the DSP 216 over the local bus 218. Software in the DSP 216 formats a tune word which includes tuning information and other information such as switch settings for IF signal routing in the analog submodule 104 and AGC levels. The DSP 216 transmits the tune word to the FPGA3 214. The FPGA3 214 then transmits the tune word data serially over the tune bus to the analog submodule 104 as previously described. In the existing embodiment the tune word is 56 bits; however, the flexibility of the processing and control architecture disclosed herein permits words of different size based upon future requirements such as finer steps in the tunable LO1 270 of the analog submodule 104. Also, different tune words can be sent at different rates for different functions. For example, a single tune word need only be sent for a PCRM that is set at a single frequency for a relatively long period. On the other hand, AGC updates may be sent at modest rates.

Similarly, control information is sent to the AIU 103 associated with the channel via the AIU control bus 130. The control information sent depends upon the overall system design for the ILS function. For example, the AIU control information can include automatic gain control (AGC) settings based upon a received signal level. Also, control signals could switch inputs from LOC, MB and GS antennas in synchronism with processing performed in PCRM 100. On the other hand, such antenna inputs may be merely added via an RF summer unit or frequency multiplexer, as is well known to those of skill in the art. However, switch control signals could route the LOC, MB and GS signals through different paths, e.g., for different filtering and amplification. In addition, in order to meet stringent interference requirements, tuning information could be supplied to tunable preselectors in the AIU 103.

After the analog submodule 104 has been tuned to the desired frequency, the analog signal is received and downconverted in the analog submodule 104 and then output. The output of the analog submodule 104 is a narrow band signal (NB) 226, preferably, for example, near 1 MHz, that is sent to an ADC such as the 14 bit, 4 MHz NB ADC 202. Data samples are routed through the switch 204 to the FPGA1 206. Data is latched into the FPGA1 206 on a low-to-high transition of a data valid signal from the ADC 202. The FPGA1 206 then outputs the latched data in its internal register to the DDC 210. Synchronization is achieved by using an input clock to the DDC 210 derived from the data valid pulse and a clock such as a 40 MHz clock.

The digital signal samples are then provided to the DDC 210 for digital down conversion. For ILS processing, the DDC 210 accepts real input data samples at selected frequency, for example a signal near a 1 MHz frequency that is sampled at a 4 MHz input sampling rate.

The DDC 210 generates pairs of in-phase (I) and quadrature phase (Q) data that are frequency downconverted (i.e., translated) to baseband (i.e., centered on DC) via a sinusoid generator, referred to as a numerically controlled oscillator (NCO) 254, which generates both in-phase (I) (i.e., cosine) and quadrature phase (Q) (i.e., sine) local oscillator signals, and I and Q digital mixers 250 and 252. The step size of a tunable LO1 270 in the analog submodule 104 is not sufficiently fine to frequency translate every LOC and GS channel (as well as channels for other radio functions) to the same frequency, for example, 1 MHz, at the output of the analog submodule 106; therefore, most LOC and GS channels will possess slightly different frequencies (e.g., offset from 1 MHz) at the input to the DDC 210. This offset is accommodated by tuning the NCO 254, which typically has more than adequate tuning resolution of less than 1 Hertz, to a frequency of the real input data sample input to the DDC 210.

The I represents the real, mixed cosine or "in-phase" part of the data and Q represents the imaginary, mixed sine or "quadrature" part of the data. The I and Q data are then decimated (i.e., the sampling rate is reduced) from the input sampling rate (e.g., at 4 MHz) to an output I/Q pair rate of 25 KHz or 50 KHz, for example, depending on the ILS processing mode. The output decimation rates are chosen to provide at least a Nyquist sampling rate for the signal bandwidths of interest, including frequency drift. For ILS, for example, these bandwidths may be 25 KHz for the LOC and MB signals, and 50 KHz for the GS signal.) Additionally, the DDC 210 includes filters, an output formatter, and control logic.

Frequency translation tuning to baseband and decimation rates are controlled by control words loaded into the DDC 210 during the tune period. The disclosed processing architecture permits various methods for loading these control words depending upon the brand of hardware elements chosen for the DDC 210 and DSP 216. For example, control data words can be downloaded in parallel format over the local bus 218 to the FPGA1 206, parallel-to-serial converted in the proper serial format, and loaded into a control I/F port (not shown) of the DDC 210 to control DDC tuning, decimation rates, number of output bits, output data format, etc., as allowed by the specific DDC hardware.

On the other hand, as in the described embodiment, the DSP 216 provides a serial output (not shown) specifically for loading control-type data to other devices such as the DDC 210. In this case the serial output from the DSP 216 may either be connected directly to the DDC 210, if the serial bus formats can be made compatible by programming the DSP 216 and/or the DDC 210, or the serial control connection can be routed through the FPGA1 206, which reformats the control data into a form suitable for the DDC 210.

Outputs from the DDC 210 are transferred back to the FPGA1 206. The DDC outputs include I/Q data and, in the preferred embodiment, a synchronization clock signal and a real control signal for each sample. The clock signal is generated by the DDC 210. The real control signal indicates whether the output data is real (I) or imaginary (Q). The I/Q data from the DDC 210 (e.g., serial 20-bit data) is received by the FPGA1 206, formatted into a data word usable with the local bus 218 (e.g., formatted via serial-to-parallel conversion into a 32-bit data word usable with the TMS-320 C31 DSP) and latched into a register in the FPGA1 206. Then, the FPGA1 206 raises a sampling interrupt in the DSP 216, signalling that a sample is available. The software in the DSP 216 responds to the sampling interrupt by reading data from an address mapped into a register in the FPGA1 206 containing the data sample. The data read from the FPGA1 206 is then stored in the RAM 220 prior to processing in the DSP 216.

Figure 9:
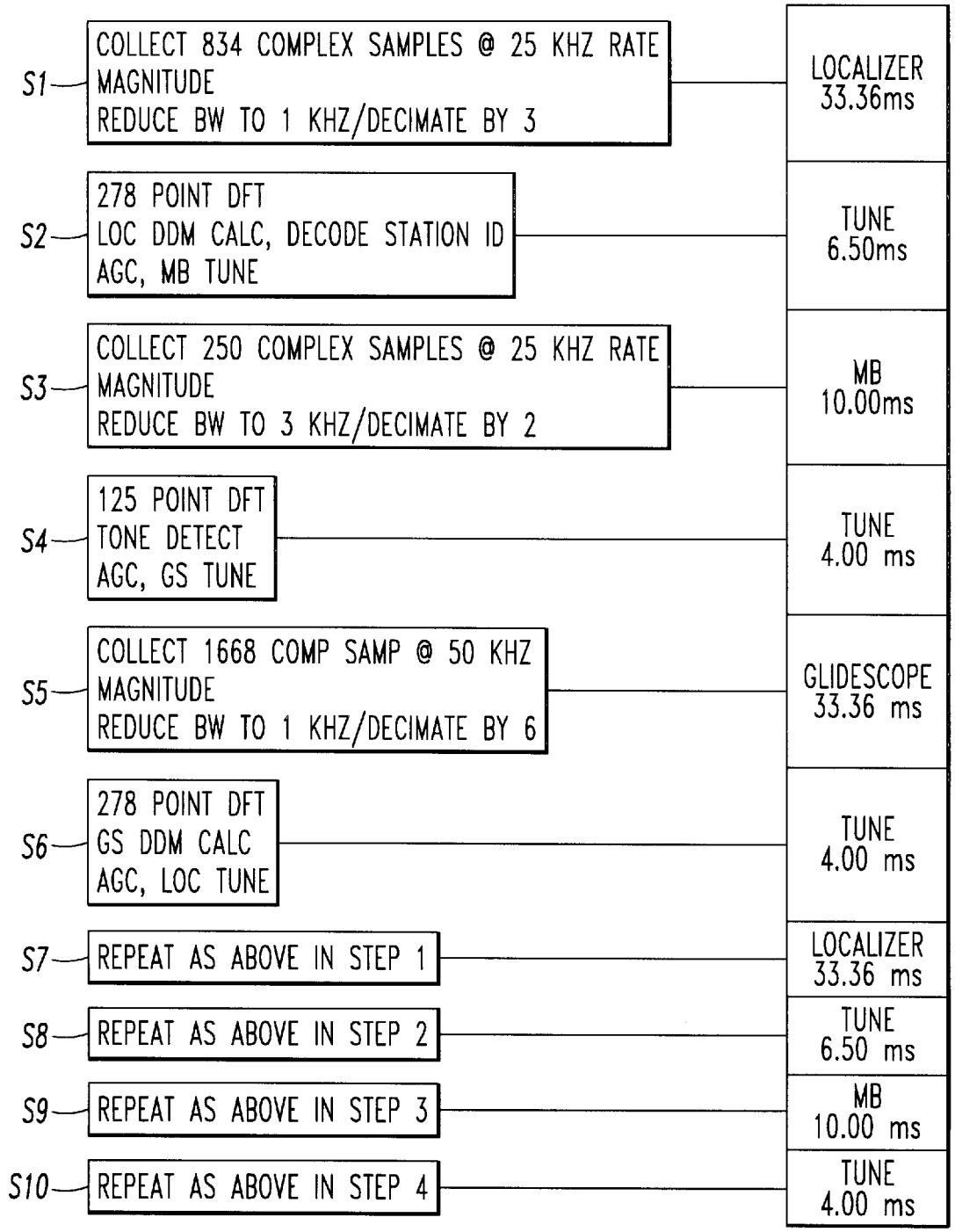
FIG. 9 illustrates an individual sequence structure of signal processing which occurs in a central processing unit configured for the Instrument Landing System.
Figure 10:
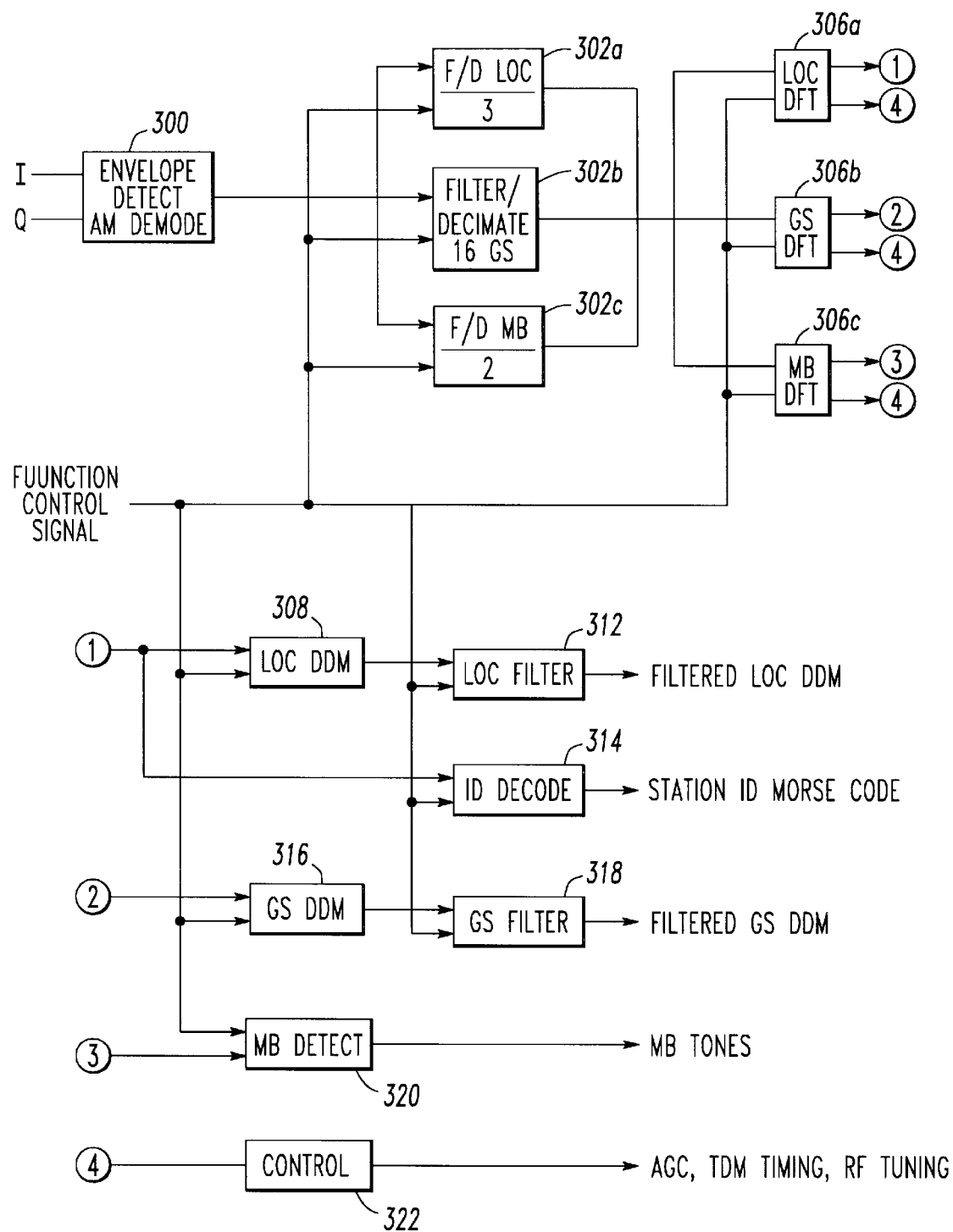
FIG. 10 illustrates signal processing which occurs in the central processing unit configured for the Instrument Landing System.

An example of processing in the DSP 216 is illustrated in FIG. 9 and FIG. 10. All of the operations noted on these figures are performed by software loaded in the DSP 216. The processing is described below for each ILS operating mode.

As illustrated in FIG. 9, in step S1 during LOC processing, sampling interrupts will occur every 20 usec, corresponding to a 50 KHz rate. A complete I and Q data pair will therefore be received every 40 usec, corresponding to a 25 KHz rate.

As shown in FIG. 10, envelope detect 300 performs an envelope detect operation on each pair of I and Q data samples. The output of the envelope detect 300 is a real-valued signal magnitude. A total of 834 magnitude samples will be collected during the 33.36 msec LOC sampling period (FIG. 9). The magnitudes are then filtered and decimated by LOC filter/decimate 302a, to reduce the number of data samples to be processed. Decimation by a factor of 3 reduces the number of magnitude samples from 834 to 278 and the sample rate to 8.333 KHz. A decimated output signal is produced.

In step S2 for LOC processing, and during the MB tune period (FIG. 9), an LOC discrete fourier transform unit LOC DFT 306a (FIG. 10) performs 278-point DFT at 0 Hz, 90 Hz, 150 Hz and 1020 Hz on the decimated output signal to produce 0 Hz, 90 Hz, 150 Hz and 1020 Hz outputs. The 0 Hz, 90 Hz, 150 Hz outputs of the DFT are supplied to LOC difference-in-depth-of-modulator, LOC DDM 308, which performs a DDM processing to produce a DDM result. The 1020 Hz DFT output is used by an identification decoder 314 to decode a station ID morse code. A DDM result from LOC DDM 308 is filtered by a LOC Filter 312 to dampen effects of any transients in the DDM result. Also, measurement of a signal level of the DDM result is used for AGC settings as desired by the user. For example, for AGC settings in the analog submodule 104 and, if desired, for AGC settings in the AIU 103 associated with the channel. The AGC settings are preferably determined by a lookup table in the RAM 220 based upon signal strength level.

Use of DFT 306a measurements for AGC will set AGC levels according to in-channel signal strength. Other signal monitoring methods for AGC are possible as desired during system design. For example, a signal level on the ADC 202 can be monitored directly, e.g., by monitoring an ADC MSB, in order to set AGC levels according to the total signal level, both in-channel and out-of-channel, incident on the ADC 202. The LOC DDM outputs are formatted and placed in a system bus message for transmission to an external ILS display device via the system bus 116. The Station ID morse code can be transmitted by various methods and as desired by the system designer according to a chosen protocol for the system bus 116. These methods include:

(1) Passing individual pulses of the station ID morse code to the external computer 112 for decoding and subsequent audio output via a sound card 120 and/or display on a display unit 126;

(2) Storing an entire station ID morse code sequence of the code pulses in the RAM 220 prior to transmitting the station ID morse code sequence to the computer 112 for decoding, etc.;

(3) Digitally forming tones and transmitting the tones to sound card 120 to produce an audio output, and, if desired, for decoding and subsequent display on display unit 126.

Also during step S2 (FIG. 9), appropriate resources in the analog submodule 104, the digital submodule 106 and the AIU 103 associated with the channel are selected and tuned under control of the DSP 216 using data transmitted over associated buses as previously described, in this case to receive and process the signal for the MB channel. Reconfiguring the FPGAs 206, 212 and 214 when time multiplexing among the LOC, MB and GS functions is not necessary.

During the next tune period for LOC, e.g., in step S6 (FIG. 9), the LOC AGC data is passed, if desired, to the analog submodule 104 via the tune bus 228 and, also if desired, to the AIU 103 associated with the channel via AIU control bus 130.

In step S3 during MB processing, sampling interrupts will occur every 20 usec, corresponding to a 50 KHz rate. A complete I and Q data pair will therefore be received every 40 usec, corresponding to a 25 KHz rate. The envelope detector 300 (FIG. 10) performs an envelope detect operation on each pair of I and Q data samples. The output of the envelope detector 300 is a real-valued signal magnitude. A total of 250 magnitude samples will be collected during the 10 msec LOC sampling period. The magnitudes samples are then filtered and decimated by a MB filter/decimate 302c to reduce the number of data samples to be processed and a decimated signal is produced. Decimation by a factor of 2 reduces the number of magnitude samples from 250 to 125 and a sample rate of the decimated signal is reduced to 12.5 KHz. The decimation factor is chosen to reduce the number of MB samples to a whole number for processing simplicity while still maintaining a sufficiently high sample rate and number of samples.

In step S4 (FIG. 9) a 125-point DFT is performed by a MB DFT 306c at 0 Hz, 400 Hz, 1300 Hz, and 3000 Hz to produce DFT results. The DFT results are used by a MB Detector 320 to detect via a threshold setting, a presence of an outer (400 Hz), a middle (1300 Hz), and an inner (3000 Hz) MB tone and thus, produce MB outputs. The MB outputs are then formatted and placed in a system bus message for transmission to the external ILS display device 126 and the external tone generator which is not shown but preferably included in sound card 120. If desired by the system application, tones can be formed digitally and transmitted to the sound card 120 similar to that described in conjunction with the VHF AM description, described later.

Additionally, if desired by the system application, AGC can be performed similar to AGC for the LOC function and AGC data can be sent to appropriate unit (e.g., analog submodule 104 and/or AIU 103) during the next MB tune period, for example in step S8 (FIG. 9). Also during step S4, appropriate resources in the analog submodule 104, digital submodule 106 and the AIU 103 associated with the channel are selected and tuned under control of the DSP 216 via data transmitted over associated buses as previously described, in this case to receive and process the signal for the GS channel.

In step S5 (FIG. 9) during GS processing, sampling interrupts occur every 10 usec, corresponding to a 100 KHz rate. A complete I and Q data pair will therefore be received every 20 usec, corresponding to a 50 KHz rate. The envelope detector 300 (FIG. 10) performs an envelope detector operation on each pair of I and Q data samples. The output of the envelope detector 300 is a real-valued signal magnitude. A total of 1668 magnitude samples are collected during the 33.36 msec GS sampling period. The magnitude samples are then filtered and decimated (GS Filter/Decimate 302b) to reduce the number of data samples to be processed. Decimation by a factor of 6 reduces the number of magnitude samples from 1668 to 278 and reduces the sample rate to 8.333 KHz.

In step S6, a GS DFT 306b performs a 278-point DFT at 0 Hz, 90 Hz, and 150 Hz. The 0 Hz, 90 Hz, 150 Hz outputs of the DFT are used by a GS DDM 316 to compute a GS difference-in-depth-of-modulation and produce a DDM result. The DDM result is filtered by a GS Filter 318 to dampen the effect of any transients in the DDM result and GS outputs are produced. The GS outputs are formatted and placed in a system bus message for transmission to an external ILS display device interface such as Display I/F 126. If desired by the system application, AGC can be performed similarly to that performed for the LOC function and AGC data can be sent to an appropriate unit (e.g., the analog submodule 104 and/or the AIU 103) during the next MB tune period. Also during step S6, appropriate resources in the analog submodule 104, the digital submodule 106 and the AIU 103 associated with the channel are selected and tuned under control of the DSP 216 via data passed over the associated buses as previously described, in this case to receive and process a signal for the LOC channel.

Steps S7 through S10 repeat steps S1 through S7, respectively, with the entire sequence of steps S1 through S6 being repeated during a period the digital submodule is configured for the ILS application.

Figure 11:
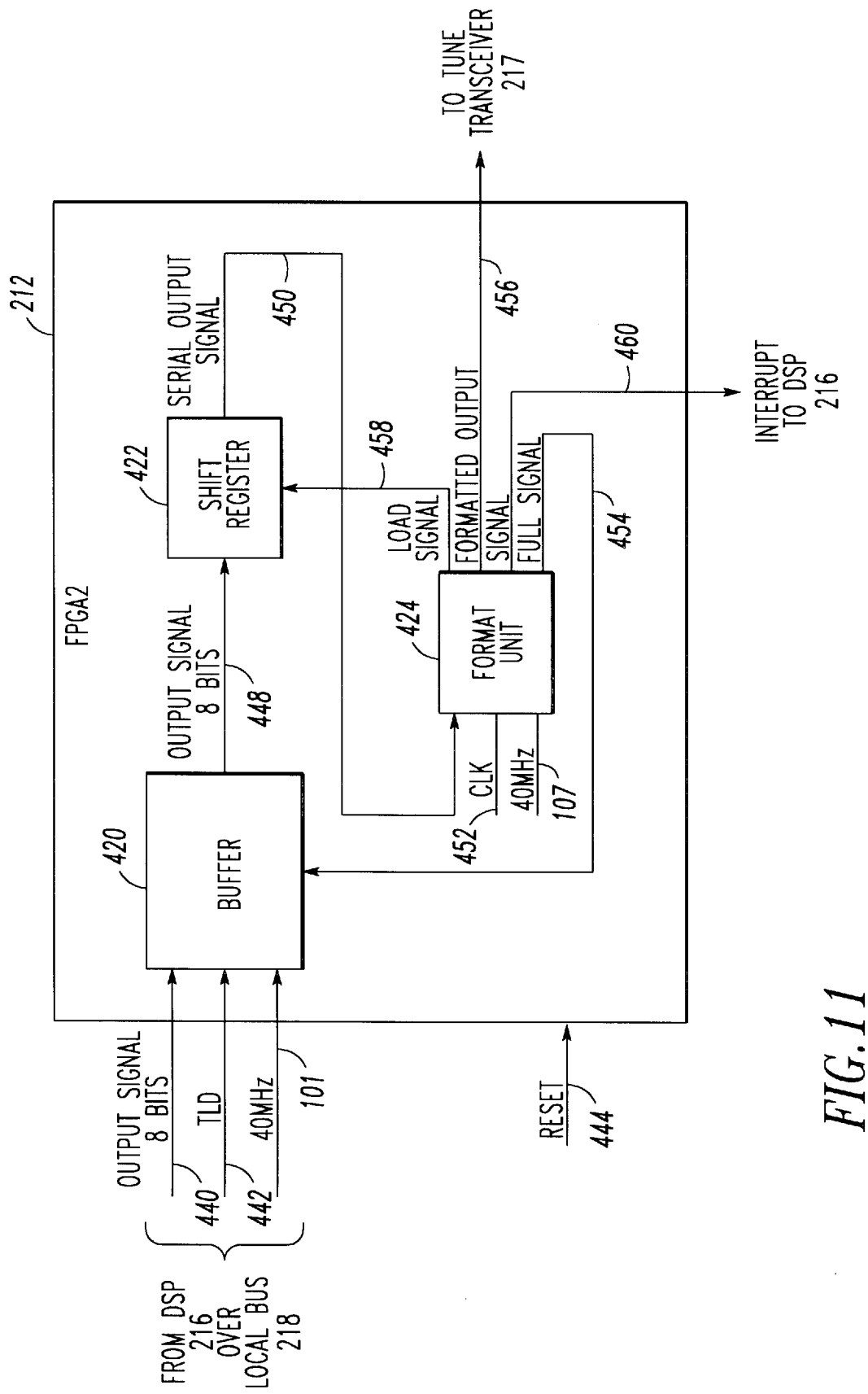
FIG. 11 is a diagram of a second field programmable array for the digital submodule configured for the Instrument Landing System.

Data is output over the system bus 116 using the Universal Asynchronous Receiver Transmitter (UART) capability programmed into FPGA2 212. FIG. 11 is a block diagram of the FPGA2 212. The FPGA2 212 receives an 8 bit data word 440, and loads it into the 8-bit buffer 420 with a transmit load data (TLD) signal 442. The TLD signal 442 is derived from an address decode of the buffer 420 address. When the software in the DSP 216 writes to the address of buffer 420, the TLD signal 442 will be set. A FULL signal 454 is derived from control logic in a format unit 424. The FULL signal 454 is set when a new byte is deposited into the buffer 420.

If a shift register 422 is empty, the byte in the buffer 420 will be transferred in parallel to the shift register 422. When data is transferred into the shift register 422, the FULL signal 454 will be reset and an interrupt 460 will be sent to the DSP 216 indicating that the buffer 420 is empty and ready for a new byte. If the shift register 422 is not empty, the transfer of the next byte into the shift register 422 from the buffer 420 will not occur until the last bit of the shift register 422 is shifted out. The format unit 424 uses signals baud rate CLK 452, and a digital submodule clock 107 of, for example, 40 MHz, provides synchronization of data flow between the buffer 420, the DSP 216, and the shift register 422.

By the process described above, an Instrument Landing System which performs efficiently and accurately can be achieved within a programmable common receive module. Those of skill in the art can use the above description plus application notes and functional requirements documents to use or modify the programmable common receive module disclosed herein for reception and processing of other time-interleaved waveforms including various combinations or amplitude, frequency and/or phase modulated waveforms.

Air Traffic Control Radar Beacon System (ATCRBS) Application:

In ATCRBS processing different modes of interrogation may be processed. Prior to operation, configuration programs comprising the ATCRBS application are placed in the RAM 220 as previously explained, either by downloading from external memory over the system bus 116 or from the FLASH memory 222. The analog submodule 104 and the digital submodule 106 are each sequentially configured and tuned to route and process ATCRBS interrogations.

Figure 12A:
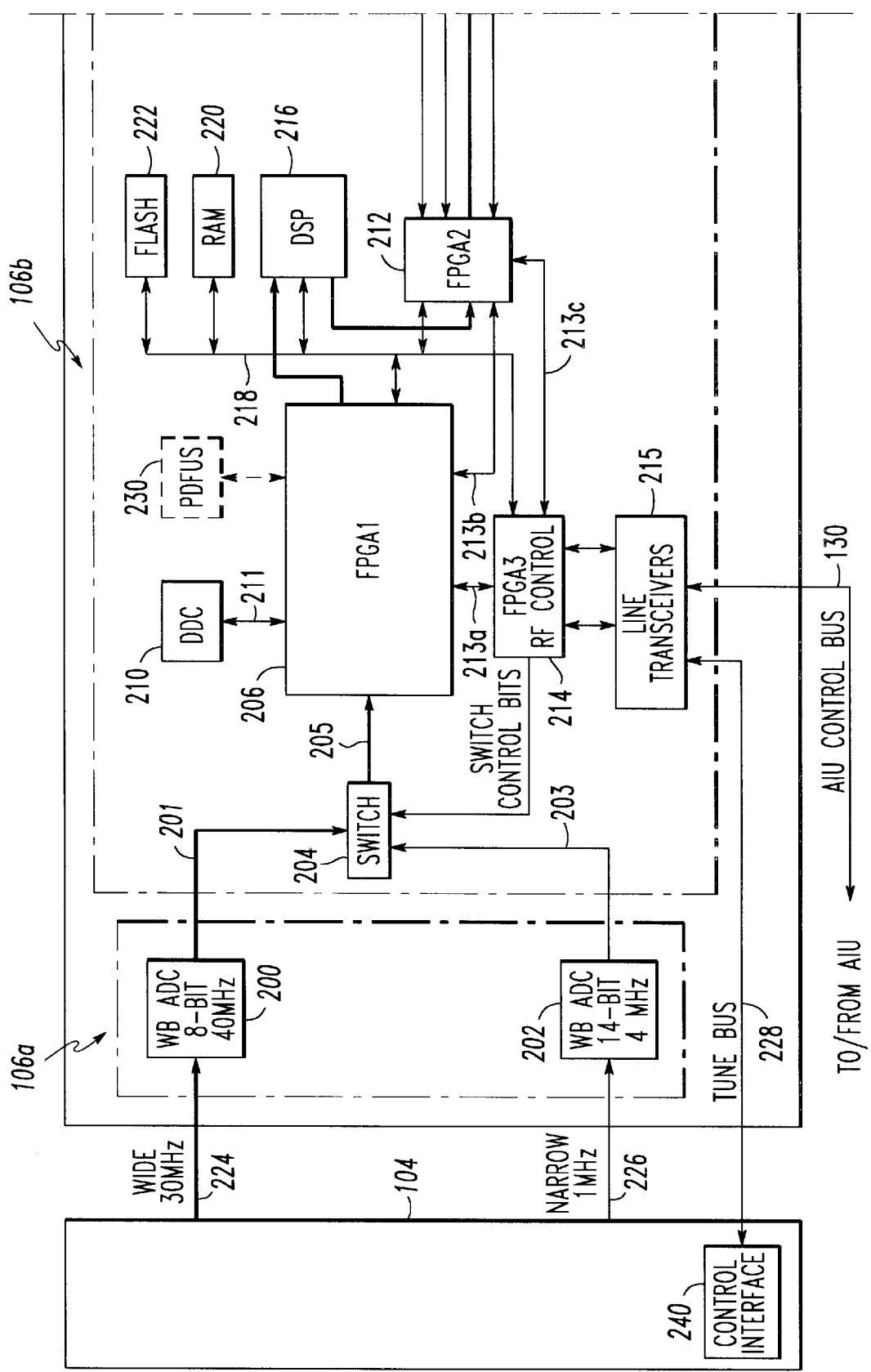
FIGS. 12A and 12B are a block diagram of a digital submodule of a programmable common receive module in the digital programmable radio configured for an Air Traffic Control Radar Beacon System.
Figure 12B:
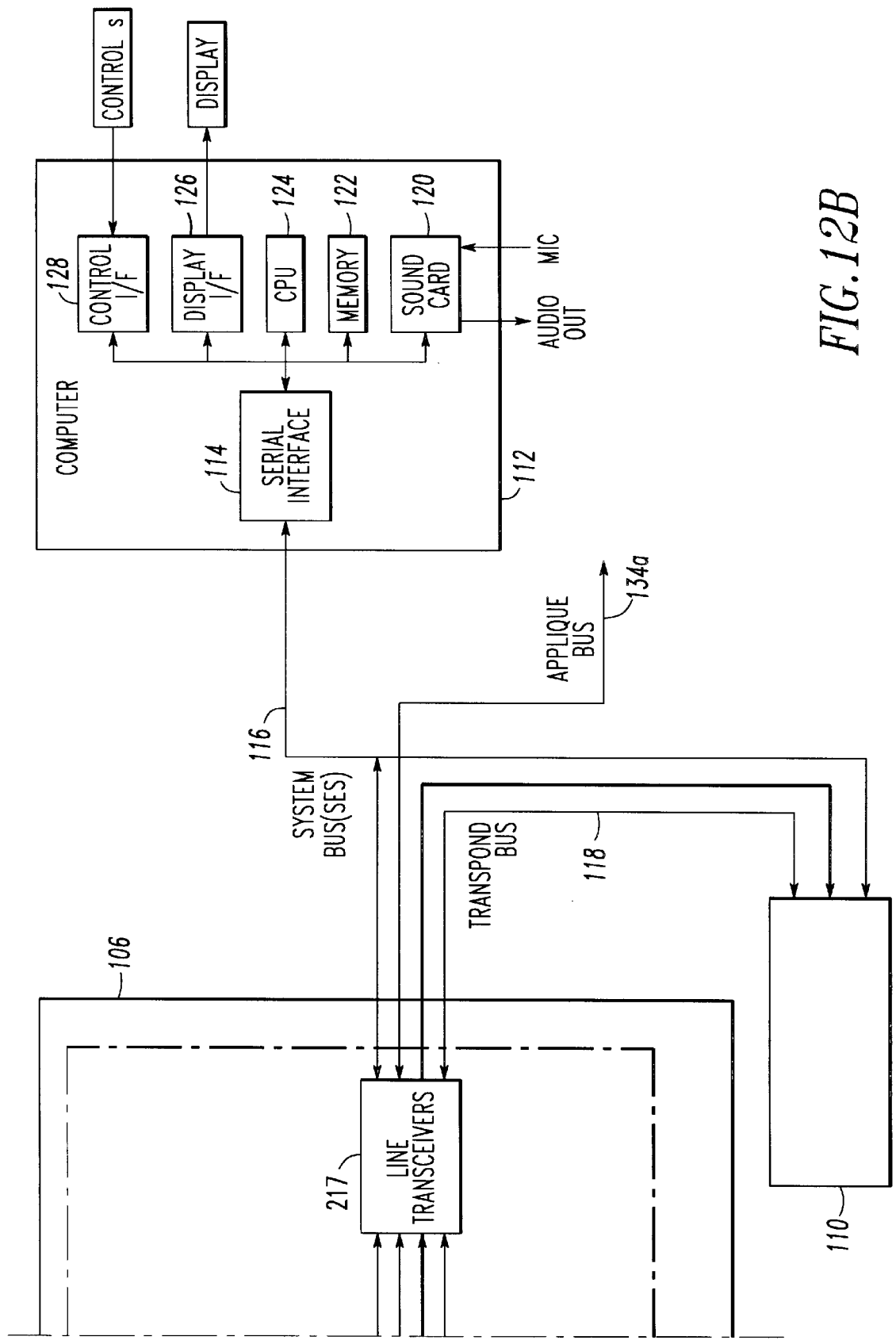

FIGS. 12A and 12B illustrates the signal flow through the digital submodule 106 of the PCRM 100 for an ATCRBS, IFF or other transponder interrogration.

Figure 13:
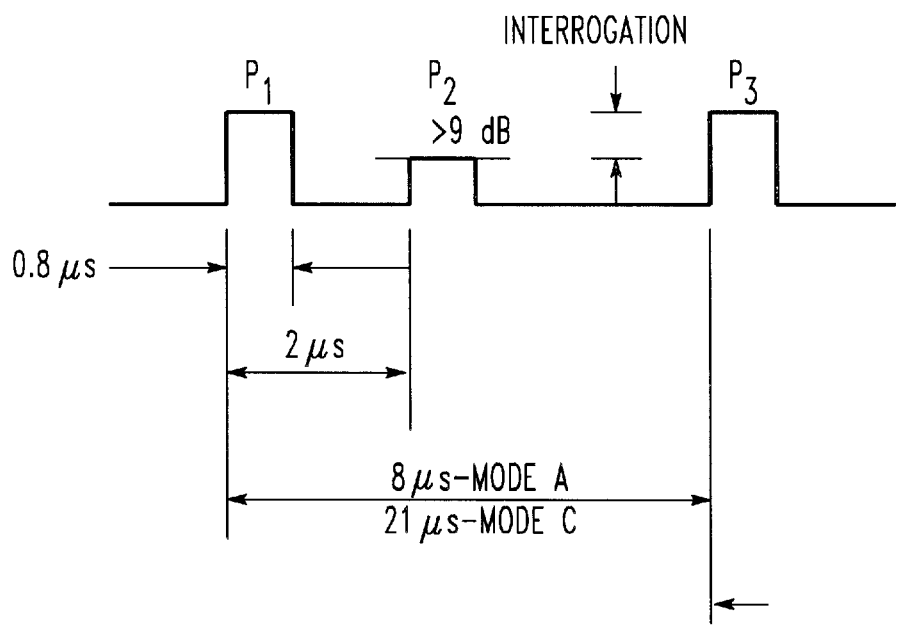
FIG. 13 illustrates an example of a signal including pulses received by a digital submodule of the progammable common receive module.

FIG. 13 illustrates a sequence of pulses of an ATCRBS, IFF or other transponder interrogation which may be, for example, received by a first FPGA on the digital submodule 106. The ATCRBS/IFF application processes many different modes of interrogation including Mode C for requesting an aircraft's altitude and Mode 3A requesting an aircraft's assigned identification number.

Figure 14:
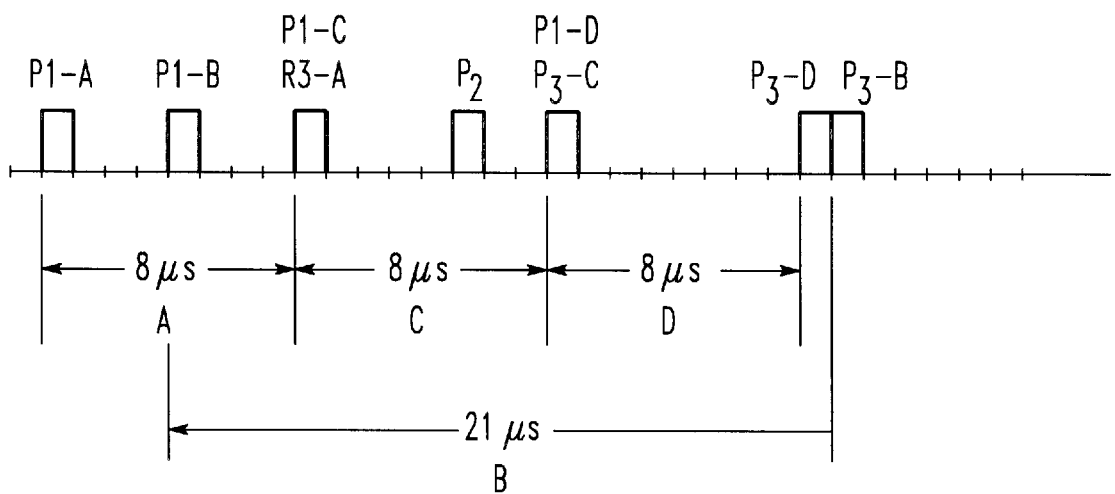
FIG. 14 is an example of a second signal including pulses received by the digital submodule of the programmable common receive module.

As shown in FIG. 14, an ATCRBS interrogation is comprised of pulses such as P1, P2, and P3. To determine which mode the ATCRBS interrogation is indicating, a distance between pulses P1 and P3 must be determined. Only pulses that meet specific criteria for pulse width, amplitude, and frequency are considered valid pulses. For example, if a timing difference between respective rising edges of P1 and P3 is 8 microseconds, then Mode 3A is indicated and the transponder should reply by transmitting an identification number. If the timing difference between P1 and P3 is 21 microseconds, then Mode C is indicated and the transponder should reply by transmitting the aircraft's altitude.

In a basic ATCRBS interrogation, P1 and P3 are used to indicate a type of information requested (mode of interrogation) based on their interpulse period or timing difference as described above. A P2 pulse may occur two microseconds after P1. If the P2 pulse is of sufficient amplitude, according to mode criteria, a transponder must suppress replies for a period of time (suppress time period) predetermined. When the transponder is suppressed, replies to any interrogations will not be generated for the suppress time period. After the suppress time period expires, interrogations will be processed normally and replies will be transmitted. A format of the transmitted data will be described later.

Depending upon the configuration of the PCRM 100, multiple pulse trains may be interleaved. In an ATCRBS application of the present embodiment, four pulse trains may be interleaved as shown in FIG. 14. In the example shown, four P1–P3 pulse pair interrogations are labelled with subscripts A, B, C, and D. All four interrogations can be processed simultaneously and, if conflicts occur, a required priority scheme is used to determine an outcome of the conflict.

Figure 15:
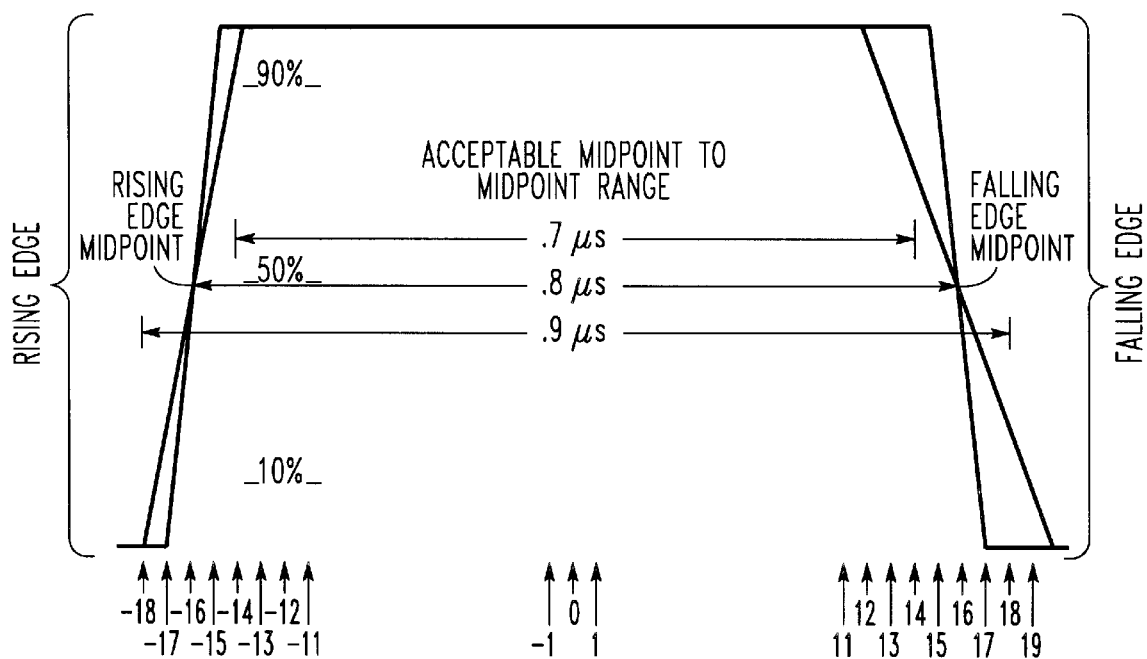
FIG. 15 illustrates a pulse which is received by the digital submodule of the programmable common receive module.

Further, pulses must meet specific criteria as to their width. FIG. 15 illustrates a pulse where the pulse width is measured from a midpoint of the rising edge to a midpoint of a falling edge. A pulse detection function in the ATCRBS application may, for example, attempt to estimate the midpoint of the rising edge of the pulse and the midpoint of the falling edge of the pulse. In the present ATCRBS application, a time period between the estimated midpoints of the rising edge and the falling edge is determined. The pulse is then judged to be acceptable if the determined time period is between 0.7 $\mu$sec and 0.9 $\mu$sec, and the pulse is of sufficient amplitude.

FIGS. 12A and 12B is a block diagram of the digital submodule 106 of the PCRM 100. In the present example, the digital submodule 106 of the PCRM 100 includes the analog to digital converters 200 and 202 in an analog to digital converter (ADC) portion 106a. However, the A/D converters are electrically isolated from the other elements of the digital submodule 106. As one alternative, these ADCs 200 and 202 could be on the analog submodule board of PCRM 100. In this example, they were included on the digital submodule board due to space considerations.

Figure 16:
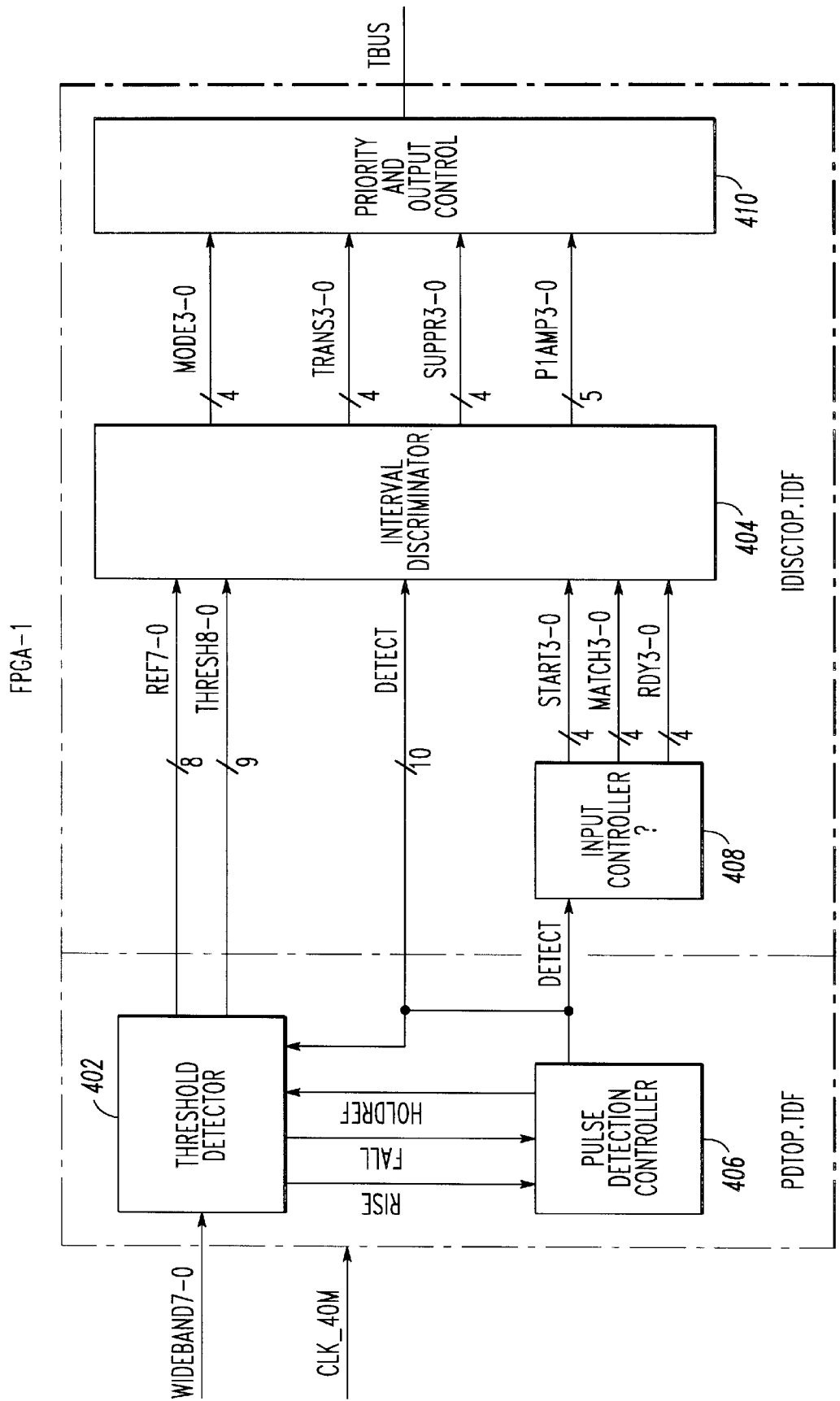
FIG. 16 is a block diagram of an ATCRBS configuration of a first field programmable gate array in the digital submodule.

The digital submodule 106 of the programmable common receive module (PCRM) 100 can service a wide range of CNI functions in an approximate 2 MHz to 2000 MHz region. To function as a portion of the PCRM 100, the digital submodule 106 may include, for example, as shown in FIG. 16, analog to digital converters (ADCs) 200 and 202, a switch 204, field programmable gate arrays (FPGAs) 206, 212, and 214, a digital down converter (DDC) 210, a processor (DSP) 216, and storage 220 and 222. The WB ADC and NB ADC are in the ADC portion 106a of the digital submodule 106. The remaining elements are in a digital processing portion 106b. Although this hardware may be resident in every digital submodule, the hardware used depends on the application desired. Further, depending on the applications desired to be performed, specific hardware may be added or eliminated as set forth in more detail in the related disclosures listed above.

The digital submodule 106 receives an analog signal 224 or 226 that is band limited to either wide band WB or narrow band NB, respectively. If the signal is wide band, it may be, for example, an IF (intermediate frequency WB signal) limited to ±4000 kilohertz about 30 Mhz, resulting in a total of 80 MHz of bandwidth maximum. If the signal is narrow band, it may be, for example, limited to ±200 kilohertz about 1 Mhz, resulting in a total of 400 kilohertz of bandwidth maximum.

Two analog to digital converters may be used: one for converting a narrow band (NB) signal 202 and one for converting a wide band (WB) signal 200. In the ATCRBS application, a WB signal 224 is supplied to a 8-bit 40 MHz wide band analog to digital converter (WB ADC) 200, such as, for example an AD 9012 AJ available from Analog Devices. By utilizing well-known 4/3 harmonic sampling (i.e., the sampling of the 30 MHz I/F signal at a sample rate of 40 MHz), the WB signal at 30 MHz is folded down to a 10 MHz region.

Both the WB A/D 200 and the NB A/D 202 are coupled to a converter switch (SW) 204 or a multiplexer which controls which signal is transferred to a digital processing portion 106b of the digital submodule 106. The SW 204 is controlled by switch control bits which indicate whether the WB 224 or NB 226 signal is to be transmitted to the digital processing portion 106b. In the ATCRBS or IFF applications, the WB signal 224 is selected. As a result, 8 bits of data are received from the WB ADC 200 and transmitted with a data valid bit and a clock bit to a first FPGA 206 as a selected digital signal.

In the present invention, three FPGAs 206, 212 and 214 are used to perform selected operations. The FPGAs may be, for example, Altera Flex 81188 Parts. The function of these FPGAs is controlled by configuration data which is set forth in the appendix.

The first FPGA (FPGA1) 206 will receive the selected digital signal and depending upon the application selected and the chip configuration program loaded, perform specified functions or operations including, for example, in the ATCRBS or transponder applications, pulse width discrimination, interval discrimination, transpond bus control, pulse detection and other data processing.

The digital down converter (DDC) 210 is not used in the ATCRBS or IFF applications.

The processor (DSP) 216 may be, for example, a TMS320C31 chip. The DSP 216 may perform various processing functions on various types of signals which may, for example, include signals associated with various NB and WB radio functions. The processing functions may include, for example, decimation; filtering; waveform demodulation of any combination of amplitude; frequency and phase modulation; signal correlation; squelch; management and control of all channel resources (gain, signal path switching, tuning, interfaces both internal to the PCRM 100 as well as to external units, etc.) in both the digital submodule 106, the analog submodule 104 and the associated AIU 103 (FIG. 1); bit stream decoding including error detection and/or correction; BIT control/reporting; Fourier transforms; calculations of difference in depth of modulation (DDM)l; and formatting control for various terminals such as displays. Further, although sometimes performed elsewhere, the DSP 216, depending upon the processing power implemented, can perform message processing, network functions, and processing of low-data rate speech algorithms.

In the ATCRBS and IFF applications, the DSP 216 may perform, for example, configuration of other elements in the PCRM 100 and tuning each PCRM 100 to accept only signals pertaining to the ATCRBS application. The software for performing these functions is set forth in the appendix.

A second FPGA (FPGA2) 212 may be programmed to be configured, for example, to perform interface operations between the local bus 218 and several elements of the digital submodule 106 and a system bus 116, i.e., performing a UART (Universal Asynchronous Receiver/Transmitter) function. Further, the FPGA 212 may also, for example, perform interface operations to a system bus 116, a transpond bus 118 and an applique bus 134a via transceivers located in a multi-transceiver package 217.

A third FPGA (FPGA3) 214, also coupled to the local bus 218, may be configured to perform RF control functions, including providing control bits via a tune bus 228 to the analog submodule 104 of the PCRM 100 through, for example, a transceiver in a multi-transceiver package 215; and via an AIU control bus 130 to the associated AIU 103 also through, for example, a transceiver in the multi-transceiver package 215. The FPGA3 214 may also be configured to perform control functions of various elements of the digital submodule 106 by providing control bits.

In addition, memory may be coupled to the local bus 218 and may include, for example, a 128K bits×32 bits wide random access memory (RAM) 220 and a 128K bits×32 bits wide non-volatile memory such as the common "FLASH" memory or EEPROM (FLASH) 222. The RAM 220 and the FLASH 222 are used to store application specific information, including FPGA configuration data, used during initialization and when switching applications.

The digital submodule 106 may be configured to perform specific functions depending on the application desired, in this case, ATCRBS. The structure of the digital submodule 106 permits changing the configuration to perform a different application within a very short period of time, for example in approximately 100 milliseconds, without requiring a change in hardware and accompanying tests to verify proper functioning. Software for initialization of the digital submodule 106 is set forth in the appendix.

The program pertaining to the ATCRBS application generally executes from the RAM 220. Each program pertaining to the ATCRBS application includes source code that runs the DSP 216 and data files for each of the FPGAs 206, 212 and 214 and the DDC 210. See the appendix for an example of the programs.

Therefore, each FPGA 206, 212 and 214 receives gate configuration information pertaining specifically to the ATCRBS application. The selected application may be altered any time during use. New selection data, indicating that a new application is desired, is received from the system bus 116. The DSP 216 receives the new selection data, recognizes that the currently selected application is to be changed to a newly selected application, determines the location in the RAM 220 of the newly selected application, reads application information from the location of the RAM 220 pertaining to the newly selected application, and transfers the read application information to each of the FPGAs 206, 212 and 214. Each FPGA is then reconfigured to perform specific functions as specified for the newly selected application.

In the ATCRBS application, the selected function is a wide band signal, for example a 30 MHz IFF signal, which is received by the 8 bit, 40 MHz WB A/D 200. Switch control bits are sent by the FPGA3 214 to the switch 204 indicating that the wide band signal is to be transferred to the FPGA1 206. The switch 204 couples the 8 bits of data from the WB ADC 200 with a data valid bit and a clock bit (40 Mhz). This 8 bit data is clocked into the first FPGA1 206 at a 40 MHz rate. The other 6 bits are ignored.

When the digital submodule 106 is performing the ATCRBS application, FPGA1 206 is configured to perform several functions including pulse detection, pulse width discrimination, interval discrimination and mode decoding. As shown in FIG. 15, in this example, 0.8 microseconds is the nominal width of the pulse and pulses of 0.7–0.9 microseconds are accepted as valid pulses. Therefore, pulses having a width of 0.8±0.1 microseconds are valid and should be detected.

Interval Discrimination is performed to measure intervals between the pulses. Based on the measured intervals, a mode of interrogation is determined. This interrogation mode indicates a type of information being requested, i.e., altitude information or identification information.

Thus, the FPGA1 206 generates a pulse information signal. This pulse information signal is provided to the FPGA3 214, which formats the pulse information into a serial digital data stream and then transfers the serial digital data stream onto a transpond bus 118 for response generation.

The FPGA2 212 provides an interface between the DSP 216, RAM 220, FLASH 222, FPGA3 214 and the system bus 116.

The FPGA3 214 is coupled to the transponder bus 118, the local bus 218, the tune bus 228 and the AIU control bus 130. The FPGA3 214 performs receiver control functions in response to an FPGA2 212 control word received over the local bus 218. The FPGA3 214 further generates the switch 204 control signal and tune control bits. In the present example, 56 bits of serial control bits are transferred over the tune bus 228 to the analog submodule 104 of the PCRM 100 for performing tuning and control functions.

FIG. 16 illustrates an example of how the FPGA1 206 may be configured for the ATCRBS application. A digital signal received by the FPGA1 206, in this example, an eight-bit wide band signal WIDEBAND7-0, is transmitted to a threshold detector 402 which generates a sample peak pulse amplitude signal REF7-0, in this example, an eight-bit signal, and a threshold signal THRESH8-0, a nine-bit signal.

The threshold detector 402 additionally generates a rise signal RISE when a midpoint of the rising edge of a pulse is detected and a fall signal FALL when a midpoint of the falling edge of the pulse is detected. The rise signal and fall signal are both supplied to a pulse detection unit 406.

When a valid pulse is detected, i.e., the pulse width and amplitude meet specified criteria, a detect signal DETECT is generated and supplied to the threshold detector 402, an interval discriminator unit 404 and an input controller 408.

Additionally, the pulse detector unit 406 provides a multiplexer control signal HOLDREF, requesting a multiplexer switch when the rising edge of a pulse has been detected and the falling edge of the pulse should next be detected. When the input controller 408 receives the DETECT signal, start signals START3-0 are generated. The input controller 408 also receives match signals MATCH3-0 and ready signals RDY3-0.

The sample peak pulse amplitude signal REF7-0 and the threshold signal THRESH8-0 are supplied to the interval discriminator unit 404 which has at least one interval discriminator 404a. In this embodiment for the ATCRBS application, four interval discriminators 404a–d are provided to account for a possibility of four interleaved pulses in pulse train interrogations within the WB signal received WIDEBAND7-0.

Each interval discriminator 404a–d generates a respective match signal MATCH (MATCH3-0, respectively) indicating a pulse match has been detected and a respective ready signal RDY (RDY3-0, respectively) indicating whether the respective interval discriminator is in an idle state. Further, each interval discriminator 404a–d generates a mode signal MODE (MODE3-0, respectively) indicating the mode of matched pulses, a transpond signal TRANS (TRANS3-0, respectively) indicating a valid interrogation has been detected, a suppress signal SUPPR (SUPPR3-0, respectively) indicating the suppression condition has been met, and an amplitude signal P1AMP3-0 indicating detected amplitudes of P1 pulses, which are supplied to a priority/output control logic 410. Each P1AMP signal (P1AMP3, P1AMP2, P1AMP1 and P1AMP0, from the interval discriminators 404a–d, respectively) is a 5 bit signal indicating the respective detected amplitude of the respective P1 pulse.

The priority/output control unit 410 generates an output digital signal TBUS for transmission over the transpond bus 118.

Figure 17:
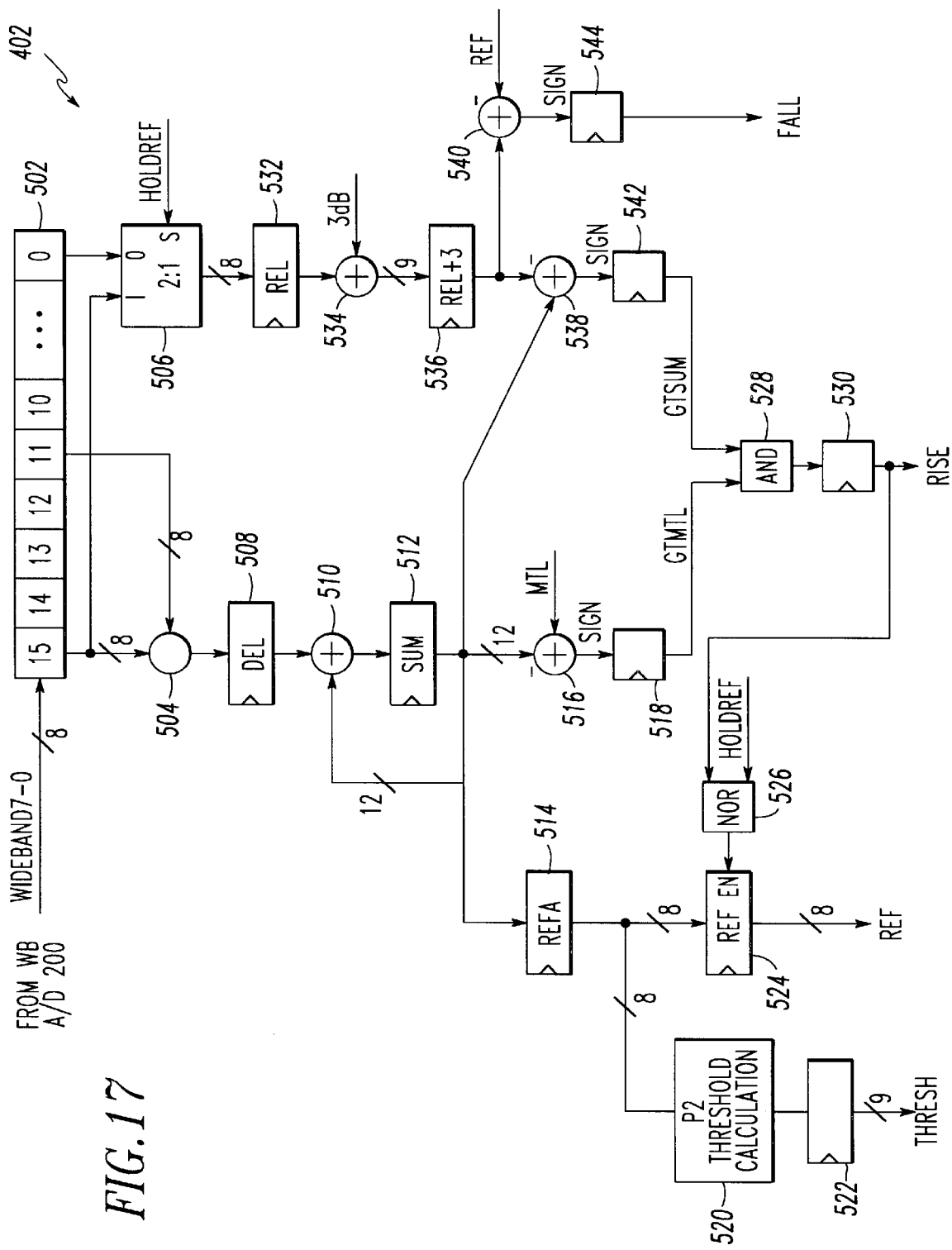
FIG. 17 is a block diagram of a threshold detector configured in the first field programmable gate array.

FIG. 17 illustrates the threshold detector 402 of FPGA1 206. The threshold detector 402 receives the WB signal from the SW 204. Since the pulses of the WB signal are, in this example, on the average, 0.8 microseconds wide and a 40 MHz sampling rate is used, an average pulse is 32 samples wide. A 16 sample delay line, 502, is used to determine a time from a center of a pulse to each edge, i.e. rising edge and falling edge.

The threshold detector 402 thus compares an estimate of the amplitude of the center of the pulse to an amplitude of samples along the edges of the pulse. The estimate of the center, or peak, pulse amplitude is obtained by averaging four most recent samples. The averaging results in an estimate of the peak pulse amplitude that has a reduced variance relative to a single sample.

More specifically, a register chain 502, SUM value held in a register 512, DEL value held in a register 508, and REL value held in a register 532 and used for determining a value of register 536 are all initialized to zero. The first sample of 8 bits is received into register 15 of the register chain 502, register 11 is subtracted from register 15 (504) and a result is loaded into DEL 508. Contents of DEL 508 are then accumulated (510) into SUM 512. Since register 11 was initially zero, DEL 508 receives the data contained in register 15. When a second sample enters register 15, the first sample moves to register 14. DEL 508 will then receive register 14 minus zero (register 11). SUM 512 will thus contain a sum of the first two samples.

This process continues (with register 11 equalling zero) and consequently, the SUM 512 contains a sum of the first four samples. When a fifth new sample enters the register line 502, the first sample moves to register 11. Register 11 will now hold a sample value instead of an initialization value. Register 11 is subtracted from register 15 (504) to produce a difference which is added to SUM 512. SUM 512 now holds the sum of samples two through five.

This technique of adding the difference between the newest sample and the sample five samples old to SUM is used to keep a running sum of the four newest samples in SUM. This running sum is computed with one addition at adder 510 and one subtraction at subtractor 504. Since the running sum is a sum of four eight bit numbers, the running sum could require 10 bits for representation. A running sum signal SUM output from SUM 512 is 12 bits in the present embodiment to allow for averaging a greater number of samples in future designs; therefore, only 10 of the 12 bits output in this embodiment will be significant.

The SUM 512 and DEL 508 registers produce one clock delays and are needed, in this embodiment, to operate the FPGA1 206 at a high clock rate required.

The SUM signal is then transmitted back to the first adder 510, a third register REFA 514, a second adder 516 and a third adder 538.

The third register 514 registers the SUM signal and then transmits an 8-bit reference signal to a threshold calculator 520 and to a fourth register REF 524. The threshold calculator 520 calculates a threshold of a pulse and outputs the threshold signal THRESH8-0 to a fifth register 522 before output to the interval discriminator unit 404.

The fourth register 524 is enabled by an enable signal and outputs an 8 bit reference signal REF.

The second adder 516 subtracts the SUM signal from a constant threshold signal MTL to produce a first sign signal. The first sign signal is supplied to a sixth register 518 which outputs the sign signal GTMTL which indicates whether the sum is greater than a constant threshold value indicated by the constant threshold signal MTL.

The 2:1 multiplexer 506 receives the sample in register 15 and the sample from register 0 of the register chain 502. Based on the multiplexer switch signal HOLDREF, either the sample from the register 15 or the sample from register 0 is output as an 8 bit register signal. The register signal is supplied to a seventh register REF 532 and then to a fourth adder 534. The register signal and a 3 dB signal, which is, in this example, a half power point, are added to produce a 9 bit added signal. The added signal is supplied to a eighth register 536 which registers the added signal.

The added signal is then supplied to the third adder 538 which subtracts the added signal from the SUM signal to produce a second sign signal which is next supplied to a ninth register 542. The ninth register 542 outputs the second sign signal GTSUM indicating whether the added signal is greater than the SUM signal.

Both the first sign signal GTMTL and the second sign signal GTSUM are supplied to an AND gate 528 which produces a rise signal. The rise signal is transmitted to a flip-flop 530 and then output as the rise signal RISE, indicating whether a rising edge of the pulse has been detected. The rise signal is also supplied to a NOR gate 526 along with the multiplexer switch signal HOLDREF. The NOR gate 526 outputs the enable signal for enabling the fourth register REF 524.

The added signal is also supplied to a fifth adder 540 which subtracts the reference signal REF from the added signal and outputs a third sign signal. The third sign signal is then registered by an eleventh register 544 before being output as a fall signal FALL indicating that a falling edge of the pulse has been detected.

Figure 18:
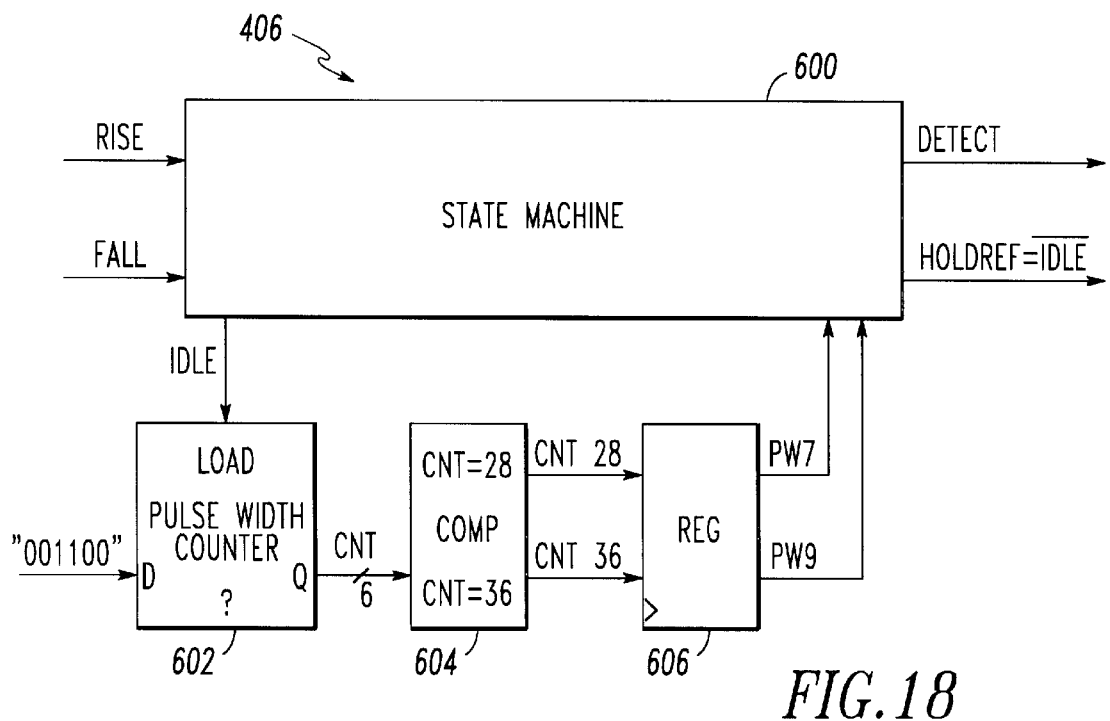
FIG. 18 is a block diagram of a pulse detector controller configured in the first field programmable gate array.

FIG. 18 is a block diagram of the pulse detector controller 406. A state machine 600 receives the rise signal RISE and the fall signal FALL from the threshold detector 402. The state machine 600 will detect a valid pulse based on predetermined criteria which may include pulse width and amplitude.

When a RISE signal is received, the state machine 600 outputs a multiplexer signal HOLDREF indicating that a possible pulse has been detected and a search for a falling edge of the pulse should begin.

When a new rising edge has not been detected, the state machine 600 will output an idle signal IDLE indicating that the state machine 600 is idle, to a pulse width counter 602. The six bit pulse width counter or timer 602 also receives a constant initialization value. The pulse width counter or timer 602 is in an initialization state when the state machine outputs the IDLE signal indicating that the state machine is idle. In this example, the state machine will output an active IDLE signal when the state machine is idle.

The pulse width counter begins counting after the RISE signal indicates a rising edge, in this example, the RISE signal goes active, which causes the state machine to exit the idle state.

A count value CNT of 6 bits is output to a comparator COMP 604. The comparator 604 compares the count value to two predetermined values, in this example, a value 28 and a value 36. If the count value is equivalent to 28, a count 28 signal is output. Similarly, if the count value is equivalent to 36, a count 36 signal is output. A register 606 receives both the count 28 signal and the count 36 signal.

When the register 606 receives a count 28 signal indicating that the pulse width counter has reached 28, the register 606 outputs a pulse width 0.7 signal PW7 indicating that 0.7 microseconds has passed, thus opening a time window. When the register 606 receives a count 36 signal indicating that the pulse width counter has reached 36, the register 606 outputs a pulse width 0.9 signal PW9 indicating that 0.9 microseconds has passed, thus closing the time window. As previously described, in this example, an average pulse is 0.8 microseconds in pulse width and a valid pulse is from 0.7 microseconds to 0.9 microseconds in pulse width.

If the timer counts to 0.7 microseconds and receives the fall signal, indicating a falling edge of the pulse has been detected, before a 0.9 signal is output, then a valid pulse is indicated and the state machine 600 outputs a detection signal DETECT. In summary, the pulse width timer is used to determine if the delay from RISE to FALL is in a 0.7 $\mu$s to 0.9 $\mu$s range.

Additionally, when the state machine 600 is not in the idle state, i.e. a rising edge has been detected, the state machine outputs the switch multiplexer signal HOLDREF to hold the estimate of the pulse amplitude and switch the multiplexer operation to look for the falling edge.

Figure 19:
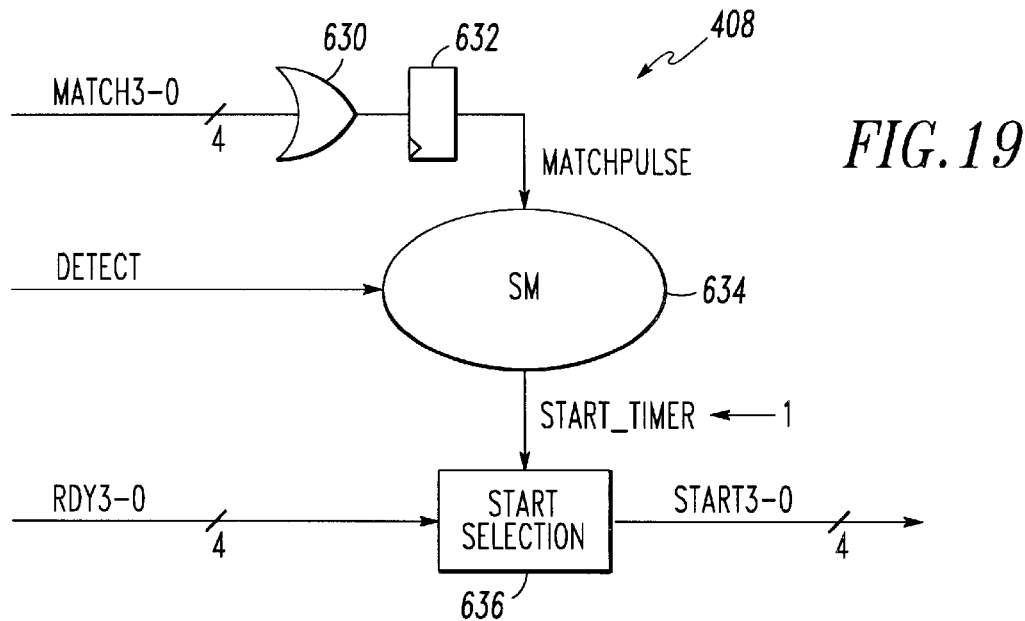
FIG. 19 is a block diagram of an input controller configured in the first field programmable gate array.

FIG. 19 illustrates the input controller 408 which receives the detection signal DETECT from the pulse detection controller 406. The input controller also receives the match signal MATCH3-0 from the interval discriminator unit 404. The match signal is a 4 bit signal, in this example, which includes a 1 bit signal from each of the four interval discriminators 404a–d. The 4 bit signal MATCH3-0 is supplied to an OR gate 630 and the result is then supplied to a register 632 which outputs a match pulse signal MATCHPULSE indicating whether the detected pulse is a part of an interrogation started with a previously detected pulse.

The match pulse signal MATCHPULSE and the detect signal DETECT are supplied to a state machine 634. The state machine 634 will output a start timer signal START_TIMER in response to the DETECT signal which indicates when a pulse has been detected. The start timer signal START_TIMER requests a starting of one of the interval discriminators 404a–d in the interval discriminator unit 404. The start timer signal is supplied to a start selection unit START SELECTION 636 along with the ready signal RDY3-0, in this example, a 4-bit signal where each bit corresponds to one of the four interval discriminators 404a–d, respectively and indicates a state of the corresponding interval discriminator 404a–d.

The start selection unit 636 outputs a start signal START3-0 of 4 bits. When a start timer signal START_TIMER is received which requests a starting of one of the interval discriminators 404a–d, the start selection unit 636 determines, based on the ready signal RDY3-0, which interval discriminator 404a–d may be started and, outputs the start signal START3-0 indicating which interval discriminator should start the interval discrimination function.

When a match between two pulses received has been detected, i.e., a timing difference between when a first pulse is received and when a second pulse is received meets specific criteria set forth for operating in selected modes, no start selection is generated and the interval discriminator which has determined the match accepts the detection and processes it.

Figure 20:
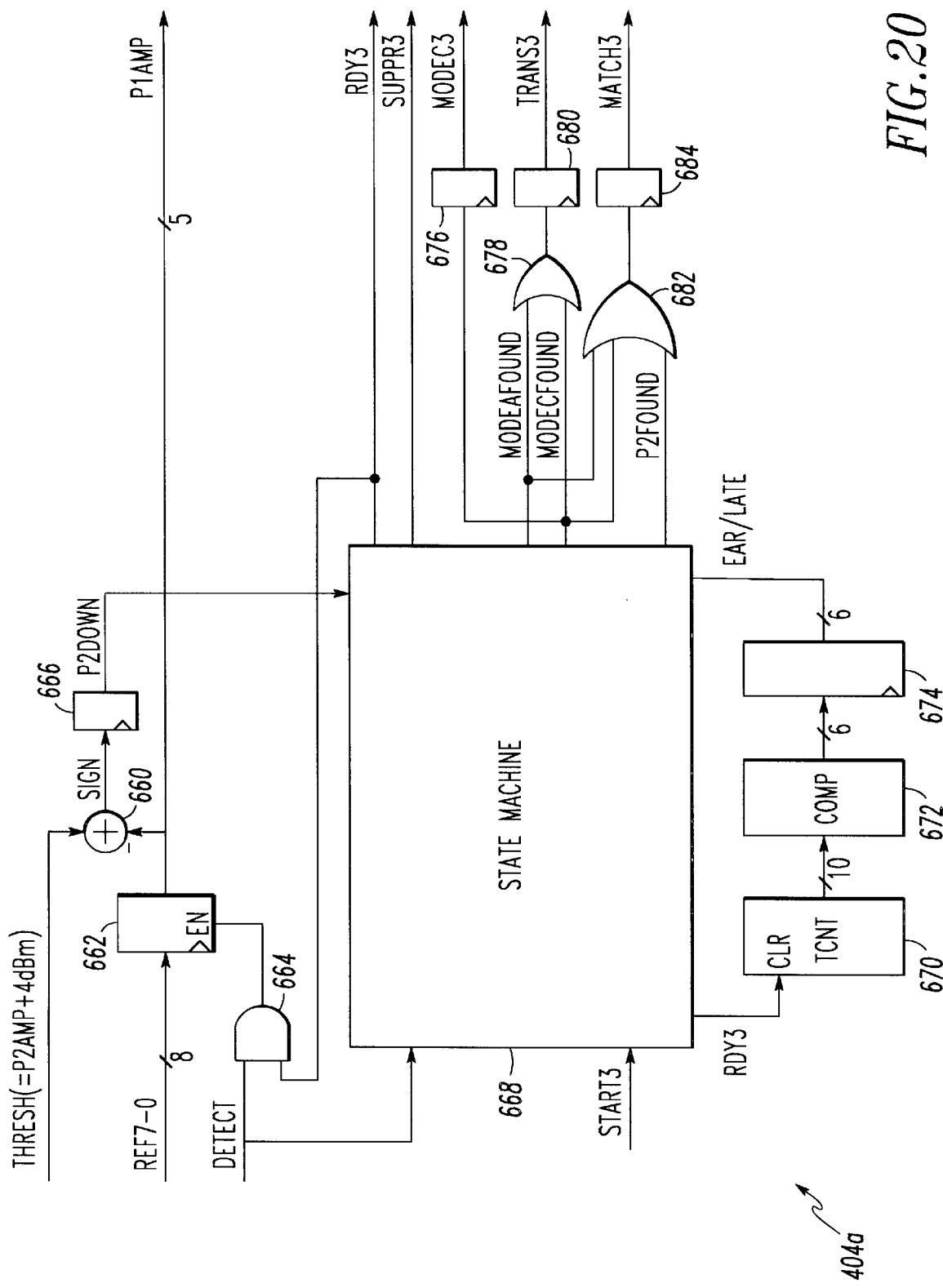
FIG. 20 is an example of one interval discriminator configured in the first field programmable gate array.

FIG. 20 is a block diagram of an example of one interval discriminator 404a, for example, of the present embodiment using four interval discriminators 404a–d in the interval discriminator unit 404. The interval discriminator 404a receives the 9 bit threshold signal THRESH8-0 signal and the 8 bit reference signal REF 7-0 from the threshold detector 402, the detection signal DETECT from the pulse detection controller 406, and a respective one bit START signal START3 of the start signal START3-0 from the input controller 408.

The threshold signal, which in this example represents the amplitude of the P2 signal plus 4 dBm, is supplied to an adder 60. The reference signal REF7-0 is supplied to a first register 662 which is enabled by an enable signal EN.

The detection signal DETECT is supplied to an AND gate 664 along with a ready signal RDY output from a state machine 668 in the interval discriminator 404a which produces an ANDED output. The ANDED output is supplied to the first register 662 as the enable signal EN. In response to the enable signal EN, the register 662 outputs a respective first pulse amplitude signal P1AMP3 of the first pulse amplitude signal P1AMP3-0. The first pulse amplitude signal P1AMP3 is supplied to the priority/output control unit 410.

Additionally, the first pulse amplitude signal P1AMP3 is supplied to the adder 660 which subtracts the first pulse amplitude signal P1AMP3 from the threshold signal THRESH8-0 and outputs a sign signal SIGN as a result. The sign signal SIGN is supplied to a second register 666 which outputs a second pulse down signal P2DOWN to the state machine 668.

The state machine 668 receives the detection signal DETECT, the respective one bit signal START3 of the start signal START3-0 and an early/late signal EAR/LATE. The state machine 668 generates a respective one bit ready signal, RDY3.

The state machine 668 determines whether a valid interval between two pulses exists, based on mode criteria, and then determines which mode the two pulses are operating under, based on the mode criteria. When the state machine 668 receives a start signal START3 from the input controller 408, the state machine 668 will, in this example, deactivate the ready signal RDY3 to indicate that the respective interval discriminator 404a is in an active state, i.e., has received a pulse.

A counter TCNT 670 receives the ready signal RDY3 and beings counting. A 10 bit count signal is output to a comparator COMP 672 which compares the count signal to each mode criteria. In this example, 3 modes are being utilized so 6 mode criteria are used by the comparator. More specifically, the count signal is compared to a Pulse 2 Early value, a Pulse 2 Late value, a Mode 3A Early value, a Mode 3A Late value, a Mode C Early value, and a Mode C Late value. A 6 bit mode comparison signal is output, each bit corresponding to a result of a comparison of the timer count signal TCNT with a respective mode criteria.

The mode comparison signal is supplied to a register 674 which then outputs a 6 bit early/late signal EAR/LATE, each bit representing whether a respective mode criteria has been met. The early/late signal is supplied to the state machine 668 which, based on the early/late signal determines if two received pulses are operating in one of the selected modes, in this example Mode A, Mode C, or a suppression pulse, P2.

The state machine 668 outputs the respective ready signal RDY3 to the input controller as one signal part of the four bit ready signal RDY3-0 when the state machine 668 is in the idle state. A respective suppress signal SUPPR3 is output when a suppress pulse is detected which has an amplitude greater than a selected amplitude, in this example (P1+4 dB). The suppress signal SUPPR3 is supplied to the priority/output control unit 410 as one signal of the SUPPR3-0 signal.

A Mode C found signal MODECFOUND is output by the state machine 668 when an interval between two pulses is found to meet Mode C criteria. Similarly, a Mode A found signal MODEAFOUND is output by the state machine 668 when an interval between two pulses is found to meet Mode A criteria.

The Mode C found signal MODECFOUND is supplied to a third register 676 which outputs a Mode C signal MODEC to the priority/output control unit 410. Additionally, the Mode C found signal MODECFOUND and the Mode A found signal MODEAFOUND are supplied to a first OR gate 678. If either mode is indicated, the first OR gate 678 outputs a respective transpond signal TRANS3, via a fourth register 680, to the priority/output control unit 410 indicating a valid interval has been detected. The Mode C found signal MODECFOUND and the Mode A found signal MODEAFOUND are further supplied to a second OR gate 682 along with a suppress pulse found signal P2FOUND. The second OR gate 682 outputs an ORED signal to a fifth register 684 which supplies a match signal MATCH3 to indicate whether Mode A or Mode C criteria are met and thus, that two pulses match. If a suppress pulse is found, the match signal MATCH3 is set to indicate a match and to indicate that the respective interval discriminator 404a may be restarted and cleared.

Figure 21:
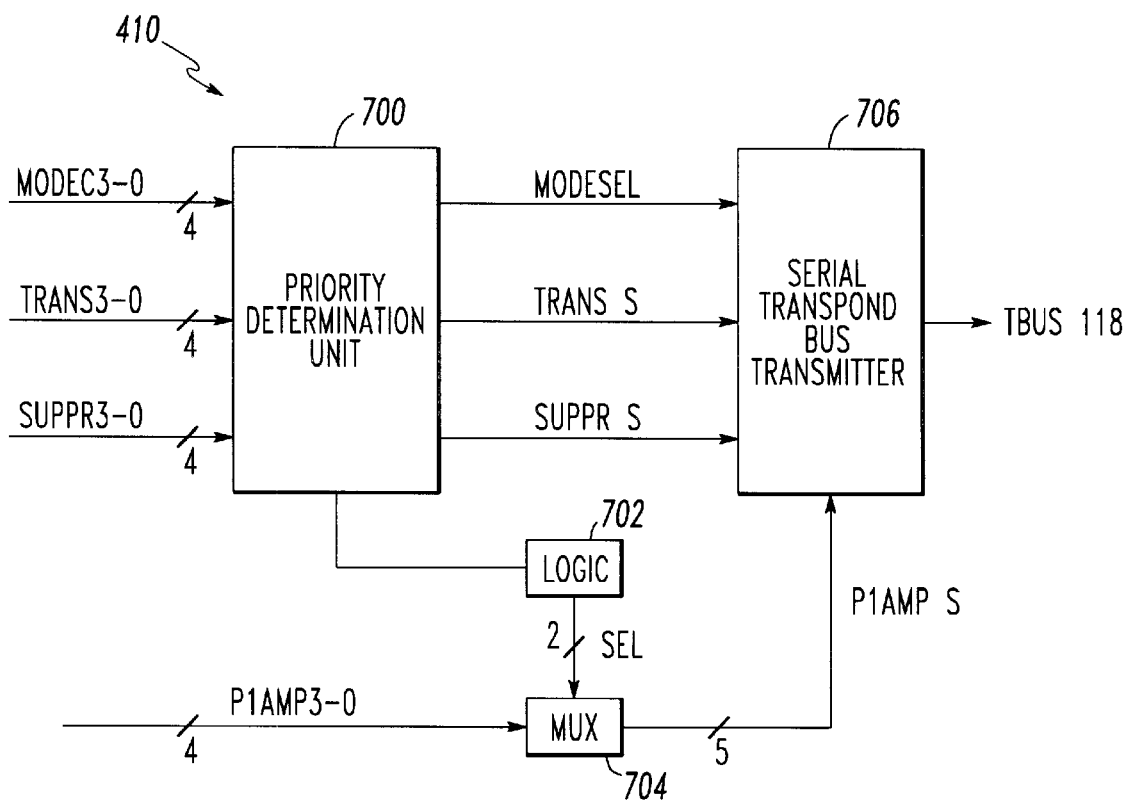
FIG. 21 is an example of a priority/output control unit configured in the first field programmable gate array.

FIG. 21 is a block diagram of the priority output control unit 410 which receives the 4 bit Mode C signal MODEC3-0, the 4 bit transpond signal TRANS3-0 and the 4 bit suppress signal SUPPR3-0. Each interval discriminator 404a–d of the interval discrimination unit 404 supplies one bit for each of these signals. In addition, the priority output control unit 410 receives the 20 bit first pulse amplitude signal P1AMP3-0 which includes 5 bits from each interval discriminator 404a–d indicating the pulse amplitude of the first pulse associated with the respective interval discriminator.

A priority determination unit 700 receives the Mode C signal MODEC3-0, the transpond signal TRANS3-0 and the suppress signal SUPPR3-0 and based on preselected criteria, assigns a priority of transfer of the signal. More specifically, the Mode C signal MODEC3-0, which in this example is only one bit from each respective interval discriminator since only two modes are being utilized, is supplied to indicate to which mode the pulses correspond. A priority of modes indicating an importance of each mode, can be preselected and, as is well known in the art, comparators or such may be used to give priority to a selected mode. The transpond signal TRANS3-0 indicates when a valid interrogation has been detected, each bit representing a respective interval discriminator 404a–d and the suppress signal SUPPR3-0 indicates when the suppression state should be entered, each bit representing a respective interval discriminator 404a–d. Again, the priority determination unit 700 includes comparators preset to indicate which function, transpond or suppress, of a respective match of pulses or respective pulses, should be performed first and which interval discriminator 404a–d has priority.

The priority determination unit 700, in this example, generates a one bit mode signal MODE SEL indicating the mode of operation, a one bit transpond signal TRANS S indicating a transpond function and a one bit suppress signal SUPPR S indicating a transpond function. Only one signal of the transpond signal TRANS3-0 and the suppress signal SUPPR3-0 may be, in this example, active at a given time, i.e., either a transpond or suppress function may be performed but not both simultaneously.

Additionally, based on the preselected criteria, a priority of a transmission of the matched pulses is determined and the interval discriminator 404a–d which will transfer data is selected. A priority signal is output from the priority determination unit 700 to logic 702 which generates a selection signal SEL indicating which interval discriminator 404a–d is to transmit its P1 amplitude as indicated in the P1AMP3-0 signal. The selection signal SEL is provided to a multiplexer 704, in this example, a 4:1 multiplexer, which selects the respective first pulse amplitude signal P1AMP corresponding to the selected interval discriminator 404a–d. The 5 bit respective first pulse amplitude signal is then supplied to a serial transpond bus transmitter 706 formatted into, in this example, a 8 bit serial message on the transpond bus (TBUS) 118.

The 8 bits represent the mode signal MODE S, the suppress signal SUPPR S, the 5 bits of the first pulse amplitude signal P1AMP S from the selected interval discriminator and a start bit. The 8 bit serial message is supplied to the transpond bus 118. The transpond signal TRANS S is not supplied in the serial message since at this juncture, the transpond signal TRANS S would be redundant.

By the process described above, an Air Traffic Control Radar Beacon System (ATCRBS) application which performs efficiently and accurately can be achieved within a programmable common receive module. Those of skill in the art can use the above description plus application notes and functional requirements documents to use or modify the programmable common receive module disclosed herein for reception and processing of other transponder-type functions such as those associated with Mode S, Interrogate Friend or Foe (IFF) and Tactical Air Navigation (TACAN).

VHF AM Radio Application

VHF AM (amplitude modulation) relates to a signal that contains a carrier plus AM sidebands, where such modulation can be, for example, voice or tones. Although the following description is termed "VHF AM", the description additionally applies to an AM application for any other radio band, for example, HF and UHF.

Prior to operation, configuration programs for the VHF AM radio application are placed in the RAM 220 as previously explained, either by downloading from external memory over the system bus 116 or from the FLASH memory 222. Based upon control information received via the system bus 116 from a control (not shown) associated with the computer 112, the DSP 216 calculates, proportions and stores tuning requirements between coarse tuning in the analog submodule 104 and fine tuning in the DDC 210 of digital submodule 106 for each radio function that is time multiplexed. VHF AM radio application RF signals are received and processed by the PCRM 100. The analog submodule 104 and the digital submodule 106 are each configured and tuned to route and process received VHF AM radio application RF signals. For example, the analog submodule is configured and tuned to receive a VHF AM signal, frequency translate the received VHF AM signal, and route the received VHF AM signal to the NB IF output at preferably 1 MHz. Functional routing through the analog submodule 104 of a wide variety of radio functions, including the VHF AM radio function, is described in the related U.S. disclosure entitled WIDE-BAND RADIO-FREQUENCY CONVERTER HAVING MULTIPLE USE OF INTERMEDIATE FREQUENCY TRANSLATORS.

The received VHF AM signal is transmitted to an ADC such as the NB ADC 202, and preferably sampled at 4 MHz; however, as previously described, the received VHF AM signal could be sampled at higher rates, for example in an ADC sampled at 40 MHz that replaces both the WB ADC 200 and the NB ADC 202 with a single unit. The ADC 202 produces a converted signal which is transmitted to the digital processing portion 106b of the digital submodule 106. The digital submodule 106 is configured to process VHF AM radio signals supplied from the analog submodule 104.

Figure 22A:
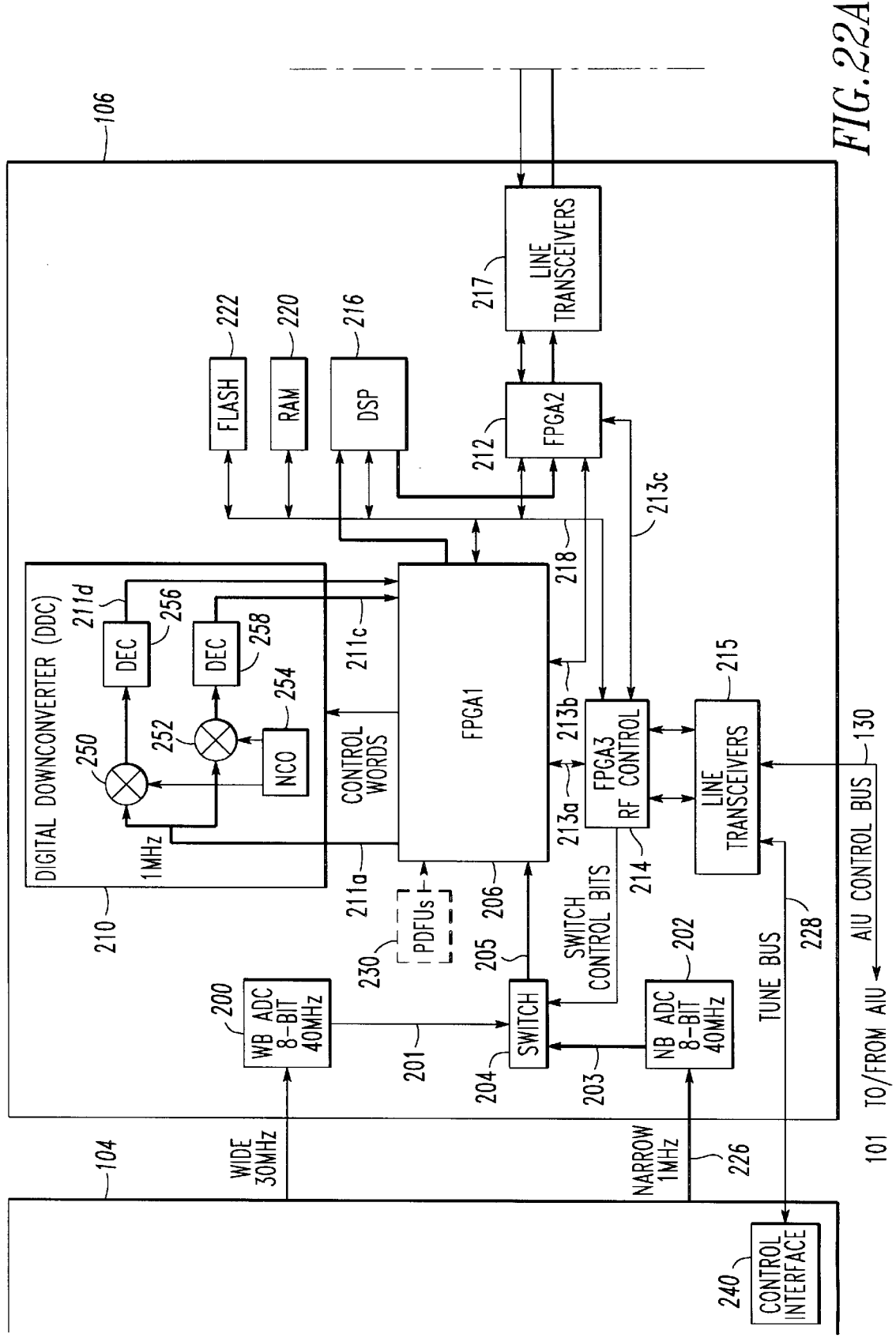
FIGS. 22A and 22B are a block diagram of a digital submodule of a programmable common receive module in the digital programmable radio configured for a VHF AM System.
Figure 22B:
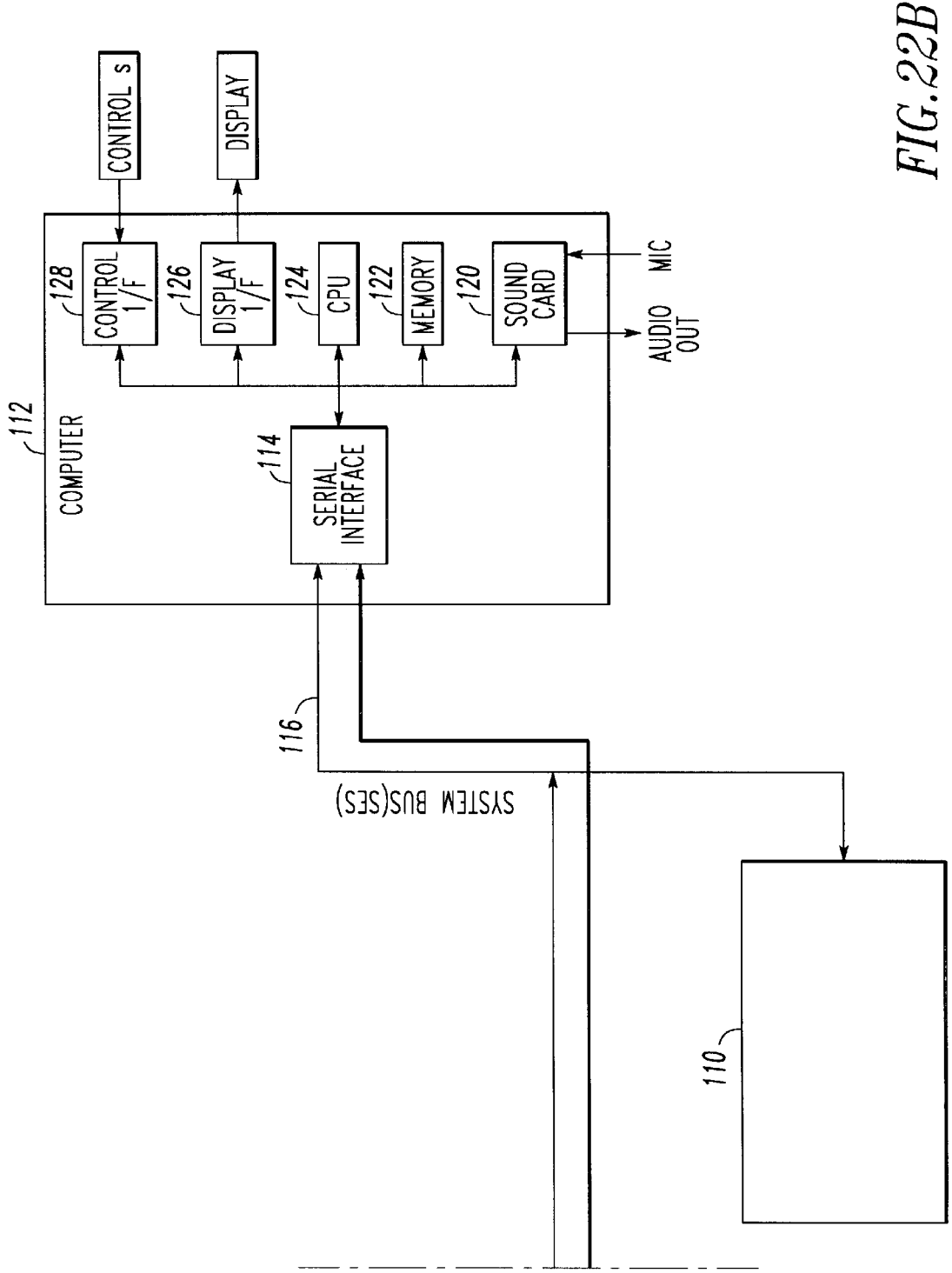

FIGS. 22A and 22B illustrates signal flow for a VHF AM application. The major components in the VHF AM digital receive signal path are the NB ADC 202, the FPGA1 206, the FPGA2 212, the FPGA3 214, the DDC 210, and the DSP 216. Although not utilized in the following embodiment, the PDFUs 230 may also be employed for more efficient or additional digital filtering.

The NB ADC 202, receives an analog input signal and outputs digital data samples. The FPGA1 206 controls data flow between the NB ADC 202, the DDC 210, the DSP 216 and, if employed, the PDFU(s) 230. The FPGA2 212 inputs parallel data and transmits serial output data onto the system bus 116. The DDC 210 performs down-conversion and decimation on the digital data samples routed from the NB ADC 202. For the VHF AM application, the DSP 216 performs signal processing, including envelope detection, AGC, and pulse code modulation (PCM) formatting. Also if desired, algorithms for other functions such as automatic frequency control (AFC) can be easily implemented by those of skill in the art.

The description of the processing and internal/external routing of signals associated with, for example, tuning, AGC and control of other resources of the associated channel is similar to the description given for the Instrument Landing System application and will not be repeated here.

After the analog submodule 104 has been tuned to the desired frequency, the VHF AM application RF signal which is analog, is received and down-converted in the analog submodule 104. The output of analog submodule 104 is a narrow band signal 226, preferably, for example, near 1 MHz, that is sent to an ADC such as the 14 bit, 4 MHz NB ADC 202. Data samples are routed through the switch 204 to the FPGA1 206. The data samples are latched into an internal register of the FPGA1 206 on low-to-high transition of the data valid signal from the ADC 202. The FPGA1 206 then outputs the latched data samples, as digital signal samples, from the internal register to the DDC 210. Synchronization is achieved by using an input clock to the DDC 210 derived from the data valid pulse and a clock such as a 40 MHz clock.

The digital signal samples supplied to the DDC 210 are digitally down converted. For VHF-AM processing, the DDC 210 accepts real input data samples, for example a signal near 1 MHz that is sampled at a 4 MHz rate. The DDC 210 then generates pairs of I and Q data that are frequency down-converted (i.e., translated) to baseband (i.e., centered on DC) via a sinusoid generator referred to as a numerically controlled oscillator (NCO) 254 and the I and Q digital mixers 250 and 252. The step size of the tunable LO1 270 in the analog submodule 104 (FIGS. 4A and 4B) is not sufficiently fine to frequency translate every VHF AM channel (as well as channels for other radio functions) to the same frequency (for example 1 MHz) at the output of the analog submodule 106, most VHF AM channels will possess slightly different frequencies (e.g., offset from 1 MHz) at the input to the DDC 210. This offset is accommodated by tuning the NCO, which typically has more than adequate tuning resolution of less than 1 Hertz, to a frequency input to the DDC 210.

The I represents a real or "in-phase" part of the data and Q represents an imaginary or "quadrature" part of the data. The I and Q data are then decimated from the input sampling rate (e.g., at 4 MHz) to an output I/Q pair rate of 8 KHz. The output decimation rates are chosen to provide at least a Nyquist sampling rate for a signal bandwidths of interest, including frequency drift. Frequency translation tuning to baseband and decimation rates are controlled by control words loaded into the DDC 210 during the tune period.

Outputs 211c and 211d from the DDC 210 are transferred back to the FPGA1 206. The DDC outputs include I/Q data and, in the preferred embodiment, a synchronization clock signal and a real control signal for each sample. The synchronization clock signal is generated by the DDC. The real control signal indicates whether the output data is real (I) or imaginary (Q). The I/Q data from the DDC 210 (e.g., serial 20-bit data) is received in the FPGA1 206, formatted into a data word usable with the local bus 218 (e.g., formatted via serial-to-parallel conversion into a 32-bit data word usable with the TMS-320 C31 DSP) and latched into a register in the FPGA1 206. Then, the FPGA1 206 raises a sampling interrupt in the DSP 216, signalling that a data sample is available. Software in the DSP 216 responds to the sampling interrupt by reading from an address, mapped into a register in the FPGA1 206, which contains the data sample. The data sample read from the FPGA1 206 is then stored in the RAM 220 prior to processing in the DSP 216.

During VHF-AM processing, sampling interrupts occur every 62.5 usec, corresponding to a 16 KHz rate. A complete I and Q data pair will therefore be received every 125 usec, corresponding to an 8 KHz rate. In the DSP 216, an envelope detect operation is performed on each pair of I and Q data samples to produce a real-valued 8-bit signal magnitude. As each signal magnitude is received, it is converted to PCM (pulse code modulated) format which may, for example, add start and stop bits to achieve a total of ten bits per sample. The formatted signal magnitude is sent to the UART in the FPGA2 212 for transmission over the system bus 116. Total of ten bits at the 8 KHz rate gives a total system bus rate of 80 KHz. The UART operation was described above in the ILS section.

By the process described above, a VHF AM radio application which performs efficiently and accurately can be achieved within a programmable common receive module. Those of skill in the art can use the above description plus application notes and functional requirements documents to apply the programmable common receive module disclosed herein to the reception and processing of other waveforms including various combinations or amplitude, frequency and/or phase modulated waveforms.

A programmable common receive module having a digital submodule according to the present invention has the following advantages.

Frequency signals corresponding to an approximate 2–2000 MHz RF range can be input and a relatively low speed serial bit stream may be output.

The programmable common receive module, as well as the analog submodule and the digital submodule may be programmable to receive and demodulate many CNI radio functions. The programmable common receive module as well as the analog submodule and the digital submodule may be quickly configured for particular radio functions as directed by a CNI controller.

The digital submodule may be included in a same box with the analog submodule which may be, for example, a plug-in module of a small size, through electrical isolation of analog and digital processing circuits.

The digital submodule includes a hardware D/A portion for performing a variety of signal processing functions. Additionally, the digital submodule can handle various time-interleave multiple radio functions, such as the LOC, GS and MB functions.

The digital submodule may further handle a wide variety of NB and WB CNI radio functions as well as other types of waveforms including various combinations of amplitude, frequency and/or phase modulation. Further, the digital submodule allows choice of IF signals, sampling frequencies and dynamic range for superior performance.

The digital submodule is functionally designed for minimal hardware although it may be appreciated that higher levels of integration are possible to reduce size even further.

Other advantages of the present invention can be found throughout this disclosure.

Although a few preferred embodiments of the invention have been shown and described, it will be appreciated by those skilled in the art that changes may be made in these embodiments, without departing from the principles and spirit of the invention, the scope 6f which is defined in the claims and their equivalents.

What is claimed is:

1. A programmable receive module comprising:
   a self-contained analog submodule, programmably reconfigurable for receiving all RF signals within a range of approximately 1 KHz to 1870 MHz corresponding to a plurality of radio applications, for converting a received RF signal and for outputting either the received RF signal or the converted RF signal as an intermediate frequency signal; and
   a self-contained digital submodule, coupled to said self-contained analog submodule, programmably reconfigurable for producing a bit stream representing information associated with a specific one of the plurality of radio applications based on the intermediate frequency signal
   said self-contained digital submodule being programmable for the specific one of a plurality of radio applications and produces one of the serial bit stream and a parallel bit stream as the bit stream in accordance with the intermediate frequency signal and the specific one of the plurality of radio applications,
   an analog to digital converter portion for converting the intermediate frequency signal into a digital signal based on the specific one of the plurality of radio applications;

a digital processing portion for processing the digital signal, said digital processing portion being programmable to produce output signals based on the specific one of the plurality of radio applications; and a reconfigurable format unit for formatting the output signals into the bit stream according to the specific one of the plurality of radio applications, said reconfigurable format unit further comprising a first field programmable gate array configured to perform a first set of preprocessing and control functions, a second field programmable gate array configured to perform demodulation processing and a first set of input/output functions, and a third field programmable gate array configured to perform a second set control and a second set of input/output functions for the specific one of the plurality of radio applications.

2. The programmable receive module as in claim 1, wherein said digital processing portion is electrically isolated from said self-contained analog submodule and from said analog-to-digital converter portion.

3. The programmable receive module as in claim 1, wherein clocks associated with a digital connection between said self-contained analog submodule and said self-contained digital submodule are turned off during signal reception.

4. The programmable receive module as in claim 1, further comprising an antenna interface unit for coupling an antenna to the programmable receive module, clocks associated with a digital connection between the programmable receive module and said antenna interface unit in an associated channel being turned off during signal reception through said antenna interface unit.

5. The programmable receive module as in claim 1, further comprising transceivers and drivers coupled to said self-contained analog submodule and said self-contained digital submodule for providing electrical isolation and dual rail connectivity between said self-contained digital submodule and said self-contained analog submodule, and between said self-contained digital submodule and said analog-to-digital converter portion.

6. The programmable receive module as in claim 1, wherein the intermediate frequency signal input to said analog-to-digital converter portion is one of a wideband intermediate frequency signal, a narrowband intermediate frequency signal, and an RF signal.

7. The programmable receive module as in claim 1, further comprising an antenna interface unit for coupling an antenna to the programmable receive module, said self-contained digital submodule comprising:

means for producing signals to control said self-contained analog submodule and said self-contained digital submodule, and means for producing signals for controlling said antenna interface unit.

8. The programmable receive module as in claim 1, wherein said self-contained digital submodule further comprises at least one of:

at least one system bus coupling the programmable receive module to an external controller which controls or reprograms the programmable receive module and transmits an information signal;

a control bus coupling the programmable receive module to an antenna interface unit;

a transpond bus connecting the programmable receive module to a programmable transmit module; and an applique bus coupling the programmable receive module to an applique module.

9. The programmable receive module as in claim 1, wherein said self-contained digital submodule comprises programmable digital interfaces.

10. The programmable receive module as in claim 9, wherein said programmable digital interfaces may be at least one of serial, parallel, synchronous, asynchronous, unidirectional, bidirectional, and of standard and custom protocols.

11. The programmable receive module as in claim 1, wherein said self-contained digital submodule further comprises:

a memory for storing a plurality of application programs which respectively correspond to the plurality of radio applications, said self-contained digital submodule executing a respective program of the plurality of application programs stored in said memory to control the programmable receive module to receive and demodulate RF signals in accordance with a specific one of the plurality of radio applications corresponding to the respective program.

12. The programmable receive module as in claim 1, wherein said self-contained analog submodule comprises a tunable local oscillator, and said self-contained digital submodule comprises a numerically controlled oscillator, frequency tuning being proportioned between said numerically controlled oscillator and said tunable local oscillator.

13. The programmable receive module as recited in claim 1, wherein said reconfigurable format unit comprises at least one dynamically configurable unit.

14. The programmable receive module as recited in claim 1, wherein said digital processing portion comprises at least one field programmable gate array configurable based on the specific one of the plurality of radio applications.

15. The programmable receive module as recited in claim 14, wherein said digital processing portion further comprises a digital downconverter configurable based on the specific one of the plurality of radio applications.

16. The programmable receive module as recited in claim 14, wherein said digital processing portion further comprises a digital sequential instruction processing unit programmable based on the specific one of the plurality of radio applications.

17. The programmable receive module as recited in claim 14, wherein said digital processing portion further comprises either a RAM memory or a FLASH memory.

18. The programmable receive module as recited in claim 14, wherein said digital processing portion further comprises at least one programmable digital filter unit.

19. The programmable receive module as recited in claim 1, wherein said first field programmable gate array is configured to perform pulse detection, pulse width discrimination, interval discrimination and mode decoding of the intermediate frequency signal for the specific one of a plurality of radio applications.

20. The programmable receive module as recited in claim 1, wherein said digital signal processing portion comprises a digital downconverter for digitally downconverting the digital signal to generate a baseband signal including an in-phase signal and a quadrature signal, said digital downconverter configurable depending on the specific one of the plurality of radio applications.

21. The programmable receive module as recited in claim 20, wherein said digital downconverter comprises:

a numerically controlled oscillator for supplying a cosine signal and a sine signal;

mixing means for mixing the cosine signal and the digital signal to generate a mixed cosine signal and for mixing the sine signal and the digital signal to generate a mixed sine signal;

filtering means for filtering the mixed cosine signal to produce a filtered cosine signal and for filtering the mixed sine signal to produce a filtered sine signal; and decimating means, programmable based on the specific one of the plurality of radio applications, for decimating the filtered cosine signal and the filtered sine signal; and tuning means for tuning the decimated signal to provide the baseband signal including the inphase signal and the quadrature signal, respectively.

22. The programmable receive module as in claim 1, the intermediate frequency signal being one of 30 MHz, 1 MHz or less than 1.5 MHz.

23. A programmable receive module comprising:

an analog submodule programmably reconfigurable for receiving and translating all RF signals of a plurality of different radio modes within a frequency range of 1 KHz to 1870 MHz into corresponding IF signals; and a digital submodule, programmably reconfigurable for operation in the plurality of different radio modes, for digitally converting a corresponding IF signal output from said analog submodule and for digitally processing the converted IF signal into a received bit stream in the corresponding radio mode of the converted IF signal;

wherein said digital submodule is programmably reconfigurable to perform threshold detection pulse detection and interval discrimination on the converted IF signal during operation in selected radio modes of the plurality of different radio modes.

24. The programmable receive module of claim 23, wherein the plurality of different radio modes comprise communication, navigation and identification modes.

25. The programmable receive module of claim 24, wherein the identification modes comprise air traffic control radio beacon and identify friend or foe modes.

26. The programmable receive module of claim 23, wherein said digital submodule comprises at least one field programmable gate array programmably reconfigurable to perform the threshold detection, the pulse detection and the interval discrimination on the converted IF signal during operation in the selected radio modes of the plurality of different radio modes.

27. The programmable receive module of claim 24, wherein the communication modes comprise VHF, HF and UHF AM modes.

28. The programmable receive module of claim 24, wherein the navigation modes comprise localizer, marker beacon and glidescope modes.

29. The programmable receive module of claim 23, wherein said digital submodule comprises:

digital conversion means for digitally converting the corresponding IF signal output from said analog submodule to provide the converted IF signal; and processing means for digitally processing the converted IF signal into the received bit stream, said processing means being electrically isolated from said digital conversion means and said analog submodule.

30. The programmable receive module of claim 29, wherein communication of clock signals between said digital submodule and said analog submodule is stopped during reception of RF signals.

31. The programmable receive module of claim 29, wherein said digital submodule and said analog submodule each comprise respective line transceivers/drivers for providing electrically isolated dual rail connectivity between said digital submodule and said analog submodule.

32. The programmable receive module of claim 29, wherein said processing means generates and provides an antenna control signal to an external antenna interface unit via a control bus and generates and provides a transpond signal to an external transmit module via a transpond bus, said digital submodule further comprising an applique bus for coupling said processing means to an external applique module and a system bus for coupling said digital submodule to an external controller which provides configuration data and information signals to said digital submodule.

33. The programmable receive module of claim 23, wherein said digital submodule comprises at least one field programmable gate array reconfigurable to perform digital processing of the converted IF signal during operation in each of the plurality of different radio modes.

34. The programmable receive module of claim 33, wherein said digital submodule comprises a memory for storing configuration data which is supplied to said at least one field programmable gate array to reconfigure said at least one field programmable gate array for operation in the plurality of different radio modes.

35. The programmable receive module of claim 23, wherein said digital submodule is programmably reconfigurable to have a plurality of digital interfaces for receiving and sending data.

36. The programmable receive module of claim 35, wherein said plurality of digital interfaces are programmably reconfigurable as serial, parallel, synchronous, asynchronous, unidirectional and bidirectional interfaces in standard and custom protocols.

37. The programmable receive module of claim 23, wherein said analog submodule includes a tunable local oscillator for translating the RF signals and said digital submodule includes a numerically controlled oscillator for digitally down converting the converted IF signal, frequency tuning being proportioned between said tunable local oscillator and said numerically controlled oscillator under control of said processing means.

38. The programmable receive module of claim 23, wherein said digital submodule is programmably reconfigurable to selectively perform amplitude, phase and frequency demodulation of the converted IF signal during operation in selected radio modes of the plurality of different radio modes.

39. The programmable receive module of claim 23, wherein the IF signal is one of 30 MHz, 1 MHz or less than 1.5 MHz.

* * * * *